United States Patent
Abe et al.

(10) Patent No.: US 7,027,533 B2
(45) Date of Patent: Apr. 11, 2006

(54) TURBO-RECEPTION METHOD AND TURBO-RECEIVER

(75) Inventors: Tetsushi Abe, Yokohama (JP);
Hiromasa Fujii, Yokosuka (JP);
Shigeru Tomisato, Yokohama (JP);
Tadashi Matsumoto, Ebina (JP)

(73) Assignee: NTT DoCoMo, Inc., Tokyo (JP)

( * ) Notice: Subject to any disclaimer, the term of this patent is extended or adjusted under 35 U.S.C. 154(b) by 857 days.

(21) Appl. No.: 10/076,407

(22) Filed: Feb. 19, 2002

(65) Prior Publication Data

US 2002/0161560 A1 Oct. 31, 2002

(30) Foreign Application Priority Data

| Feb. 20, 2001 | (JP) | ............................. 2001-043213 |
| Apr. 10, 2001 | (JP) | ............................. 2001-111095 |
| Aug. 28, 2001 | (JP) | ............................. 2001-258161 |
| Jan. 18, 2002 | (JP) | ............................. 2002-010839 |

(51) Int. Cl.
*H04L 27/06* (2006.01)
*H03M 13/03* (2006.01)

(52) U.S. Cl. ...................................... 375/341; 714/786

(58) Field of Classification Search ................ 375/340, 375/341, 285, 347, 267, 346, 229, 232, 233, 375/350, 316; 714/786, 787, 794, 795, 788
See application file for complete search history.

(56) References Cited

U.S. PATENT DOCUMENTS

| 6,307,901 | B1* | 10/2001 | Yu et al. ...................... 375/341 |
| 6,813,219 | B1* | 11/2004 | Blackmon ..................... 367/134 |
| 6,819,630 | B1* | 11/2004 | Blackmon et al. ........... 367/134 |
| 2002/0167998 | A1* | 11/2002 | Penther ........................ 375/229 |
| 2005/0018794 | A1* | 1/2005 | Tang et al. .................. 375/341 |

FOREIGN PATENT DOCUMENTS

WO  WO 03/092170  * 11/2003

OTHER PUBLICATIONS

Wang et al., "Optimization of LDPC_Coded Turbo CDMA System," IEEE Transaction on Signal Processing vol. 53, No. 4, 2005, pp 1500-1510.*

(Continued)

*Primary Examiner*—Tesfaldet Bocure
(74) *Attorney, Agent, or Firm*—Oblon, Spivak, McClelland, Maier & Neustadt, P.C.

(57) ABSTRACT

An impluse response $h_{mn}(q)$ of each transmission path is estimated from N received signals $r_m$ (m=1, ..., M) and a known signal (for a number of users equal to N, n=1, ..., N). M×N matrix H (q) having $h_{mn}(q)$ as an element and a Q×Q matrix H having H(q) as an element are determined (where Q represents a number of multipaths of each transmitted wave and q=0, ..., Q–1). A soft decision value $b'_n(k)$ is determined from decoded $\lambda_2$ [$b_n(k)$], and this is used to generate an interference component matrix B'(k) to generate an interference replica H·B'(k). The interference replica H·B'(k) is subtracted from a received matrix y(k) to determine y'(k). y(k) and H are used to determine an adaptive filter coefficient $w_n(k)$ to be applied to an n-th user in order to eliminate residual interference components in y'(k) according to the minimum mean square error criteria. y(k) is passed through $w_n(k)$ to provide a log-likelihood ratio as a received signal from the user n from which interferences are eliminated.

35 Claims, 27 Drawing Sheets

OTHER PUBLICATIONS

Bee et al., "Reduced Complexity In-Phase/Quadrature-Phase M-QAM Turbo Equalization Using Iterative Channel Estimation" IEEE Transactions on Wirless comm. vol. 2, No. 1, 2003, pp 2-10.*

Michael et al., "Turbo Equalization and New Result to Wang et al.," IEEE Transactions on Communications vol. 50, No. 5. May 5, 2002, pp754-767.*

M. Sellathurai, et al., 2000 IEEE Wireless Communications and Networking Conference, Conference Record (CAT. No. 00TH8540), Proceedings of IEEE Conference on Wireless Communications and Networking, vol. 1, pp. 315-320, XP-010532516, "Turbo-Blast for High Speed Wireless Communications", Sep. 23-28, 2000.

X. Wang, et al., IEEE Transactions on Communications, vol. 47, No. 7, pp. 1046-1061, XP-002222582, "Iterative (Turbo) Soft Interference Cancellation and Decoding for Coded CDMA", Jul. 1999.

W.-J. Choi, et al., 2000 IEEE Wireless Communications and Networking Conference, Conference Record (CAT. No. 00TH8540), Proceedings of IEEE Conference on Wireless Communications and Networking, vol. 1, pp. 304-309, XP-010532514, "Interative Soft Interference Cancellation for Multiple Antenna Systems", Sep. 23-28, 2000.

C. Douillard, et al., European Transactions on Telecommunications and Related Technologies, vol. 6, No. 5, pp. 507-511, XP-002055352, "Interative Correction on Intersymbol Interference: Turbo-Equalization", Sep. 1, 1999.

G. Bauch, et al., Wireless Communications and Networking Conference, pp. 261-265, XP-010353817, "Map Equalization of Space-Time Coded Signals Over Frequency Selective Channels", Sep. 21, 1999.

Xiaodong Wang, et al., "Turbo Multiuser Detection and Equalization for Coded CDMA in Multipath Channels", IEEE International Conference on Universal Personal Communications, vol. 2, Oct. 5-9, 1998, pp. 1123-1127.

Xiadong Wang, et al., "Turbo Multiuser Detection for Turbo-Coded CDMA", IEEE Wireless Communications and Networking Conference, vol. 3, Sep. 21-24, 1999, pp. 1456-1460.

Ben Lu, et al., "Iterative Receivers for Multiuser Space-Time Coding Systems", IEEE Journal on Selected Areas in communications, vol. 18, No. 11, Nov. 2000, pp. 2322-2335.

A. Roumy, et al., "Turbo Multiuser Detection for Coded Asynchronous DS-CDMA Over Frequency Selective Channels", IEEE Sixth International Symposium on Spread Spectrum Techniques and Applications, vol. 2, Sep. 6-8, 2000, pp. 608-612.

Tetsushi Abe, et al., "A Space-Time Turbo Equalizer in Frequency Selective MIMO Channels", The Institute of Electronics, Technical Report of IEICE, RCS2000-256, vol. 100, No. 664, Mar. 2, 2001, pp. 75-80.

* cited by examiner

TURBO-RECEPTION METHOD AND TURBO-RECEIVER

BACKGROUND OF THE INVENTION

The invention relates to turbo-reception method and a turbo-receiver as may be used in a mobile communication, for example, and which apply an iterative equalization utilizing a turbo-coding technique to waveform distortions which result from interferences.

A task in the mobile station communication business is how to construct a system capable of acquiring a multitude of users on a limited frequency domain with a high quality. A multi-input multi-output (MIMO) system is known in the art as means for solving such a task. The architecture of this system is shown in FIG. 30A where a plurality of transmitters S1 to SN transmit symbols $c_1(i)$ to $c_N(i)$ at the same time and on the same frequency, and the transmitted signals are received by an MIMO receiver equipped with a plurality of antennas #1 to #M. The received signals are processed by the receiver, which estimates transmitted symbols $c_1(i)$ to $c_N(i)$ from the respective transmitters S1 to SN and delivers them separately as $\hat{c}_1(i)$ to $\hat{c}_N(i)$ to output terminals Out 1 to Out N.

Up to the present time, a study of a specific implementation of an MIMO receiver in an MIMO system is not yet satisfactorily warranted. If one attempts to construct an MIMO receiver in an MIMO system on the basis of MLSE (maximum likelihood estimation) criteria, denoting the number of transmitters by N and the number of multi-paths through which a wave transmitted from each transmitter reaches the MIMO receiver by Q, the quantity of calculation required for the MIMO receiver will be on the order of $2^{(Q-1)N}$, and will increase even more voluminously with an increase in the number of transmitters N and the number of multi-paths Q. When information from a single user is transmitted as parallel signals, which are then received, a separation of individual parallel signals from each other requires a quantity of calculation, which increases exponentially with number of multi-paths. Accordingly, the present invention proposes herein an improved calculation efficiency turbo-reception method for a plurality of channel signals. To start with, an existing turbo-receiver for a single user (single transmitter) or a single channel transmitted signal, which illustrates the need for the present invention, will be described.

Turbo-receiver for Single User

An exemplary arrangement for a transmitter and a receiver is illustrated in FIG. 31. In a transmitter 10, information series c(i) is encoded in encoder 11, and an encoded output is interleaved (or rearranged) by an interleaver 12 before it is input to a modulator 13 where it modulates a carrier signal, the resulting modulated output being transmitted. The transmitted signal is received by a receiver 20 through a transmission path (each channel of multipath). In the receiver 20, a soft input soft output (SISO: single-input single output) equalizer 21 performs an equalization of delayed waves. At the input to the equalizer 21, the received signal is generally converted into a baseband, and the received baseband signal is sampled with a frequency which is equal to or greater than the frequency of symbol signals of information series in the transmitted signal to be converted into a digital signal, which is then input to the equalizer 21.

For the single user, this corresponds to N=1 in FIG. 30A, and a received output form each reception antenna #m in (m=1, 2, ..., M) can be represented as follows:

$$r_m(k)=\Sigma_{q=0}^{Q-1} h_m(q) \cdot b(k-q) + v_m(k) \quad (1)$$

where m represents an antenna index, h a channel value (a transmission path impulse response: a transmission path characteristic), b(k−q) a transmitted symbol from a user (transmitter 1), and $v_m(k)$ an internal thermal noise of the receiver 20. All outputs from the antennas #1 to #M are denoted by a matrix as indicated by an equation (2) to define an equation (3).

$$r(k)=[r_1(k) r_2(k) \ldots r_M(k)]^T \quad (2)$$

$$=\Sigma_{q=0}^{Q-1} H(q) \cdot b(k-q) + v(k) \quad (3)$$

where $$v(k)=[v_1(k) v_2(k) \ldots v_M(k)]^T \quad (4)$$

$$H(q)=[h_1(q) \ldots h_M(q)]^T \quad (5)$$

It is to be noted that $[\ ]^T$ represents an inverted matrix. In cosideration of the number of channels Q of the mutipath, the following matrixes and matrix are defined:

$$y(k)=[r^T(k+Q-1) r^T(k+Q-2) \ldots r^T(k)]^T \quad (6)$$

$$=H \cdot b(k)+n(k) \quad (7)$$

where $$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix} \quad (8)$$

$$b(k-q)=[b(k+Q-1) b(k+Q-2) \ldots b(k-Q+1)]^T \quad (9)$$

$$n(k)=[v^T(k+Q-1) v^T(k+Q-2) \ldots v^T(k)]^T \quad (10)$$

r(k) as defined above is input to the SISO equalizer 21, which is a linear equalizer, deriving a log-likelihood ratio $\Lambda_1$(LLR) of a probability that each encoded bit {b(i)} is equal to +1 to a probability that it is −1 as an equalization output.

$$\Lambda_1[b(k)] = \log \frac{Pr[b(k) = +1 \mid y(k)]}{Pr[b(k) = -1 \mid y(k)]} \quad (11)$$

$$=\lambda_1[b(k)]+\lambda_2^P[b(k)] \quad (12)$$

where $\lambda_1[b(k)]$ represents an extrinsic information fed to a succeeding decoder 24 and $\lambda_2^P[b(k)]$ a priori information applied to the equalizer 21. The log-likelihood ratio $\Lambda_1[b(k)]$ is fed to a subtractor 22 where the a priori information $\lambda_2[b(k)]$ is subtracted therefrom. The result is then fed through a deinterleaver 23 to an SISO channel decoder 24, which calculates a log-likelihood ratio $\Lambda_2$ as follows:

$$\Lambda_2[b(i)] = \log \frac{Pr[b(i) = +1 \mid \lambda_1[b(i)], i = 0, \ldots, B-1]}{Pr[b(i) = -1 \mid \lambda_1[b(i)], i = 0, \ldots, B-1]} \quad (13)$$

B: frame length $$=\lambda_2[b(i)]+\lambda_1^P[b(i)] \quad (14)$$

where $\lambda_2[b(i)]$ represents an extrinsic information which is applied as $\lambda_2^P[b(k)]$ to the equalizer 21 during the iteration, while $\lambda_1[b(k)]$ is applied as a priori information $\lambda_1^P[b(i)]$ to the decoder 24. In a subtractor 25, $\lambda_1[b(i)]$ is subtracted from $\Lambda_2[b(i)]$, and the result is fed through an interleaver 26 to the equalizer 21 and the subtractor 22. In this manner, the equalization and the decoding are iterated to achieve an improvement of an error rate.

To describe the prestage equalizer 21 in detail, the calculation of a linear filter response applied to a received matrix y(k) will be described. Using the a priori information $\lambda_2^P[b(k)]$ for the equalizer 21, a soft decision symbol estimate $$b'(k)=\tan h[\lambda_2^P[b(k)]/2] \quad (15)$$

is calculated. Using the estimate and a channel matrix H, an interference component or a replica H·b'(k) of the interference component is reproduced and subtracted from the received signal. Thus, $$y'(k)\equiv y(k)-H\cdot b'(k) \quad (16)$$

$$=H\cdot(b(k)-b'(k))+n(k) \quad (17)$$

where, $$b'(k)=[b'(k+Q-1) \ldots 0 \ldots b'(k-Q+1)]^T \quad (18)$$

Because the replica H·b'(k) of the interference component cannot be always a correct replica, the interference component cannot be completely eliminated by the equation (16). So a linear filter coefficient w(k) which eliminates any residue of the interference component is determined according to the MMSE (minimum mean square error) technique indicated below.

$$w(k)=\arg\min \|w^H(k)y'(k)-b(k)\|^2 \quad (19)$$

where $^H$ represents a conjugate transposition and $\| \|$ a norm. w(k) which mimimizes the equation (19) is determined.

Deriving w(k) in this manner is described in Daryl Reynolds and Xiandong Wang, "Low Complexity Turbo-Equalization for Diversity Channels" (http:/ee.tamu.edu/Reynolds/). A major achievement of this technique lies in a significant reduction in the quantity of calculation. The quantity of calculation according to a conventional MLSE turbo has been proportional to the order of $2^{Q-1}$ while a suppression to the order of $Q^3$ is enabled by this technique. It will be seen that $w^H(k)\cdot y'(k)$ represents an output from the equalizer 21, and is used to calculate $\lambda_1[b(k)]$, which is then fed through the deinterleaver 23 to the decoder 24 to be used in the decoding calculation.

For purpose of equalization in the equalizer 21, it is necessary to estimate the channel value (transmission path impulse response) h appearing in the equation (1). This estimation is hereafter referred to as a channel estimation. The channel estimation takes place by using a received signal of a known training series such as a unique word which is transmitted as a leader of one frame and a stored training series. A poor accuracy of the channel estimation prevents an equalization in the equalizer 21 from occurring in a proper manner. The accuracy of the channel estimation can be enhanced by increasing the proportion which the training series occupies in one frame, but this degrades the transmission efficiency of the intended data. Accordingly, it is desirable that the accuracy of the channel estimation could be improved while reducint the proportion of the training series in one frame.

This is not limited to a receiver for multiple channel transmitted signals inclusive of MIMO, but the same is true in the channel estimation of a receiver such as RAKE receiver or a receiver using an adaptive array antenna where the certainty of a decoded result is improved by an iterative decoding process.

The described turbo-receiver has following restrictions:

It is an accommodation for a single user (single transmitter) or only one series transmitted signal.

A channel value (matrix H) is necessary in reproducing an interference component, and this must be estimated in actual implementions. An estimation error results in a degradation in the effect of an iterative equalization.

It is an object of the invention to provide compensations for these two restrictions by providing a turbo-reception method and a receiver therefor which allow the receiver mentioned above to be extended to a receiver for a plurality of transmitted series signals such as for multiple users or parallel transmissions from a single user.

It is another object of the invention to provide a reception method and a receiver therefor in which a channel value of a received signal is estimated from the received signal and a known signal serving as a reference signal, the received signal is processed using the estimated channel value, and the processed signal is decoded so that the processing using the estimated channel value and the decoding are iterated upon the same received signal and which allow the channel estimation to be achieved with good accuracy using a relatively short known signal.

SUMMARY OF THE INVENTION

According to a first aspect of the present invention, there is provided a turbo-reception method of receiving N series (where N is an integer equal to or greater than 2) transmitted signals. The method comprises calculating a channel value $h_{mn}(q)$ (n=1, ..., N) from M received signals $r_m$ (m=1, ..., M) and N series known signals, determining a soft decision transmitted symbol $b'_n(k)$ on the basis of N series a priori information $\lambda_2[b_n(k)]$ which are obtained by the decoding, and using the channel value $h_{mn}(q)$ and the soft decision transmitted symbol $b'_n(k)$ to calculate an interference component H·B'(k) formed by an intersymbol interference produced by an n-th transmitted signal itself and transmitted signals other than the n-th transmitted signal as follows:

$$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix}$$

$$H_{(q)} = \begin{bmatrix} h_{11(q)} & \cdots & h_{1N(q)} \\ \vdots & \ddots & \vdots \\ h_{M1(q)} & \cdots & h_{MN(q)} \end{bmatrix}$$

$$B'(k)=[b'^T(k+Q-1) \ldots b'^T(k) \ldots b'^T(k-Q+1)]^T b'(k+q)=[b'_1(k+q)b'_2(k+q) \ldots b'_N(k+q)]^T$$

$$q=Q-1 \ldots -Q+1 \text{ for } q\neq 0 b'(k)=[b'_1(k) \ldots 0 \ldots b'_N(k)]^T q=0$$

where b'(k) has a zero element at n-th position, Q represents the number of multipaths of each transmitted signal wave, q=0, ..., Q-1 and $[\ ]^T$ represents a transposed matrix, subtracting the intersymbol interference H·B'(k) from the received matrix y(k) to obtain a difference matrix y'(k) where $$y(k)=[r^T(k+Q-1)r^T(k+Q-2)\ldots r^T(k)]^T$$

$$r(k)=[r_1(k)r_2(k)\ldots r_M(k)]^T$$

determining an adaptive filter coefficient $w_n(k)$ applied to the received signal for the n-th transmitted signal in order to eliminate residual interference component in the difference matrix y'(k) using the channel matrix H or reference signal, filtering the difference matrix y'(k) according to the adaptive filter coefficient $w_n(k)$ to obtain a log-likelihood ratio for the n-th series as the received signal for the n-th series transmitted signal from which the interference has been eliminated, and decoding by using the the log-likelihood ratios for N series.

According to a second aspect of the present invention, in the arrangement according to the first aspect fo the invention, when q=0, $$b'(k)=[b'_1(k)\ldots -f(b'_n(k))\ldots b'_N(k)]^T$$

where an element $f(b'_n(k))$ is located at n-th position, and f( ) represents a function which satisfies f(0)=0 and having as a variable $b'_n(k)$ which satisfies $d\{f(b'_n(k))\}/d\{b'_n(k)\}\geq 0$.

According to a third aspect of the present invention, the equalization takes place in a plurality of stages, and the number of series in the equalization output is sequentially reduced in the later stages.

According to a fourth aspect of the present invention, in a turbo-reception method in which a channel value of a received signal is estimated from the received signal and a known signal serving as a reference signal, the received signal is processed using the estimated channel value, performing a decoding processing upon the processed signal and the processing which uses the estimated channel value and the decoding processing are iterated upon the same received signal, the certainty that the decoded hard decision information signal has is determined on the basis of the value of an associated soft decision information signal, and a hard decision information signal having a certainty which is equal to or greater than a given value is also used as a reference signal in the channel estimation of the next iteration.

EMBODIMENTS OF THE INVENTION

First Aspect of the Invention (1)

Figure 1:
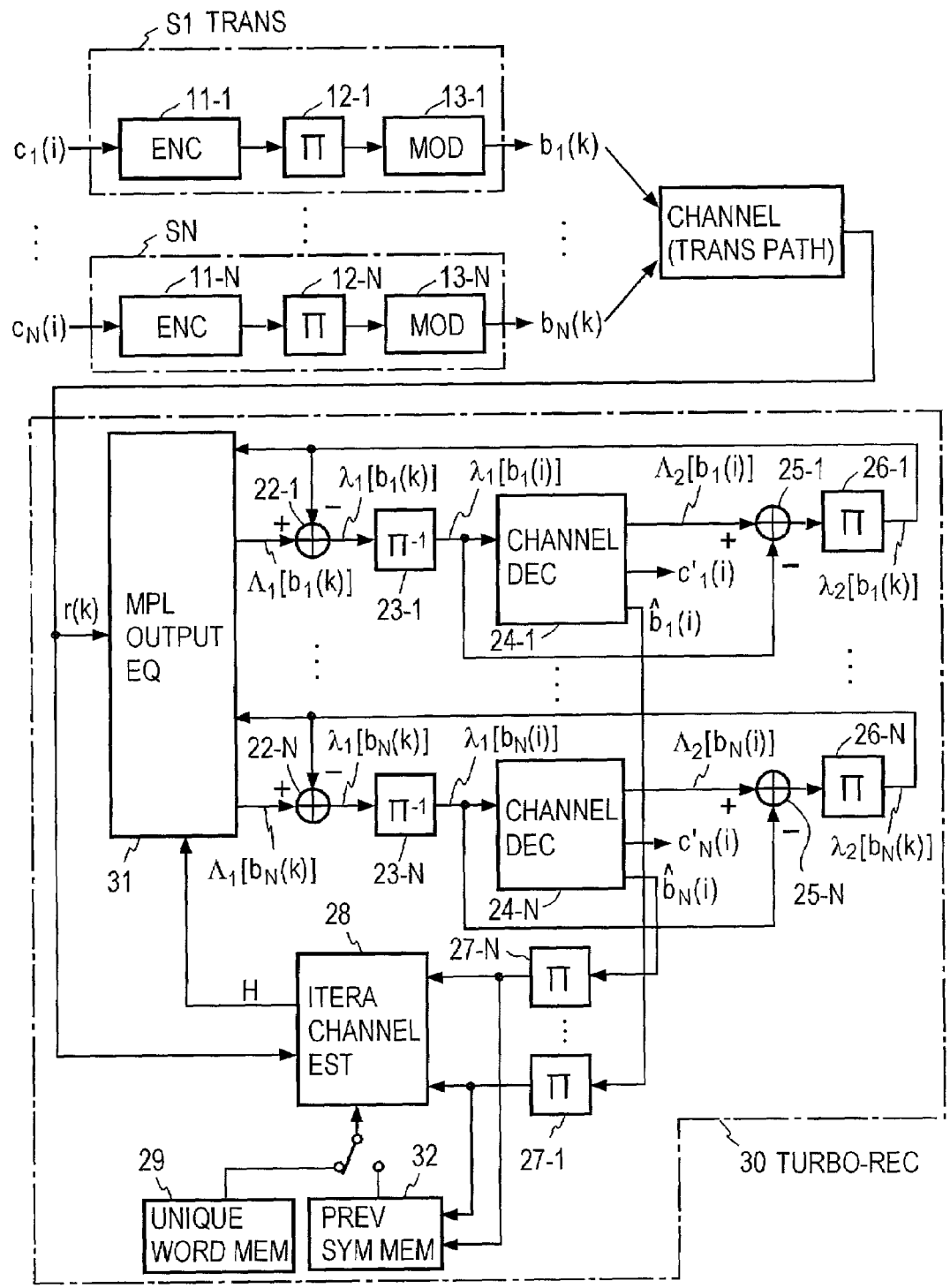
FIG. 1 is a diagram showing a functional arrangement of a system including an embodiment of a turbo-receiver according to a first aspect of the present invention.

FIG. 1 shows an exemplary arrangement of an MIMO system to which the present invention is applied.

In each of N transmitters S1 ... SN, information series $c_1(i)$ to $c_N(i)$ are encoded in encoders 11-1, ..., 11-N, and the encoded outputs are fed through interleavers 12-1, ..., 12-N to modulators 13-1, ..., 13-N as modulation signals, thus modulating a carrier signal in accordance with these modulation signals to transmit signals $b_1(k)$ to $b_N(k)$. In this manner, transmitted signals $b_1(k)$ ... $b_N(k)$ from the transmitters S1, ..., SN form N series transmitted signals.

A received signal r(k) which is received by a multiple output receiver through transmission paths (channels) is input to a multiple output equalizer 31. A signal received by the receiver is converted into a baseband signal, which is then sampled at one-half the symbol period, for example, to be converted into a digital signal, which is then input to the equalizer 31. It is assumed that there are one or more digital signals, the number of which is represented by an integer M. For example, received signals from M antennas are formed into received signals in the form of M digital signals.

The equalizer 31 delivers N log-likelihood ratios $\Lambda_1[b_1(k)], \ldots \Lambda_1[b_N(k)]$. In subtractors 22-1, ..., 22-N, a priori information $\lambda_1[b_1(k)], \ldots \lambda_1[b_N(k)]$ are subtracted from $\Lambda_1[b_1(k)], \ldots \Lambda_1[b_N(k)]$, and results are fed through deinterleavers 23-1, ..., 23-N to be input to soft input soft output (SISO) decoders (channel decoders) 24-1, ..., 24-N to be decoded, whereby the decoders 24-1, ..., 24-N deliver decoded information series $c'_1(i) \ldots c'_N(i)$ together with $\Lambda_2[b_1(i)], \ldots, \Lambda_2[b_N(i)]$. In subtractors 25-1 ..., 25-N, $\lambda_1[b_1(i)], \ldots \lambda_1[b_N(i)]$ are subtracted from $\Lambda_2[b_1(i)], \ldots, \Lambda_2[b_N(i)]$, respectively, and results are fed through interleavers 26-13 ..., 26-N to be fed as $\lambda_2[b_1(k)], \ldots \lambda_2[b_N(k)]$ to the multiple output equalizer 31 and the subtractors 22-1, ..., 22-N, respectively.

A received signal $r_m(k)$ (m=1, ..., M) from multiple users (a plurality of transmitters) is a sum of received signals from the plurality of users when it is input to the equalizer 31 as indicated below.

$$r_m(k) = \sum_{q=0}^{Q-1} \sum_{n=1}^{N} h_{mn}(q) \cdot b_n(k-q) + v_m(k) \quad (20)$$

where q=0, ..., Q-1, and Q represents the number of multipaths for each transmitted wave. Defining a matrix y(k) by a similar procedure as used for the single user, we have $$y(k) = [r^T(k+Q-1)r^T(k+Q-2) \ldots r^T(k)]^T \quad (21)$$

$$= H \cdot B(k) + n(k) \quad (22)$$

where $$r(k) = [r_1(k) \ldots r_M(k)]^T$$

$$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix} \quad (23)$$

where $$H_{(q)} = \begin{bmatrix} h_{11(q)} & \cdots & h_{1N(q)} \\ \vdots & \ddots & \vdots \\ h_{M1(q)} & \cdots & h_{MN(q)} \end{bmatrix} \quad (24)$$

$$B(k) = [b^T(k+Q-1) \ldots b^T(k) \ldots b^T(k-Q+1)]^T \quad (25)$$

$$b(k+q) = [b_1(k+q)b_2(k+q) \ldots b_N(k+q)]^T : q = Q-1, Q-2, \ldots, -Q+1 \quad (26)$$

In an interference elimination step, it is assumed that it is desirable to obtain a signal from an n-th user (transmitter). In this example, a soft decision symbol estimate for signals from all users (transmitters) and a channel matrix (transmission path impulse response matrix) H are used to produce a synthesis of interferences by user signals other than from n-th user and interferences created by the n-th user signal itself, or an interference replica H·B'(k) is reproduced. Then, the interference replica is subtracted from y(k) to produce a difference matrix y'(k).

$$y'(k) \equiv y(k) - H \cdot B'(k) \quad (27)$$

$$= H \cdot (B(k) - B'(k)) + n(k) \quad (28)$$

where $$B'(k) = [b'^T(k+Q-1) \ldots b'^T(k) \ldots b'^T(k-Q+1)]^T \quad (29)$$

$$b'(k+q) = [b'_1(k+q)b'_2(k+q) \ldots b'_N(k+q)]^T : q = Q-1, \ldots, -Q+1, q \neq 0 \quad (30)$$

$$b'(k) = [b'_1(k) \ldots 0 \ldots b'_N(k)]^T : q=0 \quad (31)$$

b'(k) has a zero element at n-th position. It is to be understood that $b'_n(k)$ represents a soft decision transmitted symbol estimate which is obtained by calculation of $b'_n(k)$=tan h $[\lambda_2[b_n(k)]/2]$. The matrix B'(k) represents a replica matrix of the interference symbol.

A filter coefficient $w_n(k)$ for the n-th user, which is used to eliminate the residue of the interference component, namely, a residual interference based on the imperfectness of the interference component replica H·B'(k) and an interference component created by the n-th signal itself, is determined according to MMSE (minimum mean square error) criteria as one which minimizes the following equation (32):

$$w_n(k) = \arg \min \|w_n^H(k) \cdot y'(k) - b_n(k)\|^2 \quad (32)$$

Subsequent operation remains the same as for the single user. Specifically, $w_n(k)$ which is obtained in this manner is used to calculate $w_n^H(k) \cdot y'(k)$, and a result of calculation is fed through deinterleaver 23-n to be input as $\lambda_1[b_n(i)]$ to the decoder 24-n where a decoding calculation is made.

The described method of applying a filter (linear equalization) processing upon the received signal $r_m$ is repeated for all of users 1 to N. As a consequence, the number of outputs from the equalizer 31 will be equal to N, and all these outputs are decoded by respective decoders 24-1, ..., 24-N. What has been mentioned above is an extension of a turbo-receiver for single user to a receiver for multiple users (MIMO).

Figure 2:
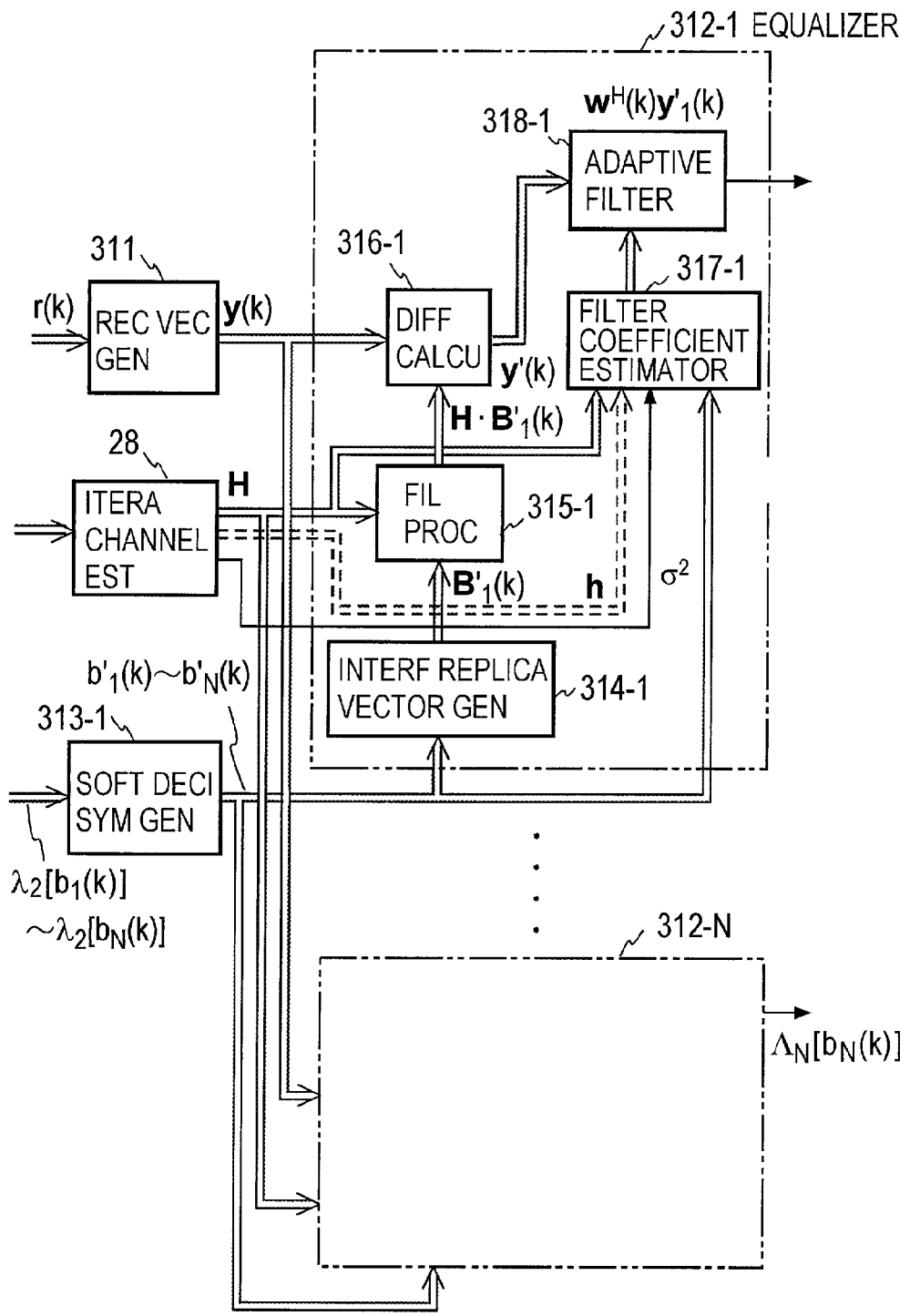
FIG. 2 is a schematic view showing a specific example of a functional arrangement of a multiple output equalizer 31 shown in FIG. 1.

From the foregoing description, it will be seen that an exemplary functional arrangement of the multiple output equalizer 31 will be as shown in FIG. 2. Specifically, M received signals $r_m(k)$ are supplied to a received matrix generator 311 where a received matrix y(k) is generated and is fed to equalizers 312-1 to 312-N for each user. The channel matrix H which is calculated by a channel estimator 28 is also supplied to the equalizers 312-1 to 312-N. A priori information $\lambda_2 [b_n(k)]$ from each channel decoder 24-n is supplied to a soft decision symbol estimator 313 where a soft decision transmitted symbol estimate $b'_n(k)=\tan h [\lambda_2 [b_n(k)]/2]$ is calculated. All of equalizers 312-1 to 312-N have identical functional arrangements and process in an identical manner, and accordingly, a typical one of them (312-1) will be described.

In addition, soft decision transmitted symbol estimates $b'_1(k)$ to $b'_N(k)$ are supplied to an interference replica matrix generator 314-1 where an interference replica matrix $B'_1(k)$ is generated according to the equations (29) to (31), then the matrix $B'_1(k)$ is subject to a filter processing according to the channel matrix H in a filter processor 315-1, and a resulting interference replica component $H \cdot B'_1(k)$ is subtracted from the received matrix $y_1(k)$ in a difference calculator 316-1 to produce a difference matrix $y'_1(k)$.

At last the channel matrix H or a reference signal which will be described later is input to a filter coefficient estimator 317-1 to determine the filter coefficient $w_1(k)$ which is used to eliminate the residue of the interference component. In the example shown, the channel matrix H and a covariance $\sigma^2$ of a noise component and soft decision transmitted symbols $b'_1(k)$ to $b'_N(k)$ from the soft decision symbol generator 313-1 are input to the filter coefficient estimator 317-1 to determine the filter coefficient $w_1(k)$ which minimizes the equation (32) according to the minimum mean square error criteria. A specific example of determining the filter coefficient $w_1(k)$ will be described later. The difference matrix $y'_1(k)$ is processed with the filter coefficient $w_1(k)$ in an adaptive filter processor 318-1, and $\Lambda_1 [b_1(k)]$ is delivered as an equalized output for the received signal which corresponds to the transmitted signal from user 1.

Figure 3:
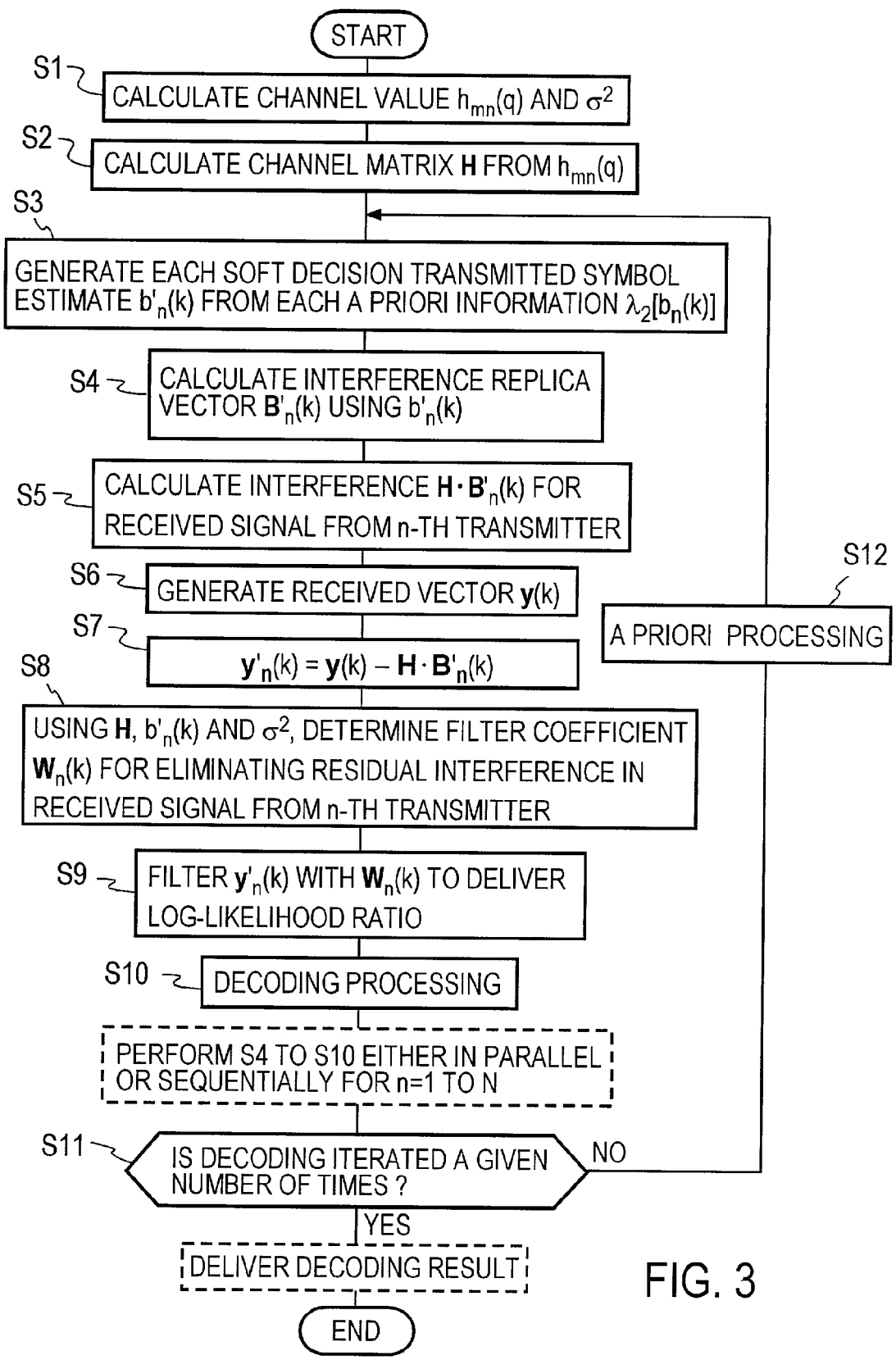
FIG. 3 is a flow chart of an embodiment of a turbo-reception method according to the first aspect of the present invention.

A processing procedure for the multiple input multiple output turbo-reception method according to the described embodiment of the present invention is shown in FIG. 3. At step S1, a channel value $h_{mn}(q)$ and a covariance $\sigma^2$ of a noise component are calculated from a received signal r(k) and each training signal $b_n(k)$. At step S2, the channel matrix H is calculated from the channel value $h_{mn}(q)$. At step S3, the soft decision transmitted symbol estimate $b'_n(k)=\tan h [\lambda_2 [b_n(k)]/2]$ is calculated on the basis of the a priori information $\lambda_2 [b_n(k)]$ which is obtained during a previous iteration of the turbo-reception processing.

At step S4, the received signal y (k) is generated from the received signal r(k). At step S5, the interference replica matrix $B'_n (k)$ is generated according to the equations (29) to (31) using the respective soft decision transmitted symbol estimates $b'_n (k)$. At step S6, the interference component replica $H \cdot B'_n (k)$ for the received signal from the n-th transmitter is calculated. At step S7, the interference component replica $H \cdot B'_n(k)$ is subtracted from the received matrix y (k) to provide the difference matrix $y'_n (k)$. At step S8, using the channel matrix H, the soft decision transmitted symbols $b'_1(k)$ to $b'_N(k)$ and the covariance $\sigma^2$ of the noise component, the filter coefficient $w_n (k)$ which is used to eliminate the residue of interference remaining in the received signal from the n-th transmitter is determined according to the minimum mean square error criteria so as to minimize the equation (32).

At step 9, a filter processing according to the filter coefficient $w_n (k)$ is applied to the difference matrix $y'_n (k)$ to obtain the log-likelihood ratio $\Lambda_1 [b_n(k)]$. At step S10, the a priori information $\lambda_2 [b_n(k)]$ is subtracted from $\Lambda_1 [b_n(k)]$ and the result is deinterleaved and decoded to deliver the log-likelihood ratio $\Lambda_2 [b_n(k)]$. The steps S4 to S10 are performed either simultaneously or sequentially for n=1 to N. Subsequently, at step S11, an examination is made to see whether or not the number of decoding operations, namely, the number of turbo-reception processings has reached a given number. If the given number is not reached, the operation goes to step S12 where the extrinsic information $\lambda_1 [b_n(k)]$ is subtracted from the log-likelihood ratio $\Lambda_2 [b_n(k)]$, and its result is interleaved to determine the a priori information $\lambda_2 [b_n(k)]$, thus returning to step S3. If it is found at step S11 that the number of decoding operations has reached the given number, a resulting decoding output is delivered at step S13.

The channel estimator 28 will now be described. Each received signal $r_m(k)$ can be represented as follows:

$$r_m(k)=\Sigma_{q=0}^{Q-1}\Sigma_{n=1}^{N}h_{mn}(q) \cdot b_n(k-q)+v_m(k) \quad (33)$$

Figure 4A:
FIG. 4A is a diagram of an exemplary frame.

The channel estimator 28 determines the channel value (transmission path impulse response) $h_{mn}(q)$ appearing in the equation (33) and the mean power ($=\sigma^2$) of the noise $v_m(k)$. Normally, a unique word (training signal) which is known to the receiver is inserted at the beginning of each frame to be transmitted on the transmitting side, as shown in FIG. 4A, and the receiver utilizes the unique word (known signal) as a training series to estimate the channel value $h_{mn}(q)$ using RLS (recursive least square) technique. Each of the channel decoder 24-1, ..., 24-N delivers +1 if a log-likelihood ratio $\Lambda_2 [b_1(i)], \ldots \Lambda_2 [b_N(i)]$ is positive, and −1 if the latter is negative as a decoded code signal (or transmitted encoded symbol hard decision value) $\hat{b}_1(i), \ldots, \hat{b}_N(i)$, which are fed iteratively through interleavers 27-1, ..., 27-N to the channel estimator 28. The received signal r(k) is input to the channel estimator 28 together with a unique word which is fed from a unique word memory 29 to serve as a reference signal. On the basis of these input signals, the channel estimator 28 estimate each $h_{mn}(q)$ according to the equation (33) and $\sigma^2$ value according to the least square technique. This estimation can be made in a similar manner as the estimation of an impulse response when adaptively equalizing the received signal with an adaptive filter by estimating an impulse response of a transmission path.

The use of the training series in this manner is conventional, but in order to enhance the net transmission rate, it is necessary to reduce the proportion that the unique word occupies in one frame, but this increases the error of the channel estimation. If there is such an error, it results in degrading the iterative equalization response mentioned above. According to the present invention, an iterative estimation of the channel value in the following manner is proposed.

Figure 4B:
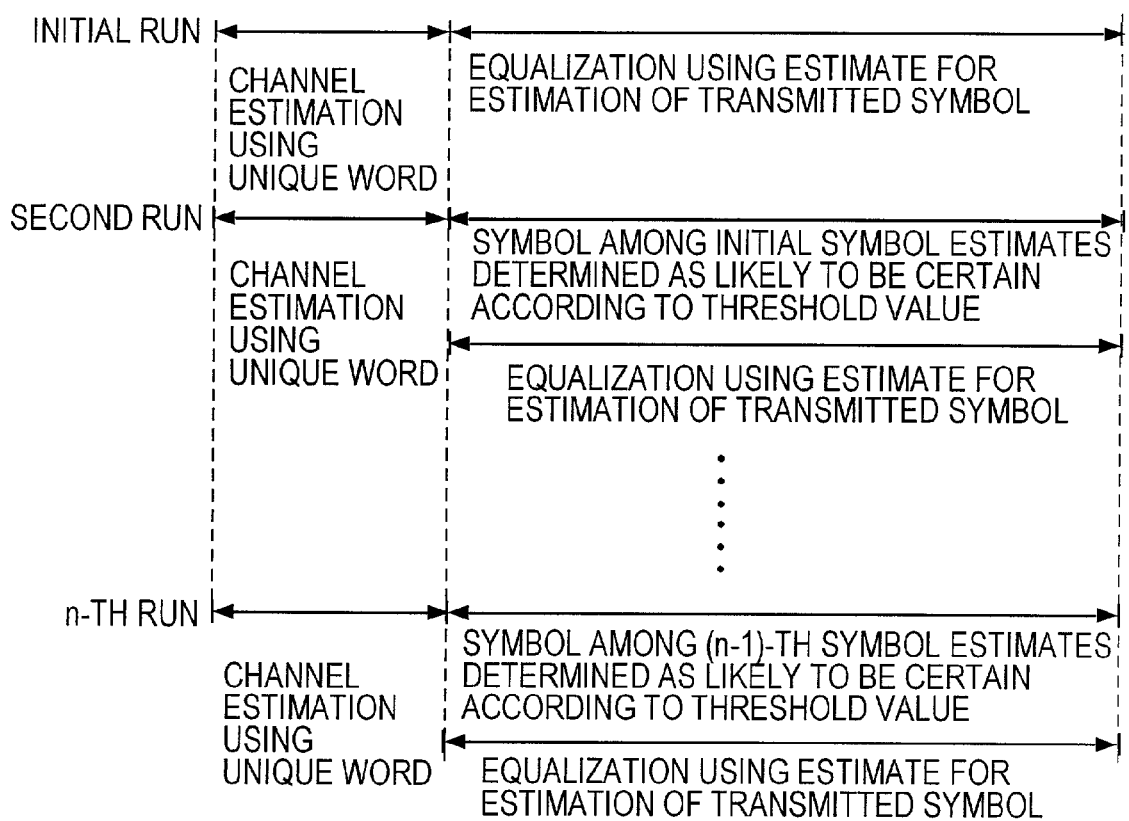
FIG. 4B is an illustration of processings which are performed during each iteration, presented in order to illustrate an iterative channel estimation method according to a fourth aspect of the present invention.

The concept according to the present invention is illustrated in FIG. 4B. The purpose of the concept is to estimate the channel value iteratively in each stage of the iterated equalization processing of the same received signal or during the each iteration of the turbo-reception processing. During the first run, for information symbol series which follows the unique word, the channel value is estimated using only the unique word as a reference signal, and the estimated channel value is used to equalize the received signal and to estimate the transmitted symbol. However, before the second iteration of the equalization processing, the channel estimation is made using the unique word as the reference signal, and the symbol estimate (hard decision value) which is obtained during the previous decoding processing is also used as the reference signal to perform a channel estimation of the entire frame. In this instance, rather than using every hard decision value, only that hard decision value or values which have been determined as likely to be certain is used as the reference signal. The hard decision is rendered by delivering +1 when the logic-likelihood ratio $\Lambda_2 [b_n(i)]$ from the decoder 24-$n$ is positive, and delivering −1 if the later is negative. The greater the absolute magnitude of the log-likelihood ratio $\Lambda_2 [b_n(i)]$, it can be said the greater the likelihood that the hard decision value is likely to be certain. For example, the certainty that is rendered when the log-likelihood 5 is determined to be +1 is greater than the certainty when the logic-likelihood 0.3 is determined to be +1. Accordingly, an interative channel estimation method which uses a threshold value to designate hard decision value $b_n(i)$ which is likely to be certain will be described below.

Initially, using the log-likelihood ration $\Lambda_2 [b_n(i)]$ from the decoder 24-$n$, a soft decision symbol value $b'_n(i)$ is determined as follows:

$$b'_n(i) = \tan h[\Lambda_2[b_n(i)]/2]$$

This operation is made in order to normalize the logic-likelihood value to 1, thus preventing its absolute magnitude from exceeding 1. Next, a threshold between 0 and 1 is provided, and when the absolute magnitude of a soft decision value $b'_n(i)$ is greater than the threshold value, a corresponding hard decision value $\hat{b}_n(i)$ is preserved to be used in the iterative channel estimation. For example, if the threshold value is chosen to be 0.9, those of hard decision values $\hat{b}_n(i)$ which correspond to soft decision values $b'_n(i)$ having absolute magnitudes equal to or greater than 0.9 are selected. It is believed that the certainty of the selected hard decision value $\hat{b}_n(i)$ is high in view of the fact that the threshold value is as high as 0.9, and accordingly, it is believed that the accuracy of the iterative channel estimation which is made using such hard decision values can be improved. However, it is also considered that because the number of selected symbols is reduced, the accuracy of the iterative channel estimation may be influenced and becomes degraded. Accordingly, it is necessary that an optimum threshold value be choosed between 0 and 1. To add, if the threshold value is to be 1, if follows that there is no hard decision value $\hat{b}_n(i)$ which is selected, stating to the effect that no iterative channel estimation takes place. Accordingly, a threshold value on the order of 0.2 to 0.8 is chosen, as will be further described later.

Accordingly, those of transmitted symbol estimates (hard decision values) $\hat{b}_1(i), \ldots, \hat{b}_N(i)$ for the information symbol series during the first transmission which are determined to be likely to be certain according to the threshold value are fed from the outputs of the interleavers 27-1, ..., 27-N to a previous symbol memory 32 to be stored therein as a previous transmitted symbol estimate. During the second iteration of the equalization and decoding processing for the received signal r(k) (it being noted that the received signal r(k) is stored in a memory), the unique word is initially used to make a channel estimation, and those of estimated transmitted symbol hard decision estimates $\hat{b}_1(i), \ldots, \hat{b}_N(i)$ which have been determined to be likely to be certain are read from the previous symbol memory 32 to be fed to the channel estimator 28 to make a channel estimation, namely, a channel estimation for the entire frame. A resulting estimate $h_{mn}(q)$ and $\sigma^2$ are used to perform an equalization and decoding (the estimation of transmitted symbol) with respect to the received signal r(k). At this time, those symbol values among the estimated transmitted symbols which had been determined to be likely to certain according to the threshold are iused to update the content of the previous symbol memory 32. Subsequently, an estimation using the unique word and an estimation using those of the previously estimated transmitted signals which are determined to be likely to be certain are used to make a channel estimation of the entire frame during a subsequent iteration of the equalization and decoding. The estimated channel is used to perform the equalization and decoding (the estimation of transmitted symbol) and to update the previous symbol memory 32. Alternatively, those of the transmitted symbol hard decision values $\hat{b}_1(i), \ldots, \hat{b}_N(i)$ from the decoders which are determined to be likely to be certain according to the threshold value may be directly stored in the previous symbol memory 32 to update it, and when the symbol values stored in the previous symbol memory 32 are to be utilized, they will be fed through the interleavers 27-1, ..., 27-8 to be input to the channel estimator 28.

By the iterations which proceed in this manner, an error of the channel estimation can be reduced, the accuracy of the symbol estimation can be improved and the problem of a degraded response in the turbo-equalization due to an error of an channel estimation can be improved.

Figure 5:
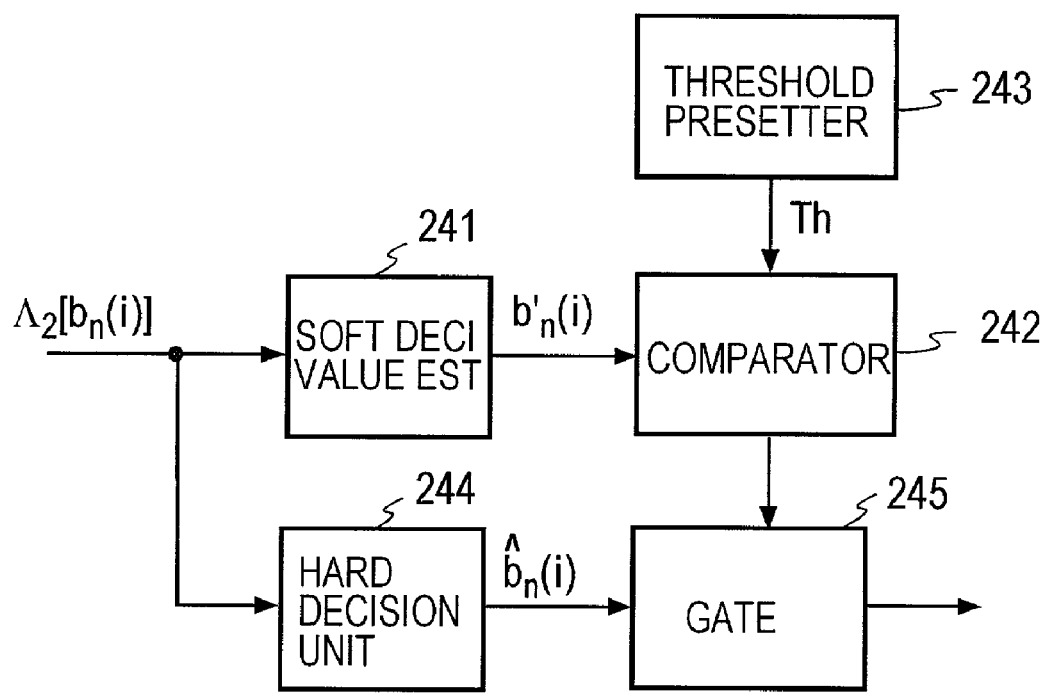
FIG. 5 is a diagram of an exemplary functional arrangement for deriving a hard decision symbol which is likely to be certain.

When a channel estimation is made with respect to information symbol series using the symbol hard decision values which are likely to be certain in the manner mentioned above, a function as indicated in FIG. 5 is added to each decoder 24-$n$. The log-likelihood ratio $\Lambda_2 [b_n(i)]$ is input to a soft decision value estimator 241 to calculate $b'_n(i) = \tan h [\Lambda_2 [b_n(i)]/2]$ thus estimating a transmitted symbol soft decision value $b'_n(i)$. The value $b'_n(i)$ is compared against a threshold value Th from a threshold presetter 243, thus delivering 1 when $b'_n(i)$ is equal to or greater than Th and delivering 0 when it is less than Th. On the other hand, the log-likelihood ratio $\Lambda_2 [b_n(i)]$ is input to a hard decision unit 244, which delivers +1 if $\Lambda_2 [b_n(i)]$ is positive and delivers −1 if the latter is negative as a symbol hard decision value $\hat{b}_n(i)$. The symbol hard decision value $\hat{b}_1(i)$ is fed through a gate 245 which is opened when a corresponding symbol soft decision value is equal to or greater than the threshold value, and is passed through the interleaver 27-$n$ shown in FIG. 1 to be fed to the previous symbol memory 32, thus updating the stored symbols.

Figure 6:
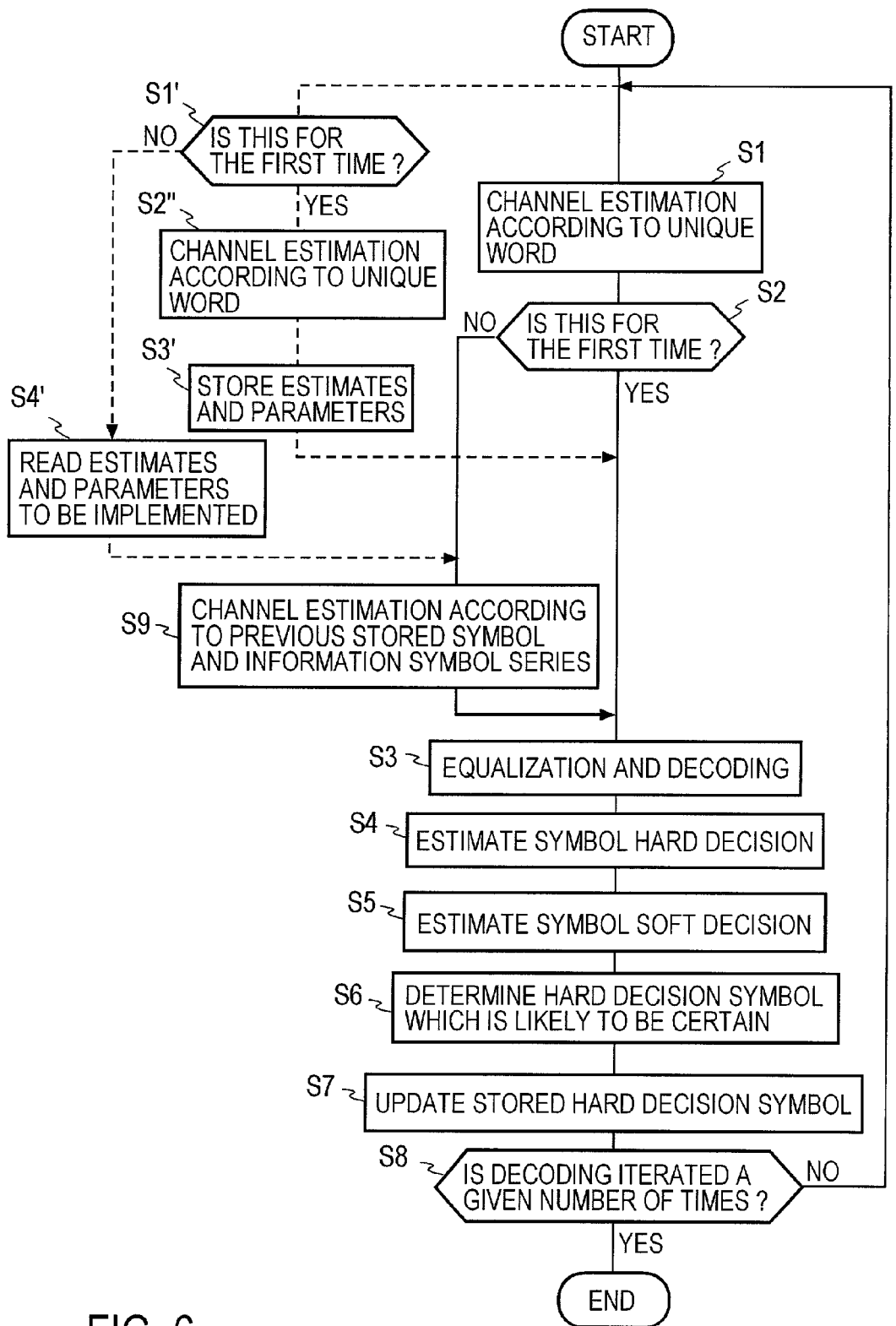
FIG. 6 is a flow chart of an exemplary processing procedure for channel estimation according to the present invention.

A procedure of the channel estimation which also utilizes a symbol hard decision value or values which are likely to be certain is shown in FIG. 6. Initially, at step S1, a channel estimation is made with a received signal r(k) and a unique word. At step S2, an examination is made to see if the decoding processing is for the first time, and if it is, at step S3, the estimated channel value $h_{mn}(q)$ is used to perform the equalization and decoding processing or the operations shown at steps S3 to S10 in FIG. 3.

At step S4, a transmitted symbol hard decision is rendered with respect to the log-likelihood ratio $\Lambda_2 [b_n(i)]$ to determine a hard decision value $\hat{b}_n(i)$. At step S5, $b'_n(i) = \tan h [\Lambda_2 [b_n(i)]/2]$ is calculated from the log-likelihood ratio $\Lambda_2 [b_n(i)]$, thus estimating a transmitted symbol soft decision value $b'_n(i)$. At step S6, by examining whether the symbol soft decision value $b'_n(i)$ is equal to or greater than the threshold value Th or not, those of the symbol hard decision values $\hat{b}_n(i)$ which are likely to be certain are determined. At step S7, the symbol hard decision value or values which are likely to be certain are used to update the content of the previous symbol memory 32. At step S8, an examination is made to see whether or not the number of decoding operations has reached a given value, and if not, the operation returns to step S1, or more exactly, going through the step S12 shown in FIG. 3 and returning to the step S1 shown in FIG. 3.

If it is found at step S2 that the decoding processing is not for the first time, at step S9, a previous stored symbol, namely, a hard decision symbol which is likely to be certain is read from the previous symbol memory 32, and it is used together with information symbol series of the received signal $r(k)$ to make a channel estimation, thus transferring to step S3.

In the above description, even during a second and a subsequent iteration, the channel estimation is made from the beginning using the unique word as a reference signal, but it is also possible that only the hard decision symbol which is likely to be certain may be used as the reference signal during a second and a subsequent iteration. In this instance, as indicated in broken lines in FIG. 6, an examination is made to see if this processing is for the first time at step S1', and if it is, the unique word is used as a reference signal together with the received signal to estimate the channel value. After storing the estimated channel value and parameter values which are used in the estimation in a memory at step S3', the operation transfers to the equalization and the decoding processing which take place at step S3.

If it is found at step S1' that the processing is not for the first time, before the channel estimation is made, a previously stored channel estimate and various processing parameters are set up at S4', whereupon the operation transfers to step S9.

It is to be noted that a solution of the equation (32) is given as follows:

$$w_n(k) = (HG(k)H^H + \sigma^2 I)^{-1} \cdot h \quad (34)$$

where I represents a unit matrix, $\sigma^2$ an internal noise power of a receiver (covariance of noise component), $\sigma^2 I$ a covariance matrix of noise component and $G(k)$ corresponds a squared error of the channel estimation.

$$G(k) = E[(B(k) - B'(k)) \cdot (B(k) - B'(k))^H] = \\ diag[D(k+Q-1), \ldots, D(k), \ldots, D(k-Q+1)] \quad (35)$$

where E [ ] represents a mean, diag a diagonal matrix (having elements which are not along the diagonal being zero's).

$$D(k+q) = diag[1 - b'^2_1(k+q), \ldots, \\ 1 - b'^2_n(k+b), \ldots, 1 - b'^2_N(k+q)] \quad (36)$$

$$q = Q-1, Q-2, \ldots, -Q+1, q \neq 0$$

and when q=0, $$D(k) = diag[1 - b'^2_1(k), \ldots, 1, \ldots, 1 - b'^2_N(k)] \quad (37)$$

'1' appearing in the matrix $D(k)$ represents an n-th element (it is assumed that an n-th user's transmitted signal is assumed to be a desired signal).

$$h = \begin{bmatrix} H_{1,(Q-1)\cdot N+n} \\ H_{2,(Q-1)\cdot N+n} \\ \vdots \\ H_{M\cdot Q,(Q-1)\cdot N+n} \end{bmatrix} \quad (38)$$

Thus, h comprises all the elements in the (Q-1)·N+n-th column of H appearing in the equation (23). Input to the filter coefficient estimator 317-1 of the multiple output equalizer 31 as shown in FIG. 2 are the channel matrix H and the noise power $\sigma^2$ which are estimated in the channel estimator 28 and the soft decision transmitted symbols $b'_1(k)$ to $b'_N(k)$ from the soft decision symbol generator 313-1 to calculate the residual interference elimination filter coefficient $w_n(k)$ according to the equations (34) to (38).

It will be seen that the equation (34) requires an inverse matrix operation, but the required calculation can be reduced by using the matrix inversion lemma for the inverse matrix. Specifically, by approximating each $b'^2$ appearing in the equations (36) and (37) by 1, it follows that $$D(k+q) = diag[0, \ldots, 0] = 0 \quad (q \neq 0) \quad (39)$$

$$D(k) = diag[0, \ldots, 1, \ldots, 0] \quad (40)$$

Thus, $D(k)$ have elements having a value of 1 for those elements which are located at n-row and n-column while all other elements are equal to 0. When the error matrix $G(k)$ of the equation (35) which is determined by the equations (39) and (40) is substituted into the equation (34), we have $$w_n(k) = (h \cdot h^H + \sigma^2 I)^{-1} \cdot h \quad (41)$$

where h is as defined by the equation (38).

With this approximation, $w_n(k)$ does not depend on k, and accordingly, an inverse matrix calculation at every discrete time k can be dispensed with, thus reducing the quantity of calculation.

The matrix inversion lemma for the inverse matrix is applied to the equation (41). The lemma states that assuming A and B are (M, M) square matrices, C a (M, N) matrix and D a (N, N) square matrix, when A is given by $A^{-1} = B^{-1} + CD^{-1}C^H$, the inverse matrix of A is given as follows:

$$A^{-1} = B - BC(D + C^H BBC)^{-1}C^H B \quad (42)$$

Applying the lemma to the inverse matrix operation appearing in the equation (41), we have $$h(k) \cdot h(k)^H + \sigma^2 I = B^{-1} + CD^{-1}C^H$$

$$h(k) \cdot h(k)^H = CD^{-1}C^H, \sigma^2 I = B^{-1}, h(k) = C$$

$$I = D^{-1}, h(k)^H = C^H$$

Using these equations to calculate the equation (42), the inverse matrix operation appearing in the equation (41) can be calculated. While the equation (42) contains an inverse matrix operation $(D + C^H BBC)^{-1}$, this inverse matrix becomes scalar and can be simply calculated.

Thus, in this instance, it is reduced to the following form:

$$w_n(k) = 1/(\sigma^2 + h^H \cdot h)h \quad (41\text{-}1)$$

1/( ) on the right side of this equation is scalar or assumes a constant value, which may be chosen to be 1. Thus, we can put $w_n(k) = h$, indicating that w (k) can be determined by only h. As indicated in broken lines in FIG. 2, only h which is represented by the equation (38) in the channel matrix H from the channel estimator 28 may be input to the filter coefficient estimator 317-1.

Without being limited to the use of the matrix inversion lemma for the inverse matrix for the approximation by the equations (39) and (40), the approximation also allows the quantity of calculation for the equation (34) to be reduced. In particular, when this approximation is used, and the matrix inversion lemma for the inverse matrix is used, the quantity of the calculation can be further reduced. In addition, if the covariance matrix of the noise component is represented by $\sigma^2 I$, an approximation: $w_n(k)=h$ may be used as indicated by the equation (41-1), whereupon it is independent from the covariance matrix, allowing a further simplification of the calculation.

Second Aspect of the Invention (Reflecting an Error Correction)

In the equalization processing where $H \cdot B'(k)$ is subtracted from the received matrix $y(k)$ represented by the equation (27), an error correction decoding result is reflected in a transmitted signal soft decision value for a signal other than the signal $b_n(k)$ being detected, but an error correction decoding result which relates to the signal $b_n(k)$ being detected is not. For this reason, it is preferred to employ the following processing.

$b'(k)$ appearing in the equation (29) or the equation (31) is changed as follows;

$$b'(k)=[b'_1(k)\ b'_2(k) \ldots b'_{n-1}(k)\text{-}f(b'_n(k))\ b'_{n+1}(k) \ldots b'_N(k)] \quad (43)$$

where $f(b'_n(k))$ is an arbitrary function having $b'_n(k)$ as an input.

When such change is made, it becomes possible to reflect an error correction decoding result with respect to the signal $b_n(k)$ being detected. Thus, rather than using $b'_n(k)=0$, by adding a suitable value depending on $b'_n(k)$, it is possible to emphasize a signal being detected which is buried in a noise or an interfering signal, thus allowing $b_n(k)$ to be properly detected.

Because the sign of $b'_n(k)$ relates to a result of a hard decision rendered upon a symbol which corresponds to $b'_n(k)$, and in view of the fact that the greater the absolute magnitude of $b'_n(k)$, the higher the reliability of the hard decision symbol which corresponds to $b'_n(k)$, it is necessary that $f(b'_n(k))$ satisfies the following requirements:

The function f has a value of 0 for $b'_n(k)=0$ or when the reliability of the hard decision symbol is equal to 0. Or, $$f(0)=0 \quad (44)$$

In addition, the greater the value of $b'_n(k)$, the greater the value of the function f. Or, $$d\{f(b'_n(k))\}/d\{b'_n(k)\} \geq 0 \quad (45)$$

Examples of such $f(b'_n(k))$ include the following:

$$f(b'_n(k))=\alpha \times b'_n(k) \quad (46)$$

$$f(b'_n(k))=\alpha \times b'_n(k)^2 \quad (47)$$

For example, when the equation (46) is used and $\alpha$ is chosen to be a constant, the equation (43) can be implemented in a simple manner. Here, $\alpha$ must satisfy the requirement: $0<\alpha<0.6$. If $\alpha$ is greater than 0.6, BER (error rate) will be degraded, preventing a correct decoding result from being obtained. It is also contemplated to make $\alpha$ to be variable in accordance with the reliability of a decoding result. For example, $\alpha$ may be chosen for each iteration of the decoding processing. In this instance, the reliability of the decoding result will be normally improved with the number of iterations of the decoding processings and accordingly, an increased value may be chosen for $\alpha$ depending on the number of iterations of the decoding processing. Alternatively, the reliability of an entire decoded frame may be determined upon each iteration of the decoding processing, and the value of $\alpha$ may be chosen in accordance with the reliability thus determined. To determine the reliability of the decoded frame, a decoding result may be compared against a decoding result which is obtained during an immediately preceding iteration, and a number of hard decision symbols which changed from the previous decoding operation may be counted, for example. Thus, where there is an increased number of changed decision symbols, the reliability may be determined to low while when the number of changed hard decision symbols is small, the reliability may be determined to be high.

As $b'_n(k)$ is changed in this manner, the equation (35) which is used when determining the filter coefficient $w_n(k)$ for MMSE (minimum mean square error) filter is desirably changed as follows:

$$G(k)=E[(B(k)-B'(k))\cdot(B(k)-B'(k))^H]= \\ diag[D(k+Q-1), \ldots, D(k), \ldots, D(k-Q+1)]$$

Using the equations (29) and (31), it follows that assuming $$B'(k)=[b'(k+Q-1)b'(k+Q-2) \ldots b'(k) \ldots b'(k-Q+1)]^T$$

$$b'(k)=[b'_n(k)b'_2(k) \ldots -f(b'_n(k)) \ldots b'_N(k)]^T$$

$$b'(k+q)=[b'_1(k+q)b'_2(k+q) \ldots -f(b'_n(k+q)) \ldots b'_N(k+q)]^T : q \neq 0,\ q=Q-1, \ldots, -Q+1$$

$D(k)$ has elements located at n-row and n-column, which are represented as follows:

$$E[(b_n(k)+f(b'_n(k)))\cdot(b_n(k)+f(b'_n(k)))^*]$$

where ( ) represents a complex conjugate. For BPSK modulation, this expression turns into the following expression:

$$E[b_n(k)^2+2b_n(k)f(b'_n(k))+f(b'_n(k))^2]=E[b_n^2(k)]+2E[b_n(k)f(b'_n(k))]+E[f(b'_n(k))^2]$$

The first term has a mean value of 1. When $b_n(k)$ is approximated by $b'(k)$, the equation (37) turns into the following form:

$$D(k)=diag[1-b'^2_1(k)\ 1-b'^2_2(k) \ldots 1-b'^2_{n-1}(k)\ 1+2E[f(b'_n(k))b'_n(k)]+E[f(b'_n(k)^2)]\ 1-b'^2_{n+1}(k) \ldots 1-b'^2_1(k)] \quad (48)$$

For example, when the equation (46) is chosen for $f(b'_n(k))$, $D(k)$ turns into the following form:

$$D(k)=diag[1-b'^2_1(k)\ 1-b'^2_2(k) \ldots 1-b'^2_{n-1}(k)\ 1+(2\alpha+\alpha^2)b'^2_n(k)\ 1-b'^2_{n+1}(k) \ldots 1-b'^2_1(k)] \quad (49)$$

Figure 7A:
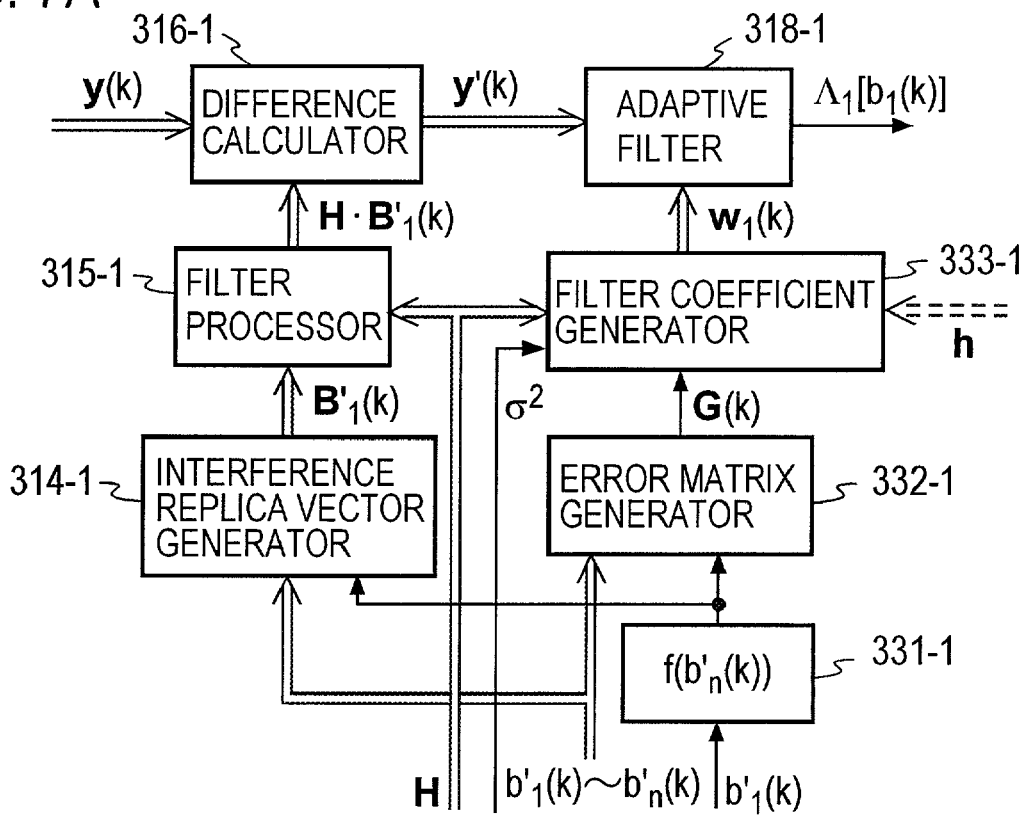
FIG. 7A is a diagram of an exemplary functional arrangement of part of the equalizer 31 according to the second aspect of the invention which reflects an error correcting decoding result of a signal being detected.

An exemplary functional arrangement which estimates an adaptive filter coefficient $w_n(k)$ when reflecting an error correction decoding result into a signal being detected is shown in FIG. 7A where a signal being detected is chosen as a transmitted signal $b_1(k)$ from a first transmitter. A soft decision transmitted symbol $b'_1(k)$ is input to a function calculator 331-1 to calculate a function $f(b'_1(k))$. Soft decision transmitted signal $b'_1(k)$ to $b'_n(k)$ from N decoders and $f(b'_1(k))$ are input to an error matrix generator 332-1 to calculate and generate an error matrix G (k) according to the equations (35), (36) and (48). The error matrix G(k), an estimated channel matrix H and noise power $\sigma^2$ are input to a filter coefficient generator 333-1 where a calculation of the equation (34) is made to estimate an adaptive filter coefficient $w_n(k)$. In this instance, $f(b'_n(k))$ is also input to an interference replica matrix generator 314-1, thus generating an interference replica matrix B'(k) represented by the equation (29) according to the equations (30) and (43). The filter coefficient $w_n(k)$ is used in filtering a difference matrix y'(k) in an adaptive filter 318-1, thus yielding a log-likelihood ratio $\Lambda_1 [b_1(k)]$. It will be noted that in the filter coefficient estimator 317-1 shown in FIG. 2, the function calculator 331-1 shown in FIG. 7A is omitted, and only the soft decision transmitted symbols $b'_1(k)$ to $b'_N(k)$ are input to the error matrix generator 332-1 in order to calculate the equation (34).

Figure 7B:
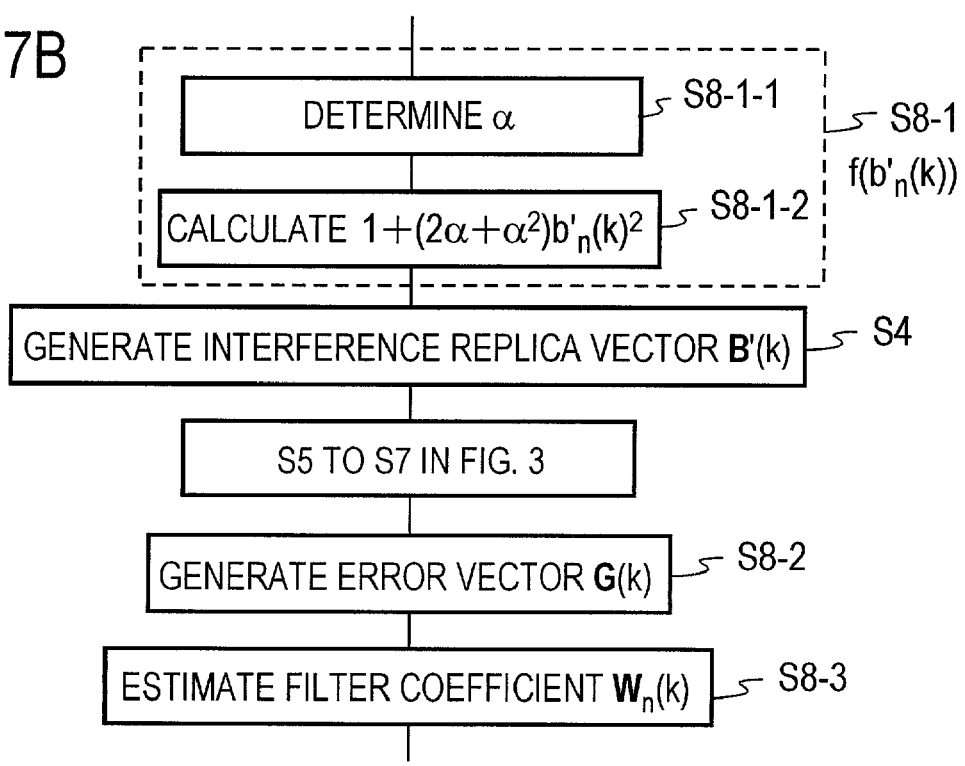
FIG. 7B is a diagram showing an exemplary processing procedure therefor.

In the flow chart of FIG. 3, the interference replica matrix B'(k) is generated at step S4, and after processings at steps S5 to S7, the filter coefficient $w_n(k)$ is determined at step S8. If a calculation of the equation (34) is made during the processing at step S8, the soft decision transmitted symbols $b'_1(k)$ to $b'_N(k)$ are used to calculate the equations (35) to (37) to generate an error matrix G(k) at step S8-2, and the error matrix G(k), the estimation channel matrix H and the noise power $\sigma^2$ are used to calculate the equation (34) to determine an adaptive filter coefficient $w_n(k)$ at step S8-3, as shown in FIG. 7B.

When it is desired to reflect an error correction decoding result in a signal being detected as mentioned previously, a soft decision transmitted symbol $b'_n(k)$ of a signal which is to be detected may be calculated at step S8-1 before entering the step S4, and this may be used at step S4 where the equation (31) is replaced by the equation (43), or in other words, the equations (29), (30) and (43) may be used to generate an interference replica matrix B' (k), and at step S8-2, the equation (37) may be replaced by the equation (48). In the event $f(b'_n(k))$ is chosen to be equal to $\alpha\, b'_n(k)$ or $\alpha\, b'_n(k)^2$ and when $\alpha$ is chosen to be variable, $\alpha$ may be determined in accordance with the number of processing operations or the reliability of the entire decoded frame at step S8-1-1, and $1+(2\alpha+\alpha^2)b'_n(k)^2$ may be calculated and used as $f(b'_n(k))$ at step S8-1-2.

The technique of reflecting an error correcting result into a signal being detected is also applicable to a single user turbo-receiver which has been described initially in connection with the prior art. In the technique of reflecting an error correcting result into a signal being detected, the approximation represented by the equations (39) and (40) can be applied, and in this instance, only a matrix h shown by the equation (38) which is supplied from the channel estimator 28 may be input to the filter coefficient generator 333-1, as indicated in broken lines in FIG. 7A.

In the above description, the adaptive filter coefficient $w_n(k)$ is determined according to the equation (34) or by using the channel matrix H, but the use for the channel matrix H can be dispensed with. Specifically, during the initial decoding processing (turbo-reception processing), the error matrix G appearing in the equation (34) becomes a unit matrix. Accordingly, the difference matrix y'(k) and the training signal either alone or in combination with a hard decision transmitted symbol $\tilde{b}_n(k)$, preferably $\tilde{b}_n(k)$ having a high reliability in the sense mentioned above are input to the filter coefficient generator 333-1 to calculate the adaptive filter coefficient $w_n(k)$ in a sequential manner by application of RLS (recursive least square) technique. Because the error matrix G depends on a discrete time k, during a second and a subsequent iteration of the decoding operation, it becomes necessary to update the adaptive filter coefficient $w_n(k)$ from symbol to symbol, and as mentioned previously, it is preferred to determine the adaptive filter coefficient $w_n(k)$ by using the channel matrix H.

Fourth Aspect of the Invention (Channel Estimation)

Using not only known information such as a unique word in the iterative channel estimation, but also using a hard decision value of information symbol, in particular one which is likely to be certain as a reference signal is applicable not only in the described multiple input multiple output turbo-reception method, but also generally to a turbo-reception method in which a channel (transmission path) of a received signal is estimated from the received signal and the known signal, the estimated channel value is used to process the received signal and to decode it, and the decoded signal is used in iterating the processing according to the estimated channel value and the decoding processing upon the same received signal.

Figure 8:
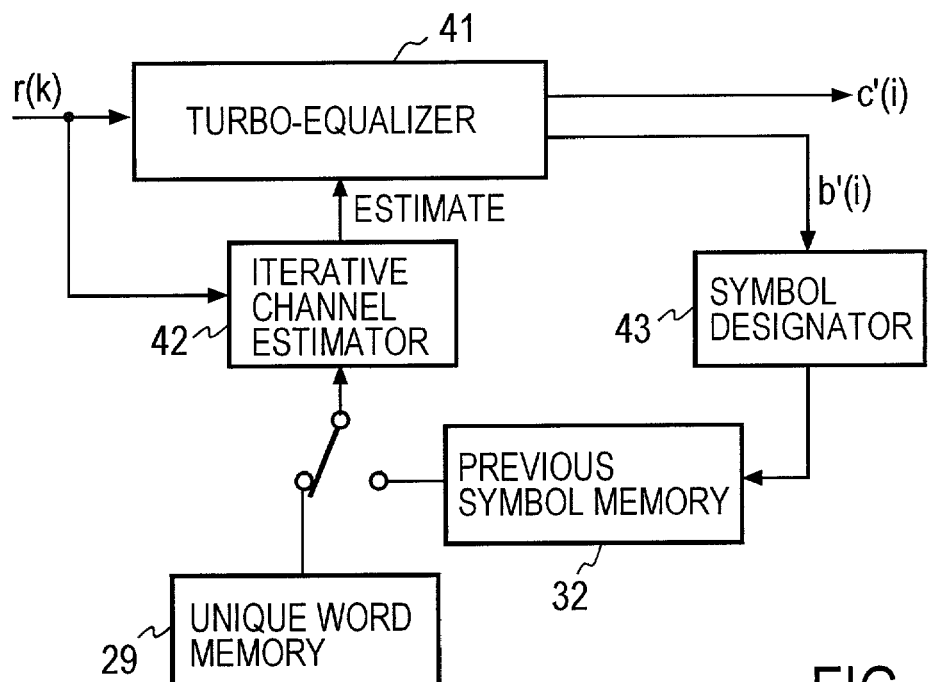
FIG. 8 is a diagram of an example of a receiver which uses a turbo-equalizer iteratively.

FIG. 8 shows an example in which a hard decision value of information symbol is used in a channel estimation turbo-equalizer 41. The turbo-equalizer 41 determines a linear equalization filter coefficient in accordance with an estimated channel value. The received signal is processed by such a linear equalization filter, the processed signal is decoded, and the decoded signal is utilized in the iterative processing of the same received signal. A received signal r(k) is input to the turbo-equalizer 41 and is also fed to a channel estimator 42 where a channel value (transmission path characteristic) is estimated on the basis of the received signal r(k) and a unique word from a memory 29. The received signal r(k) is subject to an equalization processing in the turbo-equalizer 41 in accordance with the estimated channel value, and is then subject to a decoding processing, whereby decoded data c'(i) and a soft decision value b'(i) are delivered. The soft decision value b'(i) is input to a symbol designator 43. If its soft decision value b'(i) has an absolute magnitude which is equal to or greater than a threshold, the corresponding hard decision value $\tilde{b}(i)$ is stored in a previous symbol memory 32 as one which is likely to be certain (as having a high reliability) to update it. During a subsequent iterative reception processing (equalization processing) of the same received signal r(k), the channel estimation which takes place in the channel estimator 42 takes place by using not only the unique word but also the hard decision value $\tilde{b}(i)$ of information symbol which is stored in the previous symbol memory 32.

The turbo-equalizer 41 may comprise the receiver shown in FIG. 1, for example, from which the iterative channel estimator 28, the unique word memory 29 and the previous symbol memory 32 are removed. It may comprise a receiver shown in FIG. 31. Again, a solution of the equation (19) will be in the following form according to the Wiener solution:

$$w(k)=E[y'(k)y'^{H}(k)]\cdot E[b(k)\cdot y'(k)]=[H\Lambda(k)H+\sigma^2 I]\cdot h \qquad (50)$$

where H is as defined by the equation (8), and $$h \equiv [H(Q-1), \ldots, H(0)]^T$$

where H( ) is as defined by the equation (5), $\sigma^2 = E[\|v\|^2]$ (variance of noises), and $$\Lambda(k)=diag[1-b'^2(k+Q-1), \ldots, 1, \ldots, 1-b'^2(k-Q+1)]$$

Figure 31:
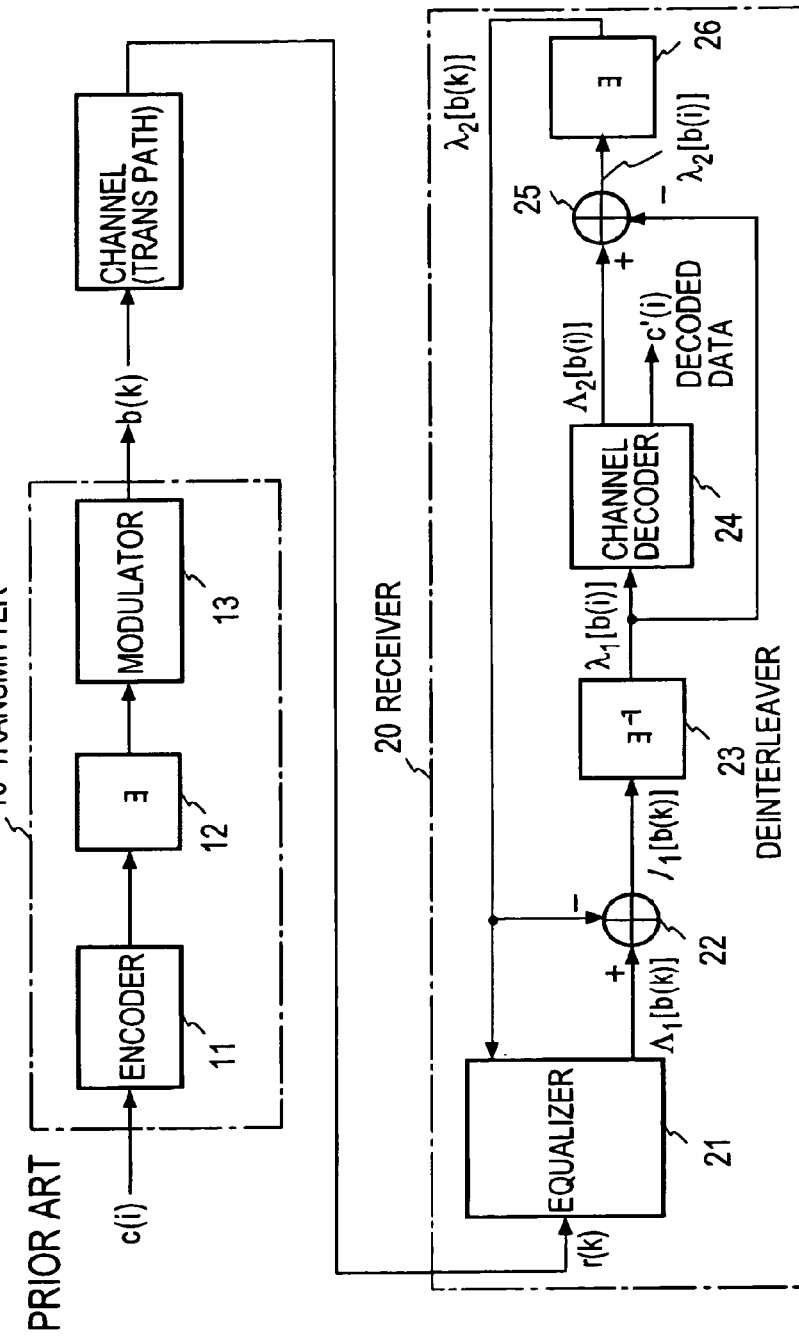
FIG. 31 is a diagram of a functional arrangement of a conventional turbo-transmitter and receiver for a single user.

In this manner, also in the receiver shown in FIG. 31, the channel matrix H( ) is estimated, and the channel matrix H ( ) is used to determine the equalization filter coefficient w(k), the received signal is filtered according to the filter coefficient w(k), and the processed output is subject a decoding processing. Accordingly, by using a hard decision information symbol of a high reliability in the channel estimation during the iterative recessive processing, there can be obtained a more correct channel estimation.

Figure 9:
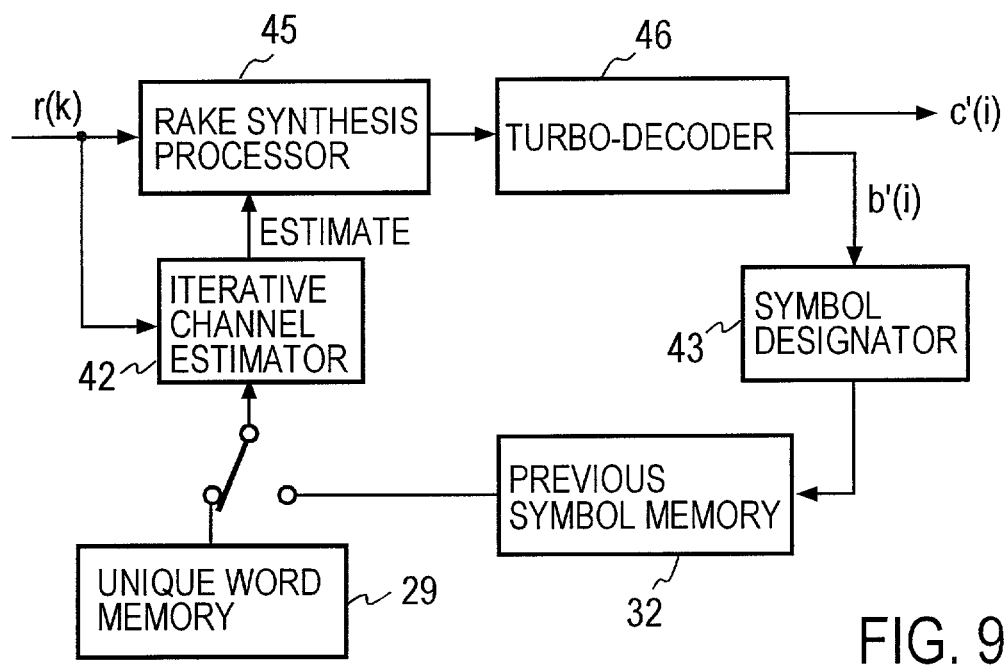
FIG. 9 is a diagram of an exemplary receiver which performs RAKE reception-turbo-decoding iteratively.

FIG. 9 shows an example of a turbo-receiver in which the iterative channel estimation method is applied in the iterative reception in which RAKE synthesis takes place. A received signal r(k) is fed to a RAKE synthesis processor 45 and a channel estimator 42. During an initial reception, a channel value is estimated on the basis of the received signal r(k) and a unique word in the channel estimator 42, and a compensation for a phase rotation which each symbols has experienced on a transmission path as well as RAKE synthesis take place in accordance with the estimated channel value in the RAKE synthesis processor 45, or a time diversity processing takes place to be delivered to a turbo-decoder 46. The turbo-decoder 46 delivers decoded data c'(i) and a soft decision value b'(i). The soft decision value b'(i) is input to a symbol designator 43, and as in described examples, a hard decision value b̂(i) of an information symbol which is likely to be certain is stored in a previous symbol memory 32 by updating it. During a second and a subsequent iterative reception processing of RAKE reception turbo-decoding, not only the unique word but also the hard decision value of information symbol which is obtained during the previous iteration are used in the channel estimator 42 for purpose of channel estimation, thereby making the channel estimation more accurate to improve the quality.

Figure 10:
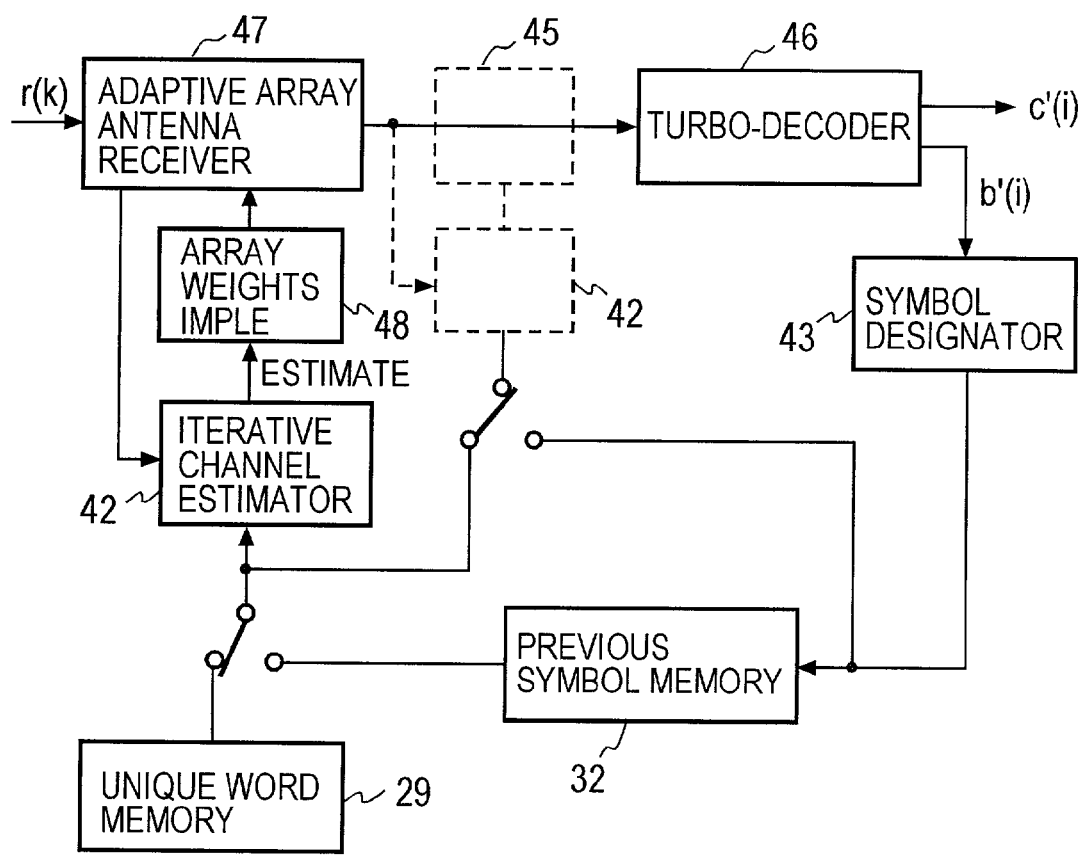
FIG. 10 is a diagram of an exemplary receiver which performs an adaptive array antenna reception-turbo-decoding iteratively.

FIG. 10 shows an example of a turbo-receiver in which the described iterative channel estimation method is applied in the iterative reception using an adaptive array antenna. A received signal r(k) is received by an adaptive array antenna receiver 47, and is then branched into a channel estimator 42 where a channel estimation takes place in accordance with the received signal in combination with a unique word. The estimated channel value is used to determine the weights to be applied to each antenna element or corresponding reception paths in an array weight determining unit so that the principal beam of the antenna directivity response of the adaptive array antenna receiver 47 is directed toward the oncoming direction of an intended wave while null is directed toward the oncoming direction of an interfering wave, and such weights are applied to applicable locations. A received output from the adaptive array antenna receiver 47 is fed to a turbo-decoder 46 to be decoded, whereby decoded data c'(i) and a soft decision value b'(i) are delivered. The soft decision value b'(i) is input to a symbol designator 43, and a hard decision value which is likely to be certain is stored in a previous symbol memory 32 by updating it. During a second and a subsequent iterative reception processing of the adaptive array antenna receiver 47-turbo-decoder 46, the hard decision value of information symbol which is obtained during the previous iteration is used in the channel estimation in the channel estimator 42 together with the unique word. In this manner, the channel estimation takes place more correctly, resulting in a more accurate control of the antenna directivity response and improving the quality.

Figure 11A:
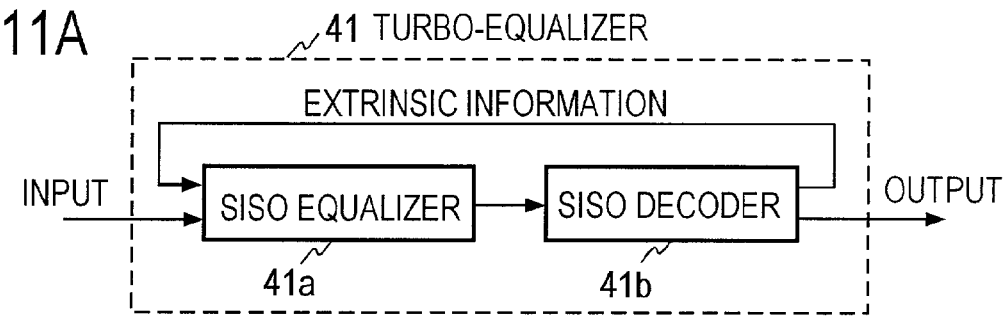
FIG. 11A is a schematic view of a turbo-equalizer.
Figure 11B:
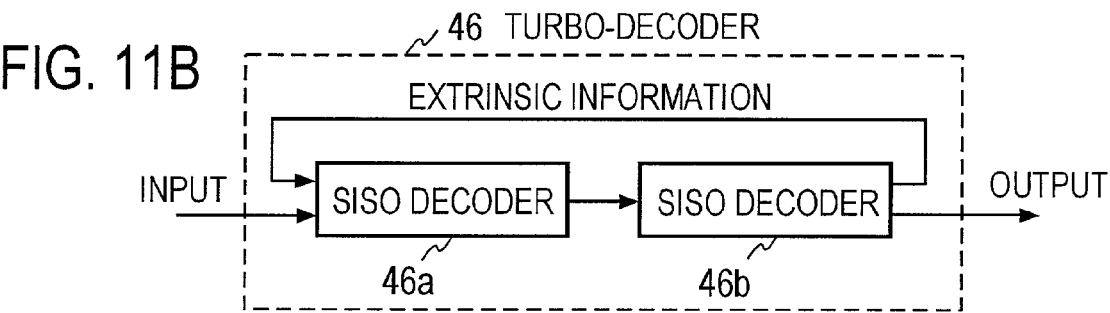
FIG. 11B is a schematic view of a turbo-decoder.

The turbo-equalizer 41 shown in FIG. 8 is schematically shown in FIG. 11A, and as shown, it comprises a series connection of a soft input soft output (SISO) equalizer 41a and an SISO decoder 41b, and the operation iterates between the equalizer 41a and the decoder 41b. The turbo-decoder 46 shown in FIGS. 9 and 10 is schematically shown in FIG. 11B, and as shown, it comprises a series connection of a SISO decoder 46a and an SISO decoder 46b, and an iterative decoding operation takes place between the decoders 46a and 46b. The turbo-decoder 46 shown in FIGS. 9 and 10 may comprise a single SISO decoder.

Figure 12:
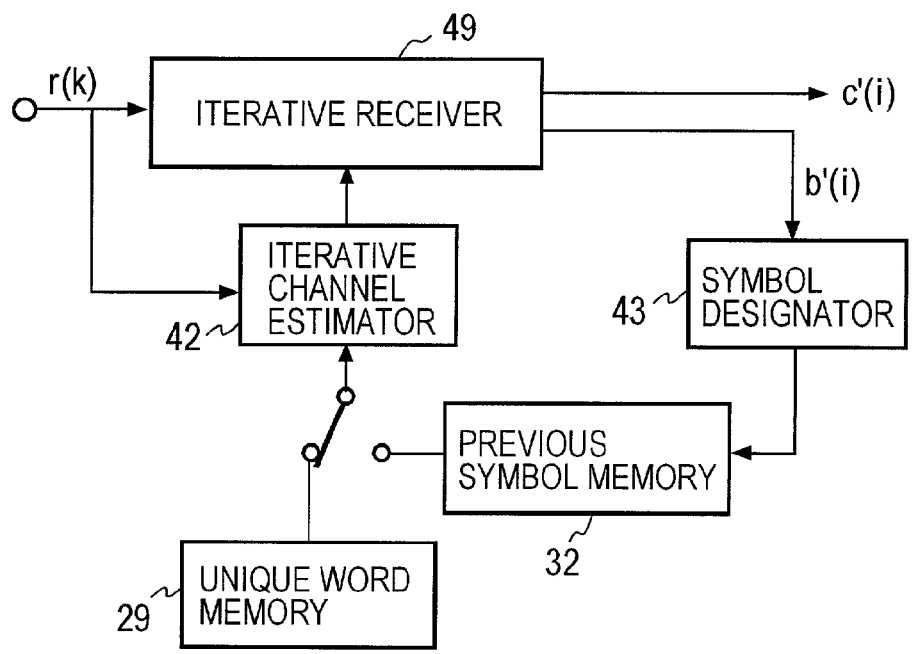
FIG. 12 is a schematic view of a receiver which iterates a processing of a received signal using an estimated channel and a decoding processing of the processed signal.

The examples shown in FIGS. 8 to 10 are collectively illustrated in FIG. 12. Thus, a received signal is initially processed in an iterative receiver (turbo-receiver) 49 in accordance with a channel value which is estimated by a channel estimator 42, the processed signal is decoded, and a result of the decoding operation is provided in the form of decoded data (symbol) c'(i) and its soft decision value b'(i). The soft decision value b'(i) is compared against a threshold value in a symbol designator 43 to determine whether or not a corresponding decoded data c'(i) (symbol hard decision value) is likely to be certain. If it is determined to be likely to be certain, the hard decision value is stored in a previous symbol memory 32 by updating it, and during a second and a subsequent iteration of the processing using the estimated channel value and the decoding processing, the symbol hard decision value obtained during the previous iteration is used in addition to known information such as unique word in the channel estimation which takes place in the channel estimator 42 to provide a more correct channel estimation.

Figure 13:
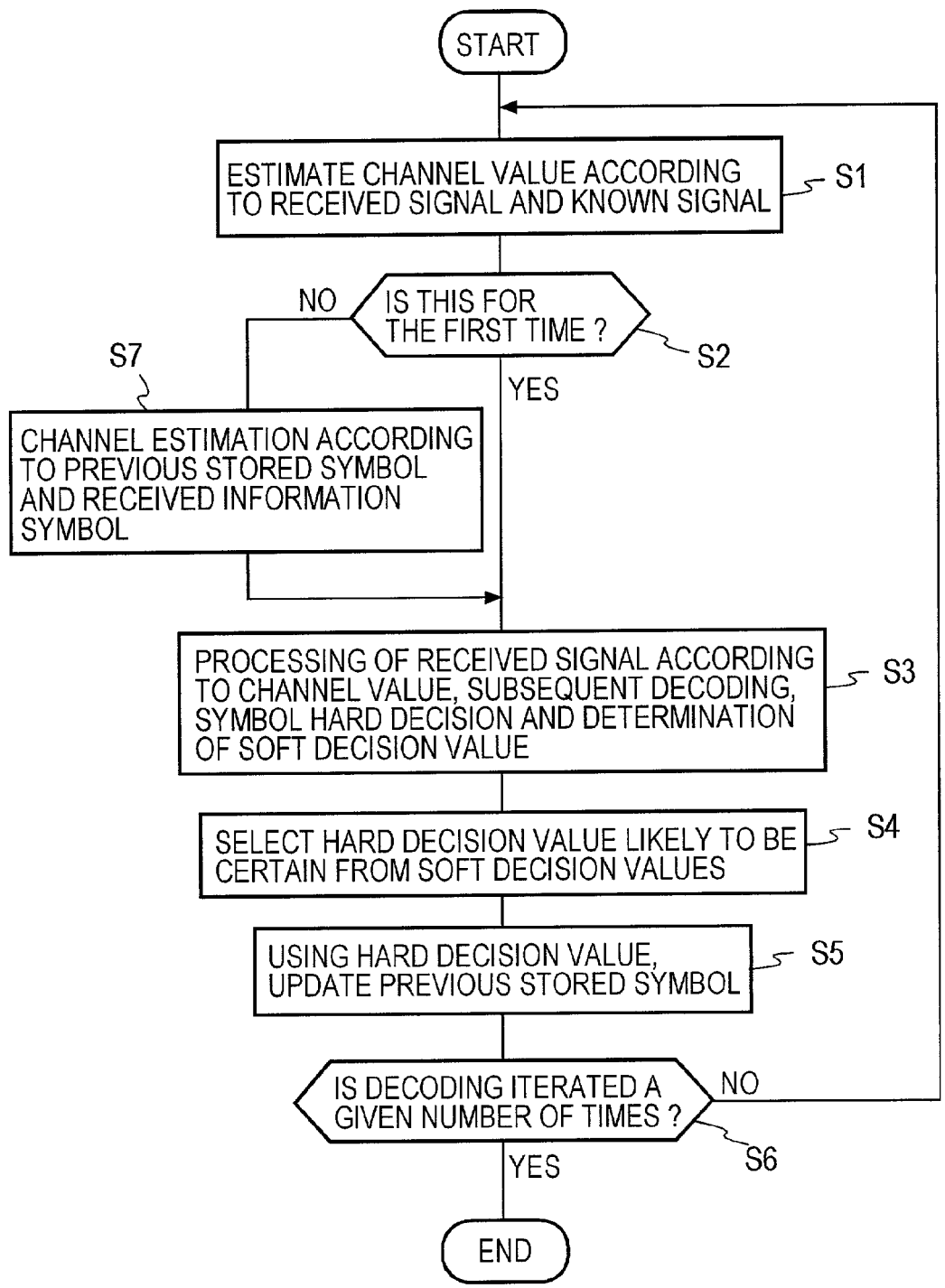
FIG. 13 is a flow chart of an exemplary processing procedure of a reception method which iterates a processing of a received signal using an estimated channel and a decoding processing of the processed signal.

FIG. 13 shows an exemplary processing procedure of an iterative turbo-reception method which also uses a symbol hard decision value. At step S1, a channel value is estimated on the basis of a received signal and a known signal. At step 2, an examination is made to see if this is the first one of the iterative processing, and if it is, the channel value which is estimated at step S1 is used to process the received signal at step S3, and then the decoding processing takes place to determine a symbol hard decision value and a soft decision value. At step S4, a symbol hard decision value which corresponds to the symbol soft decision value and which is likely to be certain is extracted, and at step S5, the extracted symbol hard decision value is used to update a previous symbol hard decision value which is stored in the memory 32. At a step S6, an examination is made to see if the number of decoding processings has reached a given number, and if not, the operation returns to step S1. When it is found at step S2 that the iterative processing is not for the first time, a previous symbol hard decision value is read out from the memory 32 at step S7, and it is used together with an information symbol of a received signal in performing a channel estimation, whereupon the operation transfers to step S3.

Again, as mentioned previously in connection with steps S1' to S4' with reference to FIG. 6, the known signal may not be used during a second and a subsequent iteration.

In the example shown in FIG. 10, RAKE synthesis processor 45 may be inserted between the adaptive array antenna receiver 47 and the turbo-decoder 46, as indicated by broken lines. In this instance, a channel estimation which is necessary for the compensation of a phase rotation of each symbol and the RAKE synthesis in the RAKE synthesis processor 45 may be served by the channel estimator 42, or may take place separately.

Noise Other Than White Gaussian Noise

In the embodiment of the turbo-reception method (according to the first aspect of the invention), the embodiment according to the second aspect of the invention which takes an error correction into consideration and the embodiment of the turbo-reception method characterized in its channel estimation method (according to the fourth aspect of the invention), the processing took place on an assumption that the noise is white Gaussian noise. Specifically, $v_m(k)$ appearing on the right side of the equation (29) indicating a received signal $r_m(k)$ from each antenna is assumed to be white Gaussian noise. What is meant by white Gaussian noise is a signal which follows the Gaussian distribution and have statistical features expressed as follows:

$$E[v_m(k) \cdot v_m(k-q)] = \begin{cases} \sigma^2 & \text{for } q = 0 \\ 0 & \text{for } q \neq 0 \end{cases}$$

where E[ ] represents an expected value and $\sigma^2$ a variance. White Gaussian noise may be exemplified by thermal noise which is generated in an antenna element. What is influenced by the assumption of white Gaussian noise is $\sigma^2$ I portion appearing in the equation (34) which determines the filter coefficient $w_n(k)$ or the equation (50) which determines the filter coefficient $w_n(k)$. For example, $w_n(k)$ appearing in the equation (34) is calculated through the process indicated below.

$$w_n(k) = (HG(k)H^H + E[n(k) \cdot n^H(k)])^{-1}h = (HG(k)H^H + \sigma^2 I)^{-1}h$$

where $v_m(k)$ is calculated as $E[n(k) \cdot n^H(k)] = \sigma^2 I$ by the assumption of the white Gaussian noise having a variance $\sigma^2$. The channel matrix H which is estimated by the iterative channel estimator 28 (FIG. 1) or 42 (FIG. 12), $\sigma^2$ and the error matrix G(k) which is calculated on the basis of the a priori log-likelihood value are substituted into the equation (34) to calculate the filter coefficient $w_n(k)$.

When the noise $v_m(k)$ is not white Gaussian noise, $E[n(k) \cdot n^H(k)] = \sigma^2 I$ does not apply. Accordingly, in order to calculate the filter coefficient $w_n(k)$, it is necessary to estimate an expected value (covariance) matrix $E[n(k) \cdot n^H(k)]$ for the noise component by a separated method. Such method will now be described. A covariance matrix for the noise component will be abbreviated as $U \equiv E[n(k) \cdot n^H(k)]$. $y(k) = H \cdot B(k) + n(k)$ in the equation (22) is modified into $n(k) = y(k) - H \cdot B(k)$ and is substituted into the covariance matrix U, as indicated below.

$$U = E[n(k) \cdot n^H(k)] = E[(y(k) - H \cdot B(k)) \cdot (y(k) - H \cdot B(k))^H]$$

If we can assume that a matrix y(k) is available from a received signal, an estimate Ĥ of a channel matrix H from the channel estimate and B(k) is available from a reference signal, it is possible to estimate the matrix U according to the time average method as follows:

$$\hat{U} = \Sigma_{k=0}^{T_r} (y(k) - \hat{H} \cdot B(k)) \cdot (y(k) - \hat{H} \cdot B(k))^H \quad (51)$$

where Tr represents the number of reference symbols.

Figure 14A:
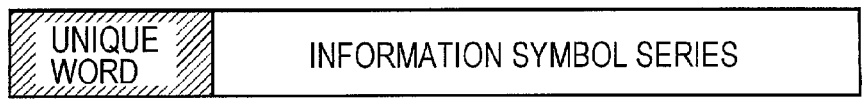
FIG. 14A is a diagram of an exemplary frame arrangement.
Figure 14B:
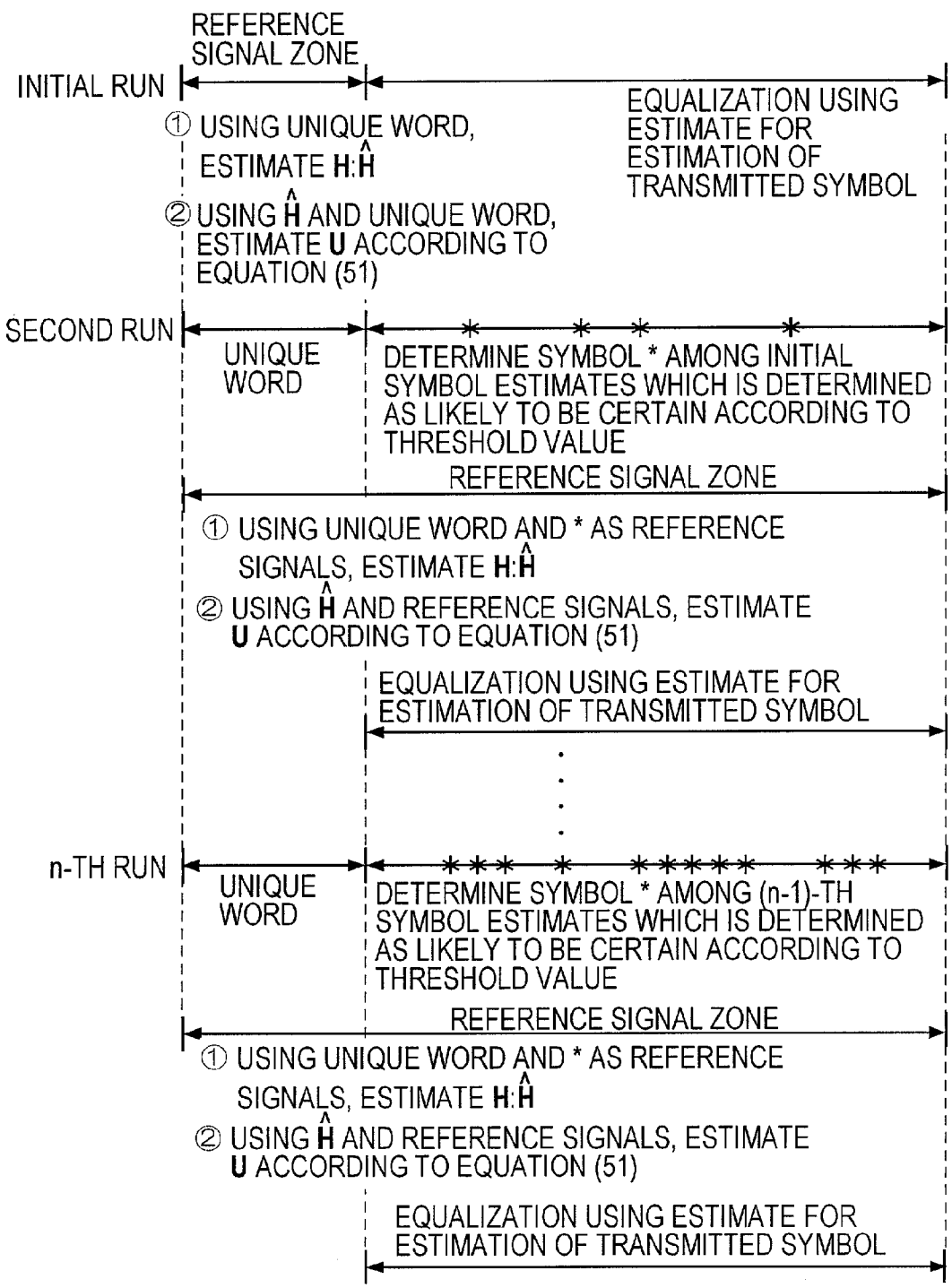
FIG. 14B is a schematic illustration of an iterative processing of an estimation of a channel H and a noise covariance matrix U when a received signal contains noises other than white Gaussian noise.

During an iterative channel estimation which takes place in the iterative channel estimator 28 or 42, the covariance matrix Û is estimated using the channel matrix H together with the equation (51). A procedure therefor is illustrated in FIG. 14. FIG. 14A shows a unique word and information symbol series which occurs in one frame of a received signal, and FIG. 14B shows the initial processing as well as a subsequent processing. During the initial processing, only the unique word is used as a reference signal, initially estimating the channel matrix H. Subsequently, U is estimated using the unique word and the channel matrix estimate Ĥ according to the equation (51). Using the estimate U and Ĥ, the filter coefficient $w_n(k)$ is calculated as follows:

$$w_n(k) = (\hat{H}G(k)\hat{H}^H + \hat{U})^{-1}h \quad (52)$$

and the filter coefficient $w_n(k)$ is used to apply a first equalization upon the received signal, thus estimating transmitted information symbol.

During a second iteration, the unique word as well as one of information signals (*) estimated during the initial equalization which is determined to be likely to be certain according to the threshold value are both used as reference signals to estimate H again with the same procedure as used during the initial processing, thus estimating U again. As this operation is repeated, the channel matrix estimate Ĥ becomes more accurate with the iteration, and the estimate of U becomes more accurate, thus improving the accuracy of the filter coefficient $w_n(k)$ to improve the response of the equalizer.

In this manner, a turbo-reception when a noise other than white Gaussian noise is contained in a received signal is made possible.

Figure 15:
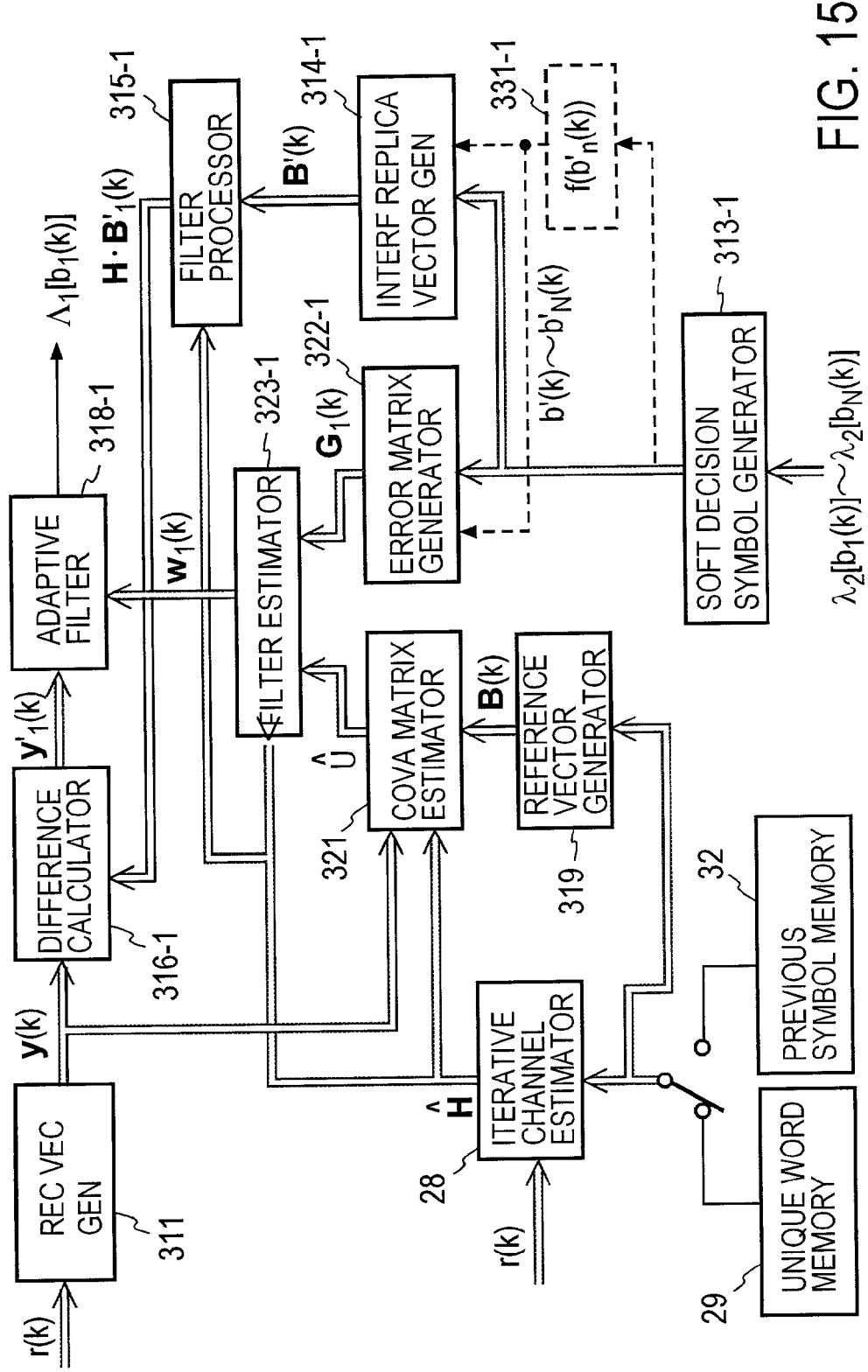
FIG. 15 is a schematic view of an exemplary functional arrangement of part of an equalizer which is used in the estimation of the noise covariance matrix U.

A functional arrangement in which a linear equalization is performed by estimating a covariance matrix U of a noise contained in a received signal is shown in FIG. 15 as an example in which a log-likelihood ratio $\Lambda_1 [b_1(k)]$ is obtained as an equalization output from a multiple output equalizer 31 shown in FIG. 2 for a received signal corresponding to a transmitted signal from a first transmitter. Parts corresponding to those shown in FIG. 2 are designated by like reference numerals in FIG. 15 as used in FIG. 2.

A unique word from a unique word memory 29 or a previous symbol hard decision from a previous symbol memory 32 which is likely to be certain is input to a reference matrix generator 319, which then generates a reference matrix B(k) according to the equations (25) and (26). The reference matrix B(k), an estimation channel matrix Ĥ from a channel estimator 28, and a received matrix y (k) from a received matrix generator 311 are supplied to a covariance matrix estimator 321, which then calculates the equation (51) to obtain an estimated matrix Û for a covariance matrix U.

Soft decision transmitted symbols $b_1'(k), \ldots, b_n'(k)$ from a soft decision symbol generator 313-1 are input to an error matrix generator 322-1, where an error matrix $G_1(k)$ corresponding to the square error of the channel estimation is generated according to the equations (35), (36) and (37). The error matrix $G_1(k)$, the estimated covariance matrix Û and the estimatied channel matrix Ĥ are supplied to a filter estimator 323-1, where the equation (52) is calculated to estimate a filter coefficient $w_1(k)$. The filter coefficient $w_1(k)$ and the difference matrix y'(k) from a difference calculator 316-1 are fed to an adaptive filter 318-1 where a filter processing $w_1(k)^H y'(k)$ is applied to y'(k), and its result is delivered as a log-likelihood ratio $\Lambda_1 [b_1(k)]$.

When reflecting an error correction recording result into a signal being detected, a function calculator 331-1 as shown in FIG. 7A is provided, as indicated by broken lines in FIG. 15, to calculate $f(b'_n(k))$, and an interference replica matrix generator 314-1 uses the equation (43) rather than the equation (31), and a error matrix generator 322-1 uses the equation (48) rather than the equation (37).

Figure 16:
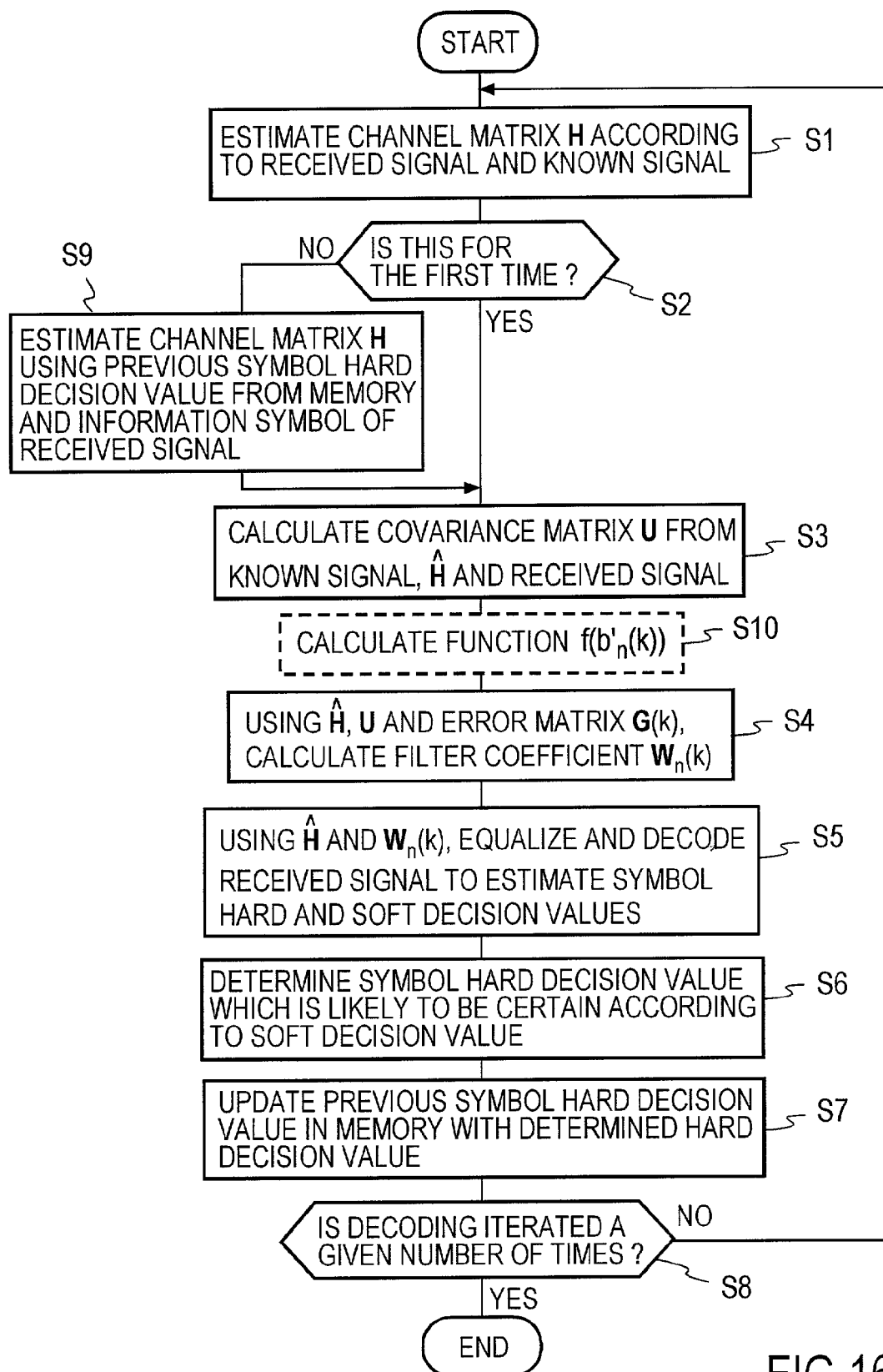
FIG. 16 is a flow chart of an exemplary processing procedure which iterates the estimation of a channel value used in the estimation of the noise covariance matrix U and the decoding processing.

The procedure shown in FIG. 14B is shown as a flow chart in FIG. 16. Specifically, at step S1, a received signal r(k) and a known signal (for example, a unique word) are used to estimate a channel matrix H, and at step S2, an examination is made to see if this processing is for the first time, and if it is, the known signal, the estimated channel matrix Ĥ and the received signal r(k) are used to calculate the equation (51) to determine an estimated covariance matrix Û at step S3.

At step S4, the estimated channel matrix Ĥ, the estimated covariance matrix Û and an error matrix G(k) which comprises symbol soft decision values are used to calculate the equation (52) to estimate a filter coefficient $w_n(k)$.

At step S5, the estimated channel matrix $\hat{H}$ and the filter coefficient $w_n(k)$ are used to equalize the received signal or to calculate the equation (27) to determine $w_n^H(k) \cdot y'(k)$ to obtain a log-likelihood ratio $\Lambda_1 [b_n(k)]$, subsequently performing a decoding process to estimate a hard decision value and a soft decision value of a transmitted symbol.

Purpose of step S6 is to determine a symbol hard decision value which corresponds to a symbol soft decision value which exceeds a threshold value and which is likely to be certain (or having a high reliability). This symbol hard decision value is used to update a symbol hard decision value which is stored in a previous symbol memory 32. Subsequently, an examination is made at step S8 to see if the number of the decoding processings has reached a given value, and if not, the operation returns to step S1. However, if a given number is reached, the processing upon this received frame is completed.

If it is found at step S2 that the iterative processing is not for the first time, namely, for a second or a subsequent iteration, a symbol hard decision value is read from the previous symbol memory 32 at step S9, and is used together with information symbol in the received signal to estimate the channel matrix H, subsequently transferring to step S3.

Again, by changing the steps S1 and S2 in the similar manner as steps S1' to S4' shown in broken lines in FIG. 6, it is possible to avoid the use of the known signal during a second and a subsequent iteration. When it is desired to reflect an error correction recording result into a signal being detected, a function $f(b'_n(k))$ may be calculated at step S10, as shown in broken lines in FIG. 16, and it may be used to obtain the error matrix G(k). In either instance, the hard decision transmit symbol may not be used in the estimation of the covariance matrix $\hat{U}$. The capability to estimate a covariance matrix U of a noise contained in a received signal which is other than white Gaussian noise is applicable to a variety of useful purposes, as will be described below.

Figure 30A:
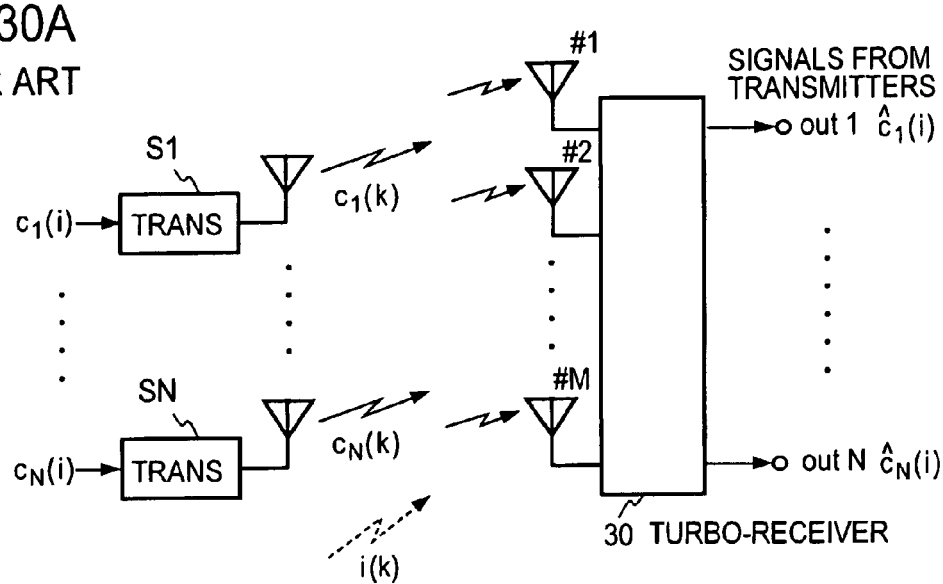
FIG. 30A is a diagram illustrating the concept of a MIMO system.

(1) A reception method for a multiple series transmitted signal containing an unknown interfering signal is cited. As shown in FIG. 30A, it is assumed that an interfering signal i(k) which is unknown to a turbo-receiver such as signals from other cells or zones in a mobile communication, for example, to be received by the turbo-receiver in addition to N series transmitted signal as may be transmitted from N user transmitters. In this instance, the equation (20) can be written into the following form:

$$r_m(k) = \Sigma_{q=0}^{Q-1} \Sigma_{n=1}^{N} h_{mn}(q) \cdot b_n(k-q) + i(k) + v_m(k) \quad (20)'$$

In this model, putting $i(k) + v_m(k) \equiv v'_m(k)$, we have $$r_m(k) = \Sigma_{q=0}^{Q-1} \Sigma_{n=1}^{N} h_{mn}(q) \cdot b_n(k-q) + v'_m(k) \quad (20)''$$

Treating $v'_m(k)$ as a noise signal other than white Gaussian noise, H and U are estimated in a manner mentioned previously, and $w_n(k)$ is estimated, and a turbo-reception can be made by iterating an equalization of a received signal and an estimation of transmitted symbols.

(2) In a communication system which employs a transmission/reception separation filter, when an oversampling of a received signal is made at a higher rate than a symbol period, there occurs a correlation between noise components which are contained in received signals which are sampled at individual times, and this prevents the noises in the received signals from being treated as white Gaussian noise. In other words, the equation (20) does not apply. Accordingly, an assumption represented as $$E[n(k) \cdot n^H(k)] = \sigma^2 I$$

does not hold. A processing upon a received signal which is separated by the transmission/reception separation filter may utilize equation (51) to determine a covariance matrix U, thereby allowing the received signal to be properly processed.

(3) In the described turbo-reception method, the arrangement is such that every multipath component from each transmitter (user) on Q paths are synthesized. However, in the event there exists a prolonged delay wave on channels (for example, assume that paths include one symbol delay, two symbol delay and three symbol delay path and there exist separately a thirty symbol delay path: in this instance, the thirty symbol delay path component is treat as a prolonged delay wave), it is possible to prevent the prolonged delay wave from being synthesized, but to treat it as an unknown interference which can be eliminated by an adaptive filter. When the prolonged delay wave component is treated as the interfering signal i(k) in the example according to the first aspect of the invention (1), it may be eliminated.

In the processing of a received signal containing a noise other than white Gaussian noise, the estimation of the covariance matrix U is applicable to a single user turbo-reception method by allowing it to serve in place of $\sigma^2$ I in the equation (50). In a similar manner, it may be used in a RAKE synthesis processing reception illustrated in FIG. 9 or a turbo-reception using an adaptive array antenna reception shown in FIG. 10, irrespective of a single user or multi-user application, or more generally, in a channel estimation in a channel estimator 42 and an estimation of the covariance matrix U during the iterative decoding operation shown in FIG. 12. For RAKE reception, only the channel estimation may be used.

Third Aspect of the Invention (Multistage Equalization)

Figure 17:
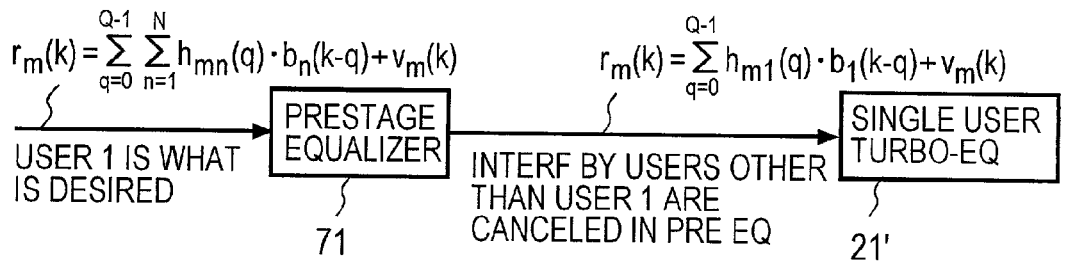
FIG. 17 is a diagram showing the principle of a turbo-receiver according to a third aspect of the present invention.

In the forgoing description, received signals $r_1, \ldots, r_M$ are equalized in a multiple output equalizer 31 to determine log-likelihood ratios $\Lambda_1[b(k)], \ldots, \Lambda_N[b(k)]$, but in a modification (21313) of the first aspect of the present invention, there are provided a plurality of equalizer stages in cascade connection in a manner such that the number of outputs is reduced toward a later stage equalizer. By way of example, FIG. 17 shows that the equalizer is divided in two parts where a prestage equalizer (multi-user equalizer) 71 cancels an interfering component which is located outside an equalization range of a poststage, single user equalizer 21'. At this end, a preprocessing including a soft interference cancel and a linear filtering according to MMSE(minimum mean square error) criteria, for example, is made, and subsequently, the poststage equalizer 21' performs an equalization of a single user having a number of paths equal to Q.

Even when an equalization takes place in a cascade manner and a linear filter is used in a prestage processing, it is possible to prevent the quantity of calculation from increasing prohibitively.

Figure 18:
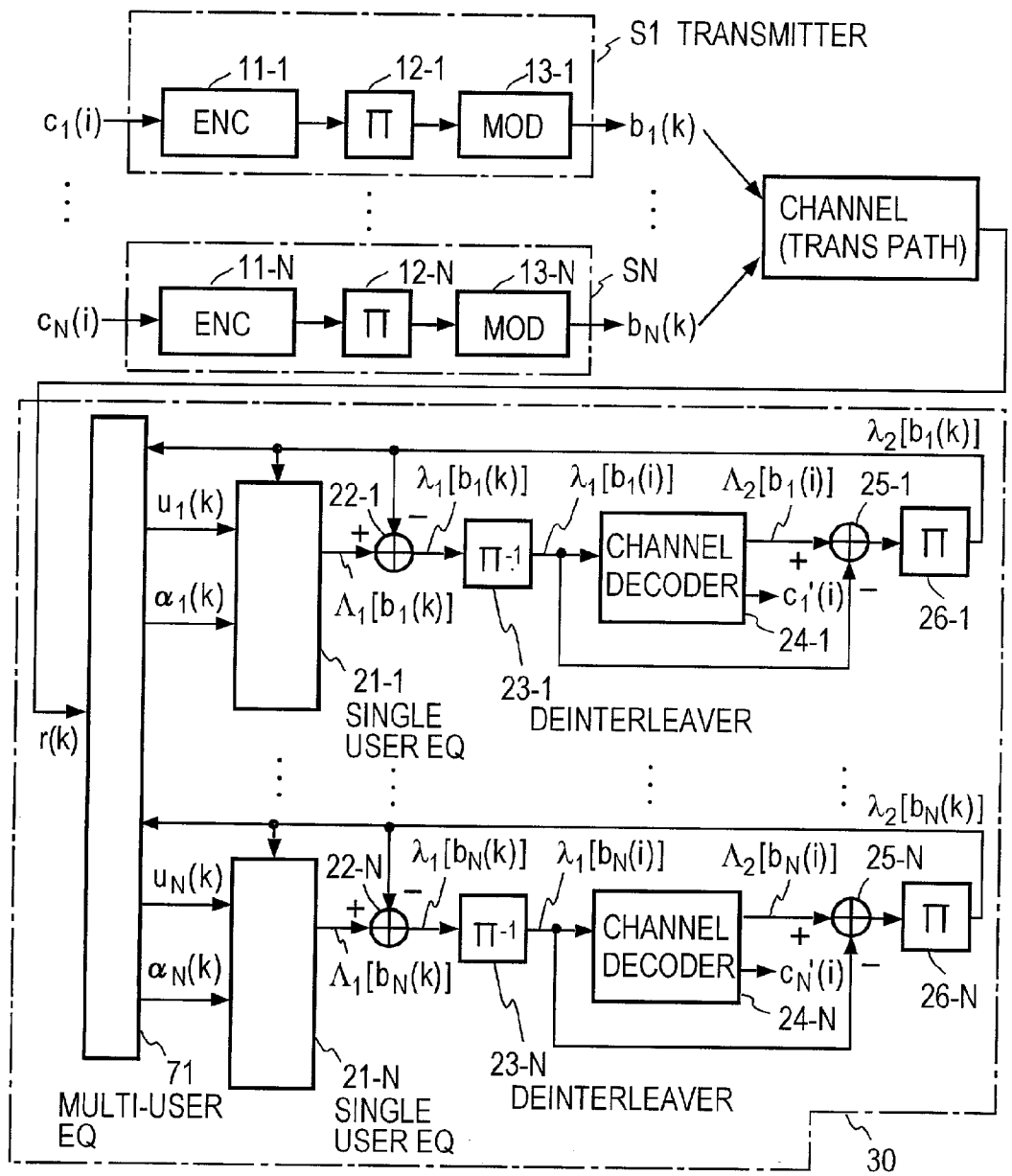
FIG. 18 is a diagram of an exemplary functional arrangement of a turbo-receiver according to the third aspect of the present invention.

An arrangement of a multiple output turbo-receiver according to an embodiment which is based on this fundamental concept of the first aspect of the invention (2) of the turbo-reception method and an exemplary arrangement of MIMO system which incorporates the present invention is shown in FIG. 18. It is to be understood that parts corresponding to those shown in FIG. 1 are designated by like reference characters as used before, without repeating their description. (The same holds true in subsequent description.)

Transmitted signals from each transmitter is received through transmission paths (channels) by a turbo-receiver 30. The received signal r(k) is input to a multi-user equalizer 71, from which signals from N transmitters are delivered in the form of signals $u_1(k), \ldots, u_N(k)$, each of which is provided in the form it is free from interferences by signals from other transmitters, and channel values $\alpha_1(k), \ldots, \alpha_N(k)$ to be input to single user equalizers 21-1, ..., 21-N. These SISO equalizers 21-1, ..., 21-N deliver log-likelihood ratios $\Lambda_1 [b_1(k)], \ldots, \Lambda_1 [b_N(k)]$. Subsequent processing remains similar to FIG. 1. However, the channel values $\alpha_1(k), \ldots, \alpha_N(k)$ which are used in the single user equalizers 21-1, ..., 21-N are channel values which are obtained subsequent to the multi-user equalization, and are distinct from the channel matrix H. Accordingly, $\alpha_1(k), \ldots, \alpha_N(k)$ are referred to as post-equalization channel information.

The operation will now be described more specifically.

Equations (23) to (26) are defined in a similar manner as described above in connection with FIG. 1 in consideration of the number of multipaths (channels) Q.

The purpose of the poststage equalizers 21-1, ..., 21-N shown in FIG. 18 is to equalize intersymbol interference channels by signal symbols of respective users themselves $[b_n(k), b_n(k-1), \ldots, b_n(K-Q+1)]$ (where $n=1, \ldots, N$). At this end, the prestage equalizer 71 operates to eliminate interferences other than $[b_n(k), b_n(k-1), \ldots, b_n(K-Q+1)]$ (where $n=1, \ldots, N$) within $y(k)$. This will be discussed below more quantitatively.

Initially, using the a priori information $\lambda_2^P [b_n(k)]$ (where $n=1, \ldots, N$) of the equalizer 71 which is fed back from the decoders 24-1, ..., 24-N, a soft decision transmitted symbol estimate $b'(k)$ is determined according to the equation (15).

This soft decision transmitted symbol $b'_n(k)$ and a channel matrix H are used to generate a replica $H \cdot B'(k)$ of an interfering signal, which is then subtracted from the received matrix $y(k)$.

$$y'_n(k) \equiv y(k) - H \cdot B'(k) \quad (27)'$$

$$= H \cdot (B(k) - B'(k)) + n(k) \quad (28)'$$

where $$B'(k) = [b'^T(k+Q-1) \ldots b'^T(k) \ldots b'^T(k-Q+1)]^T \quad (29)'$$

$$b'(k+q) = [b'_1(k+q) b'_2(k+q) \ldots b'_n(k+q) \ldots b'_N(k+q)]^T : q = Q-1, \ldots, 1 \quad (53)$$

$$b'(k+q) = [b'_1(k+q) b'_2(k+q) \ldots 0 \ldots b'_N(k+q)]^T : q = 0, \ldots, -Q+1 \quad (54)$$

it being noted that $b'(k+q)$ has a zero element at n-th position.

The operation of subtracting the interference in this manner will be referred to hereafter as a soft interference cancel. Assuming that a replica of the interfering signal is generated in an ideal manner, it will be seen that $y'_n(k)$ resulting from the subtraction can have only the symbol $b_n(k)$ of the n-th user and an intersymbol interference component caused by the symbol $[b_n(k-1), \ldots, b_n(k-Q+1)]$ of the n-th user itself which results from putting the n-th element of $b'(k+q)$ equal to 0 for $q=1, \ldots, -Q+1$ in the equation (54).

In effect, a contribution from the signal of the n-th user (transmitter) to the received matrix $r(k)$ is only that resulting that from the symbol $[b_n(k), b_n(k-1), \ldots, b_n(k-Q+1)]$. However, it will be understood from the definition of the received matrix $y(k)$ given by the equation (21) that a contribution from the signal of the n-th user (transmitter) within the received matrix $y(k)$ which results as synthesis of the multipaths will contain, when based on the k-th symbol $b_n(k)$, intersymbol interference components caused by future symbols $[b_n(k+Q-1), b_n(k+Q-2), \ldots, b_n(k+1)]$. Thus, the interference replica includes interference components from the future symbols. In this respect, the difference matrix $y'(k)$ defined by the equation (27)' is distinct from the difference matrix $y'(k)$ defined by the equation (27).

Accordingly, a next step in the prestage processing in the equalizer 71 is to eliminate the residue interference which remains after the soft interference cancel, namely, a residual interference component which results from an imperfect synthesis of the interference replica $H \cdot B'(k)$ and interference components between future symbols from $y'_n(k)$ using MMSE (minimum mean square error) criteria linear filter. In other words, this elimination takes place by an arrangement such that a filtering of $y'_n(k)$ using the filter characteristic $w_n(k)$ as indicated by the equation (55) is equal to a sum of the symbols $[b_n(k), b_n(k-1), \ldots, b_n(K-Q+1)]$ each multiplied by channel values $\alpha_{1n}(k), \alpha_{2n}(k), \ldots, \alpha_{Qn}(k)$.

$$w_n^H(k) \cdot y'_n(k) \approx \Sigma_{q=0}^{Q-1} \alpha_q(k) \cdot b_n(k-q) = \alpha_n^H(k) \cdot b_n(k) \quad (55)$$

Accordingly, what is required is to calculate the equation (55) by determining the filter characteristic $w_n(k)$ and the post-equalization channel value (channel information) $\alpha_n(k)$. The derivation of $w_n(k)$ and $\alpha_n(k)$ will be described. It is to be noted that while the filter characteristic $w_n(k)$ is distinct from the filter coefficient $w_n(k)$ given by the equations (32) and (34), similar denotations will be used for purpose of convenience.

Desired solutions are defined as solutions of the following optimization problem:

$$(w_n(k), \alpha_n(k)) = \arg \min \|w_n^H(k) \cdot y'_n(k) - \alpha_n^H(k) \cdot b_n(k)\|^2 \quad (56)$$

provided $\alpha_{1n}(k) = 1$.

In other words, $w_n(k)$ and $\alpha_n(k)$ which minimizes the right side of the equation (56) are determined. The constraint requirement $\alpha_{1n}(k) = 1$ is added in order to avoid solutions which result in $\alpha_n(k) = 0$ and $w_n(k) = 0$. While solutions can be obtained under the constraint requirement, $$\|\alpha_n(k)\|^2 = 1$$

a solution for $\alpha_{1n}(k) = 1$ will be described below herein. For brevity, the problem will be redefined. Namely, the right side of the equation (56) is defined as $m_n(k)$ which is minimized in terms of $w$ and $\alpha$.

$$m_n(k) = \arg \min \|m_n^H(k) \cdot z_n(k)\|^2 \quad (57)$$

provided $m_n^H(k) \cdot e_{MQ+1} = -1$ (which is equivalent to $\alpha_{1n}(k) = 1$) and where $$m_n(k) \equiv [w_n^T(k), -\alpha_n(k)^T]^T \quad (58)$$

$$z_n(k) \equiv [y_n^T(k), b(k)_n^T]^T \quad (59)$$

$$e_{MQ+1} = [0 \ldots 1 \ldots 0]^T \quad (60)$$

it being understood that $e_{MQ+1}$ has "1" element at (MQ+1-th position).

A solution of the optimization problem is given as follows according to Lagrange's method of indeterminate coefficients described in literature [2], S. Haykin, Adaptive Filter Theory, Prentice Hall, pp. 220–227;

$$m_n(k) = -R_{ZZ}^{-1} \cdot e_{MQ+1} / (e_{MQ+1}^H \cdot R_{ZZ}^{-1} \cdot e_{MQ+1}) \quad (61)$$

where $$R_{ZZ} = E[z_n(k) \cdot z_n^H(k)] \quad (62)$$

E[A] representing an expected value (a mean value) of A.

$$= E\begin{bmatrix} H \cdot \Lambda_n(k) \cdot H^H + \sigma^2 I & H_n^H \\ H_n & I \end{bmatrix} \quad (63)$$

$$\Lambda_n(k) = diag[D_n(k+Q-1), \ldots, D_n(k), \ldots, D_n(k-Q+1)] \quad (64)$$

where I represents a unit matrix, and $\sigma^2$ noise power (a covariance of white Gaussian noise).

$$H_n \equiv \begin{bmatrix} h_{n(Q-1)} & 0 & 0 & 0 \\ h_{n(Q-2)} & h_{n(Q-1)} & 0 & 0 \\ \vdots & \vdots & \ddots & \vdots \\ h_{n(0)} & h_{n(1)} & \cdots & h_{n(Q-1)} \end{bmatrix} \quad (65)$$

$$D_n(k+q) = diag[1-b'^2{}_1(k+q), \ldots, 1-b'^2{}_n(k+q), \ldots,$$
$$1-b'^2{}_N k+q]] : q = Q+1, \ldots, 1 \quad (66)$$

$$D_n(k+q) = diag [1-b'^2{}_1(k+q), \ldots, 1, \ldots, 1-b'^2{}_N(k+q)] : q = 0, \ldots, -Q+1 \quad (67)$$

where diag represents a diagonal matrix (all elements other than those located along the diagonal of the matrix being zeros). Thus, if the channel matrix H and $\sigma^2$ are known, $m_n(k)$ can be determined according to the equation (61). Accordingly, $w_n(k)$ and $\alpha_n(k)$ can then be determined according to the equation (58).

Using the filter characteristic $w_n(k)$ which is calculated in this manner, $y'_n(k)$ is filtered according to the following equation;

$$u_n(k) = w_n^H(k) \cdot y'_n(k) \quad (68)$$

where $^H$ represents a conjugate transposed matrix.

These filtered n processed results are fed to corresponding equalizers 21-n which follow. In this manner, a received signal $u_n(k)$ which corresponds to the left side of the equation (1) from the n-th user is obtained, $\alpha_{mn}(k)$ which corresponds to the channel value $h_{mn}(q)$ on the right side of the equation (1) is obtained, and the equation (55) which corresponds to the equation (1) is determined. Accordingly, $\alpha_n(k)$ is applied as an equalizer parameter (channel value) to a succeeding equalizer 21-n. This completes the prestage processing by the equalizer 71.

A processing which takes place in the succeeding equalizer 21-n and thereafter will now be described. As mentioned previously, because the equation (55) corresponds to the equation (1), the operation which takes place in the equalizer 21-n for every user may proceed in the similar manner as that of the equalizer 21 shown in FIG. 31, and will not be repeated again since it is disclosed in literature [1]. Each equalizer 21-n receives $u_n(k)$, $\alpha_n(k)$ and a priori information $\lambda_2 [b_n(k)]$ from the decoder 24-n as defined above, and calculates and delivers outputs a log-likelihood ratio $\Lambda_1$ (LLR) representing the ratio of the probability that each encoded bit is +1 and the probability that it is −1, as follows:

$$\Lambda_1[b(k)] = \log \frac{Pr[b_n(k) = +1 \mid u_n(k), k = 0, \ldots, B]}{Pr[b_n(k) = -1 \mid u_n(k), k = 0, \ldots, B]} \quad (69)$$

$$\equiv \lambda_1[b_n(k)] + \lambda_2^P[b_n(k)] \quad (70)$$

where $\lambda_1 [b_n(k)]$ represents an extrinsic information fed to a succeeding decoder 24-n, and $\lambda_2^P [b_n(k)]$ a priori information applied to the equalizer 31. Decoder 24-n calculates the log-likelihood ratio $\Lambda_2$ according to the following equation:

$$\Lambda_2[b_n(i)] = \log \frac{Pr[b_n(i) = +1 \mid \lambda_1[b_n(i)], i = 0, \ldots, B]}{Pr[b_n(i) = -1 \mid \lambda_1[b_n(i)], i = 0, \ldots, B]} \quad (71)$$

$$\equiv \lambda_2[b_n(i)] + \lambda_1^P[b_n(i)] \quad (72)$$

where $\lambda_2 [b_n(i)]$ represents an extrinsic information applied to the equalizer 71 and the equalizer 21 during the iteration and the $\lambda_1^P [b_n(k)]$ a priori information applied to the decoder 24-n. The arrangement shown in FIG. 18 performs an iterated equalization and decoding to improve an error rate.

Figure 19:
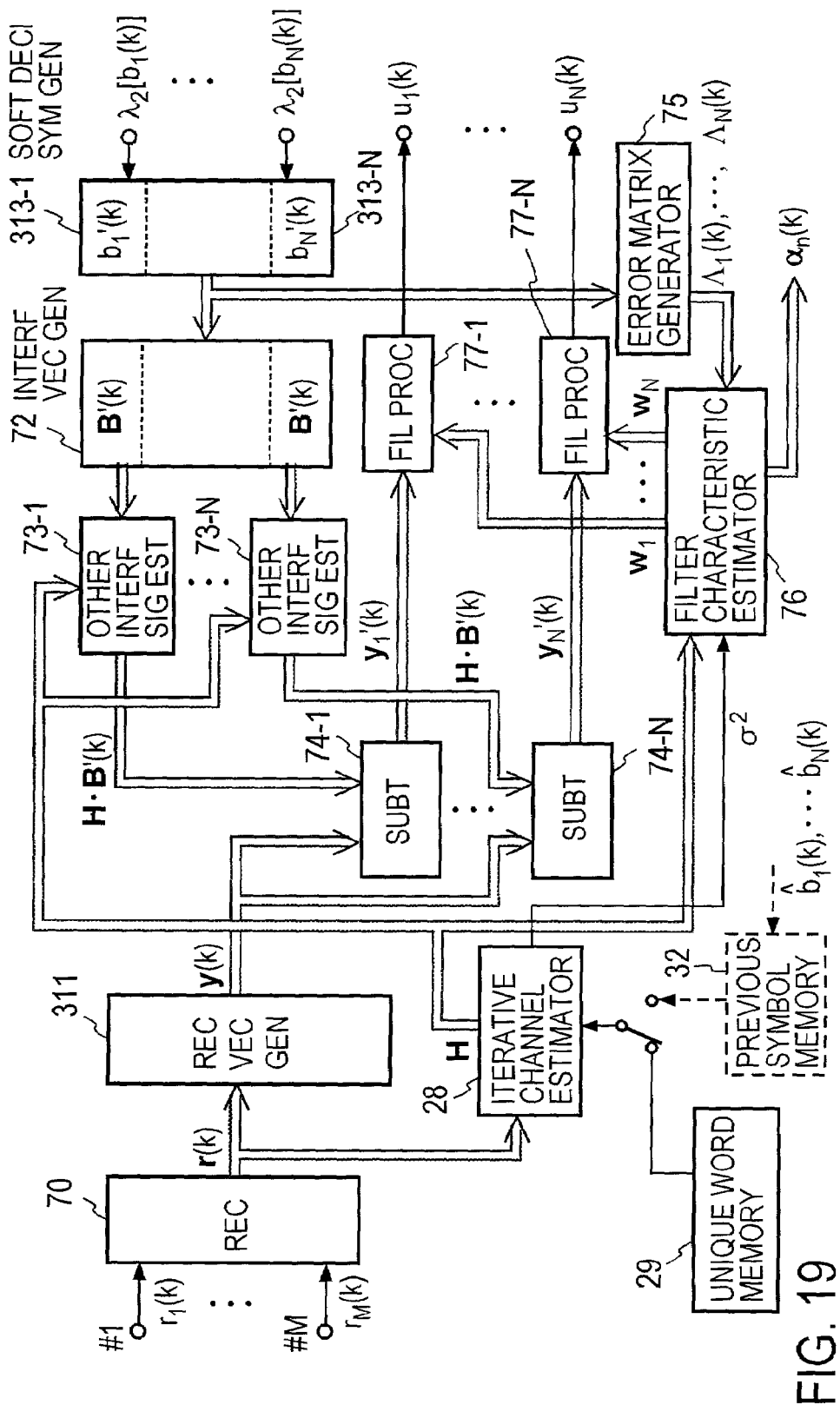
FIG. 19 is a diagram showing a specific arrangement of a functional arrangement of a multi-user (prestage) equalizer 71 shown in FIG. 18.

A functional arrangement of the multi-user equalizer 71 will be briefly described with reference to FIG. 19. A received signal from each antenna is processed in a receiver 70 as a matrix $r(k) = [r_1(k) \ldots r_M(k)]$, which is used in a received matrix generator 311 to generate a received matrix y(k) according to the equation (21) which takes the individual multi-paths (channels) into consideration.

On the other hand, the received signal r(k) from the receiver 70, and a known series signal such as a unique word series used for channel estimation which corresponds to each transmitter and which is fed from a unique word memory 29 are input to a channel estimator 28 in order to estimate a channel matrix H.

A priori information $\lambda_1^P [b_n(i)], \ldots, \lambda_1^P [b_N(i)]$ are subtracted from the log-likelihood ratios $\Lambda_2 [b_1(i)], \ldots, \Lambda_2 [b_N(i)]$ delivered from the respective decoders 24-1, . . . , 24-N to derive extrinsic information $\lambda_2 [b_1(k)], \ldots, \lambda_2 [b_N(k)]$, which is then input to soft decision symbol estimators 313-1, . . . , 313-N where soft decision transmitted symbols $b'_1(k), \ldots, b'_N(k)$ are calculated according to the equation (15) and are then input to an interference matrix generator 72. In the interference matrix generator 72, a matrix B'(k) of symbol estimates which can be interference signals from other transmitters are generated for each n according to the equations (29)', (53) and (54). A product of these N matrices B'(k) and the channel matrix H is generated by other interfering signal estimators 73-1, . . . , 73-N, respectively, thus determining the replica of interfering components H·B(k).

These N interfering component replicas H·B(k) are subtracted from the received matrix y(k) in subtractors 74-1, . . . , 74-N, respectively, thus providing difference matrixes $y'_1(k), \ldots, y'_N(k)$.

The soft decision transmitted symbols $b'_1(k), \ldots, b'_N(k)$ are input to an error matrix generator 75 where error matrices $\Lambda_1(k), \ldots, \Lambda_N(k)$ are generated according to the equations (64), (66) and (67). These error matrices, the channel matrix H and the noise power $\sigma^2$ are input to a filter characteristic estimator 76 where the filter characteristic $w_n(k)$ and the post-equalization channel information $\alpha_n$ are estimated according to the equations (58), (60), (61), (63) and (65). These filter characteristics $w_1, \ldots, w_N$ and difference matrixes $y'_1(k), \ldots, y'_N(k)$ are multiplied together in filter processors 77-1, . . . , 77-N, respectively, or the difference matrixes are filtered, thus determining a component $u_1(k), \ldots, u_N(k)$ of the received signal for the symbol $[b_n(k), b_n(k-1), \ldots, b_n(K-Q+1)]$ from each user and for each path, from which interferences from other user signals are eliminated. These components are fed, together with the post-equalization channel information $\alpha_1(k), \ldots, \alpha_N(k)$ which are determined in the filter characteristic estimator 76, to the single user equalizers 21-1, ..., 21-N shown in FIG. 18.

Figure 20:
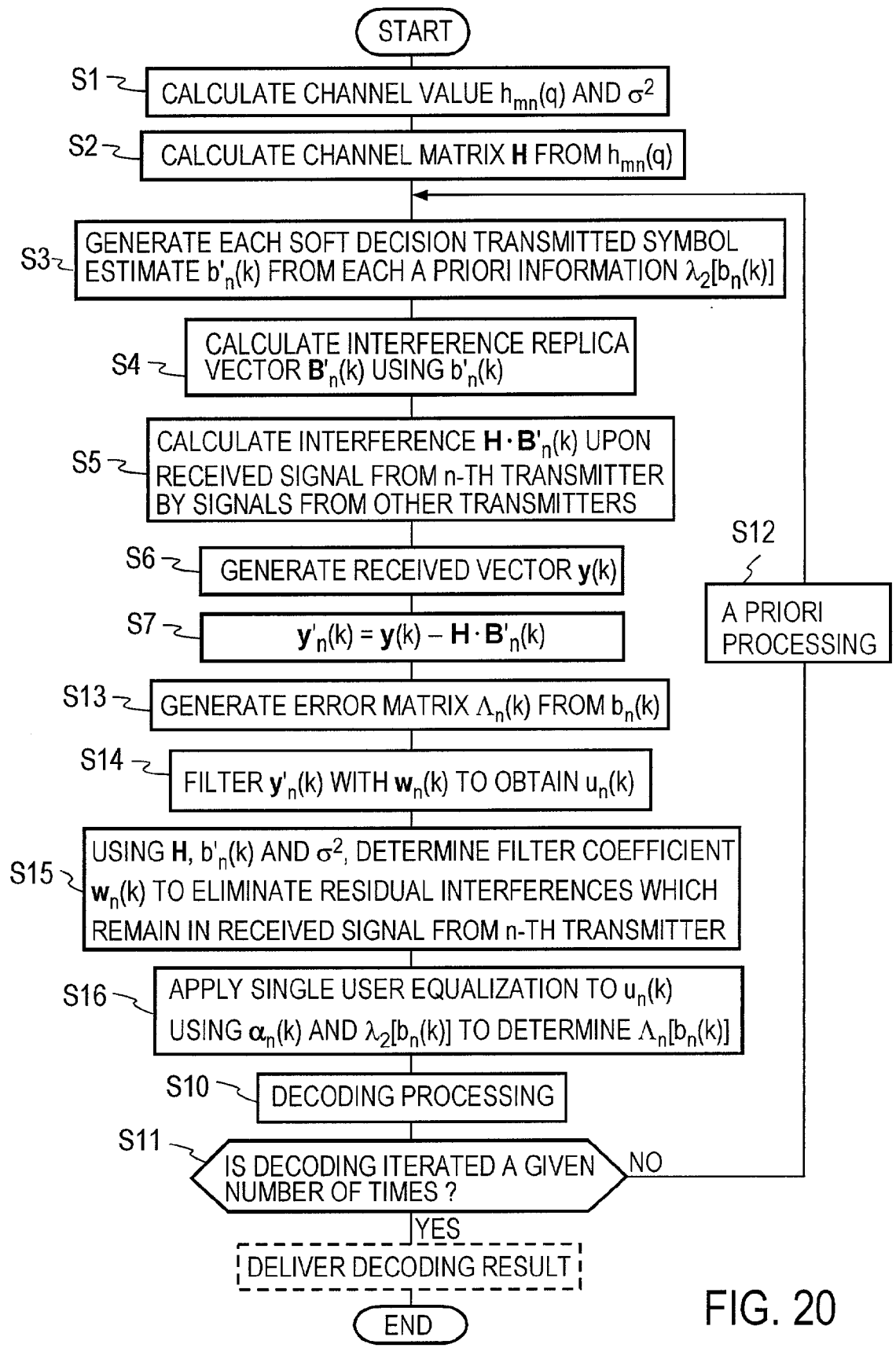
FIG. 20 is a flow chart of an exemplary processing procedure of a turbo-reception method according to the third aspect of the present invention.

A processing procedure for the turbo-reception method according to the first aspect of the invention (2) is shown in FIG. 20 where steps corresponding to those shown in the procedure of FIG. 3 are designated by like step numbers as used before. However, the calculation of the interference replica matrix $B'_n(k)$ which takes place at step S4 follows the equations (29)', (53) and (54). The step S13 uses the soft decision transmitted symbol $b'_n(k)$ to generate the error matrix $\Lambda_n(k)$ according to the equations (64), (66) and (67). Step S14 uses the channel matrix H, the noise power $\sigma^2$ and the error matrix $\Lambda_n(k)$ to determine the residual interference eliminating filter $w_n(k)$ and the channel information $\alpha_n$ according to the equations (58), (60), (61), (63) and (65). Step S15 filters the difference matrix $y'_n(k)$ according to the residual interference eliminating filter characteristic $w_n(k)$ to determine $u_n(k)$. At step S16, a single user equalization is applied to each filtered result $u_n(k)$ to determine the log-likelihood ratio $\Lambda_n[u_n(k)]$, which is then decoded at step S10. In other respects, the procedure is similar to that shown in FIG. 3.

In the forgoing description, the extent of equalization in the poststage equalizer 21-$n$ is defined as a zone for intersymbol interference by the symbol $[b_n(k), b_n(k-1), \ldots, b_n(K-Q+1)]$ (where $n=1, \ldots, N$), but such extent of equalization is adjustable. For example, when Q has a very high value, a computational load on the poststage equalizer 21-$n$ will be much greater. In this instance, the extent of equalization by the poststage equalizer 21-$n$ is chosen to be $Q'<Q$ while the prestage equalizer 71 may be rearranged so as to eleminate intersymbol interferences between the signal of the same user outside the zone $[b_n(k), b_n(k-1), \ldots, b_n(K-Q'+1)]$ (where $Q'<Q$ and $n=1, \ldots, N$). Such modification will be described later. When the equalization is divided into the prestage and poststage, a previous symbol memory 32 may be provided, as indicated in broken lines in FIG. 19, in association with the channel estimator 28 so that the hard decision transmitted symbol $\hat{b}_n(k)$ may also be used in the estimation of the channel value, thus permitting the accuracy of estimation to be improved.

In the example shown in FIG. 17, the prestage multiple output equalizer 71 equalizes transmitted signals in N series so that interferences from other series may be separated to provide signals $u_n$ of N series and the post-equalization channel information $\alpha_n$ and subsequently, the signal $u_n$ of each of N series is processed by the post stage single user equalizer 22-$n$ so as to eliminate intersymbol interference of the same transmitted signal. In this manner, the equalization takes place in two stages which are in cascade connection. However, a cascade connection of three or more stages may also be used.

Figure 21:
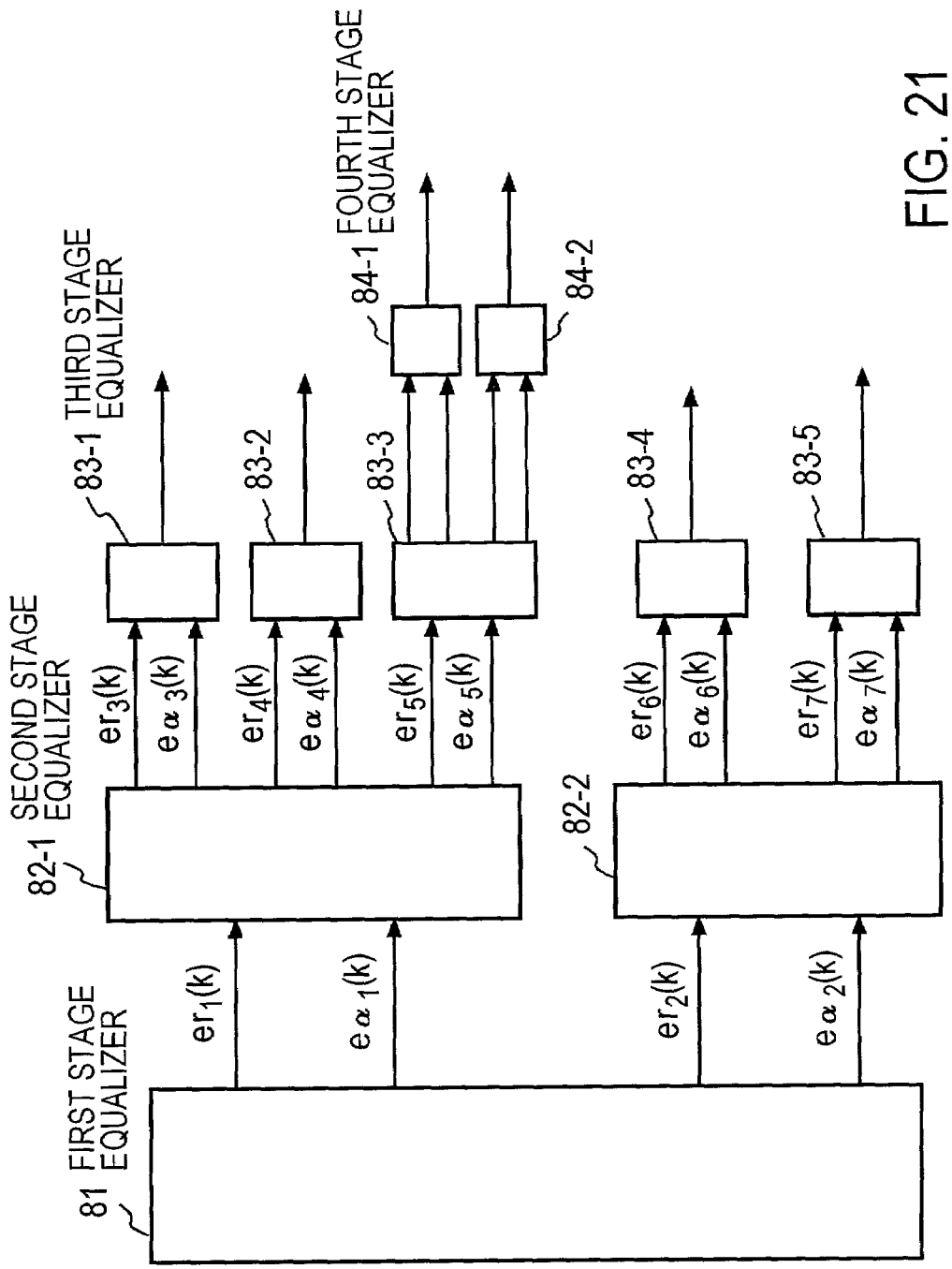
FIG. 21 is a diagram showing another exemplary functional arrangement of a multi-stage equalization section according to the third aspect of the present invention.

By way of example, FIG. 21 shows that a received signal $r_m$ of M series with respect to a transmitted signal of N series is input to a first stage equalizer 81 to provide an equalized signal series $er_1(k)$ for 1st to U-th transmitted series from which interferencs by (U+1)th to N-th transmitted series is eliminated and its associated post-equalization channel information $e\alpha(k)$, and an equalized signal series $er_2(k)$ for (U+1)-th to Nth transmitted series from which interferences by 1st to U-th transmitted series are eliminated and its associated post-equalization channel information $e\alpha_2(k)$ while a second stage includes equalizers 82-1 and 82-2. $er_1(k)$ and $e\alpha_1(k)$ are input to the equalizer 82-1 where they are equalized to provide an equalized signal series $er_3(k)$ for 1st-$U_1$-th transmitted series among the 1st to Uth transmitted series from which interferences by ($U_1$+1)-th to U-th transmitted signal are eliminated and its associated post-equalization channel information $e\alpha_3$, an equalized signal series $er_4(k)$ for ($U_1$+1)-th to $U_2$-th transmitted series among the 1st to U-th transmitted signal from which interferences by the 1-st to $U_1$-th transmitted series and $U_2$-th to U-th transmitted signal are eliminated and its associated post-equalization channel information $e\alpha_4(k)$, and an equalized signal series $er_5(k)$ for ($U_2$+1)-th to U-th transmitted series among 1-st to U-th transmitted series from which interferences by 1-st to $U_2$-th transmitted series are eliminated and its associated post-equalization channel information $e\alpha_5(k)$.

Similarly, the equalized signal series $er_2(k)$ and the channel information $e\alpha_2(k)$ are input to the equalizer 82-2 in the second stage to provide an equalized signal series $er_6(k)$ and an associated post-equalization channel information $e\alpha_6(k)$, and an equalized signal series $er_7(k)$ and its associated post-equalization channel information $e\alpha_7(k)$. When N=5, equalizers 83-1 to 83-5 in a third stage represent single user equalizers shown in FIG. 18. Alternatively, an input equalized signal to the equalizer 83-3 may comprise two transmitted signals, and the equalizer 83-3 can eliminate mutual interferences between the two transmitted signals to provide a set of two equalized signals and their associated post-equalization channel information, which are in turn supplied to and equalized by next succeeding single user equalizers 84-1 and 84-2. As a further alternative, the equalizer 83-4 may receive the equalized signal $er_6(k)$ and the channel information $e\alpha_6(k)$ to eliminate mutual interferences for each of the transmitted signals which constituted the equalized signal $er_6(k)$, such as each of three transmitted signals, each of which may be interfered by two other transmitted signals as well as an intersymbol interference of each transmitted signal due to multipaths. As another alternative, one or more of the equalizers 82-1 and 82-2 in the second stage may be arranged so that an equalized signal may be simultaneously obtained for each of a plurality of transmitted signals.

What has been described above can be generalized by stating that equalizers in a first stage deliver a plurality of equalized signal series and a set of post-equalization channel information, and one or more equalizers may be provided in each of one or a plurality of stages which are in cascading connection for each equalized signal series and its associated set of post-equalization channel information so that an equalized output or a log-likelihood ratio $\Lambda_1[b_n(k)]$ may be delivered finally for each of the 1st to N-th transmitted series.

When the equalization takes place in multiple stages which are in cascade connection, it is preferred that the number of paths Q for which interferences are to be eliminated be reduced toward a later stage so that the quantity of calculation can be reduced. In this instance, an interferring component from a path which disappears in a later stage be eliminated in an immediately preceding equalizer stage.

An equalization processing which occurs in the arrangement of FIG. 21 when a first stage equalizer 81 deals with N transmitted signals, each of which has a number of multi-paths equal to Q to provide a group of equalized signal series $er_1(k)$ comprising U transmitted signals and their associated post-equalization channel information $e\alpha_1(k)$ and a later stage equalizer 82-1 performs an equalization for a number of multipaths equal to Q' for each transmitted series will be described.

In a similar manner as described above in connection with the embodiment shown in FIGS. 18 and 19, an interference matrix generator 72 generates an interference matrix B'(k), but the equations used are changed from the equations (53) and (54) to equations (53), (54)' and (73) as follows:

$$b'(k+q)=[b'_1(k+q) b'_2(k+q) \ldots b'_n(k+q) \ldots b'_N(k+q)]^T : q=Q-1, \ldots 1 \quad (53)$$

$$b'(k+q)=[0 \ldots 0 b'_{U+1}(k+q) \ldots b'_N(k+q)]^T : q=0, \ldots, -Q'+1 \quad (54)'$$

$$b'(k+q)=[b'_1(k+q) b'_2(k+q) \ldots b'_n(k+q) \ldots b'_N(k+q)]^T : q=Q', \ldots, -Q+1 \quad (73)$$

The equation (54)' is intended to provide symbols for a first to U-th transmitted series themselves, and to provide an equalization except for intersymbol interference caused upon each series by itself and relative to each other due to multipaths Q' while the equation (73) is intended to eliminate the intersymbol interferences upon the 1st to U-th transmitted series themselves and relative to each other due to (Q'+1)-th to Q-th path in as much as the number of multipaths is reduced to Q' in the poststage equalization.

The interferences matrix B'(k) which is obtained in this manner is used to generate an interference signal replica H·B'(k) which is then subtracted from a received matrix y(k) as follows:

$$y'_g(k) \equiv y(k) - H \cdot B'(k) \quad (27)''$$

$$\equiv H \cdot (B(k) - B'(k)) + n(k) \quad (28)''$$

This operation of subtracting the interference is referred to hereafter as a soft interference cancel. Assuming that a replica H·B'(k) of an interfering signal is generated in an ideal manner, it will be seen that $y'_g(k)$ can only have signal components for symbols $[b_n(k), b_n(k-1), \ldots, b_n(k-Q'+1)]$ (where n=1 to U) for 1st to U-th transmitted symbols.

A residue of interferences which remain after the soft interference cancel is eliminated with a linear filter of a MMSE criteria in a similar manner as mentioned previously. In this instance, the equation (55) is replaced by an equation (55)' indicated below.

$$w_g^H(k) \cdot y'_g(k) \approx \sum_{n=1}^{U} \sum_{q=0}^{Q'-1} \alpha_{nq}(k) \cdot b_n(k-q) = \alpha_g^H(k) \cdot b_g(k) \quad (55)'$$

where $$\alpha_g(k) = [\alpha_{1,0}(k), \ldots, \alpha_{1,Q'-1}(k), \ldots, \alpha_{U,0}(k), \ldots, \alpha_{U,Q'-1}(k)]^T \quad (55\text{-}1)$$

$$b_g(k) = [b_1(k), \ldots, b_1(k-Q'+1), \ldots, b_U(k), \ldots, b_U(k-Q'+1)]^T \quad (55\text{-}2)$$

The derivation of $w_g(k)$ and $\alpha_g(k)$ takes place in a similar manner as described previously to determine $w_g(k)$ and $\alpha_g(k)$ which minimizes the right side of the following equation, which stands for the equation (56):

$$(w_g(k), \alpha_g(k)) = \arg \min \|w_g^H(k) \cdot y'_g(k) - \alpha_g^H(k) \cdot b_g(k)\|^2 \quad (56)'$$

provided $\alpha_{1,0}(k)=1$.

The constraint requirement is added in order to avoid solutions which may result in $\alpha_g(k)=0$ and $w_g(k)=0$. While a constraint requirement that $\|\alpha_g(k)\|^2=1$ may also be used to provide a solution, in the description to follow, the problem is rewritten as follows for $\alpha_{1,0}(k)=1$:

$$m_g(k) = \arg \min \|m_g^H(k) \cdot z_g(k)\|^2 \quad (57)'$$

provided $m_g^H(k) \cdot e_{MQ'+1} = -1$ where $$m_g(k) = [w_g^T(k), -\alpha_g^T(k)]^T \quad (58)'$$

$$z_g(k) = [y_g^T(k), b(k)_g^T]^T \quad (59)'$$

$$e_{MQ'+1} = [0 \ldots 1 \ldots 0]^T \quad (60)'$$

it being understood that $e_{MQ'+1}$ has "1" element at (MQ'+1)-th position.

A solution of the optimization problem is given as follows according to Lagrange's method of indeterminate coefficients disclosed in literature [2];

$$m_g(k) = -R_{zz}^{-1} \cdot e_{MQ'+1} / (e_{MQ'+1}^H \cdot R_{zz}^{-1} \cdot e_{MQ'+1}) \quad (61)'$$

where $$R_{zz} = E[Z_g(k) \cdot Z_g^H(k)] \quad (62)'$$

$$= E \begin{bmatrix} H \cdot \Lambda_n(k) \cdot H^H + \sigma^2 I & H_g^H \\ H_g & I \end{bmatrix} \quad (63)'$$

$$\Lambda_n(k) = diag[D_n(k+Q-1), \ldots, D_n(k), \ldots, D_n(k-Q+1)] \quad (64)'$$

$$H_g = \begin{bmatrix} h_{1(Q-1)} & 0 & 0 & \ldots & h_{U(Q-1)} & 0 & 0 \\ h_{1(Q-2)} & \ddots & 0 & \ldots & h_{U(Q-2)} & \ddots & 0 \\ h_{1(Q-3)} & \vdots & h_{1(Q-1)} & \ldots & h_{U(Q-3)} & \vdots & h_{U(Q-1)} \\ \vdots & \vdots & \vdots & \ldots & \vdots & \vdots & \vdots \\ h_{1(0)} & \ldots & h_{1(Q'-1)} & \ldots & h_{U(0)} & \ldots & h_{U(Q'-1)} \end{bmatrix} \quad (65)'$$

$$D_n(k+q) = diag[1-b^2_1(k+q), \ldots, 1-b^2_n(k+q), \ldots, 1-b^2_N(k+q)] : q=Q+1, \ldots, 1 \quad (66)$$

$$D_n(k+q) = diag[1, \ldots, 1, 1-b^2_{U+1}(k+q), \ldots, 1-b^2_N(k+q)] : q=0, \ldots, -Q'+1 \quad (67)'$$

$$D_n(k+q) = diag[1-b^2_1(k+q), \ldots, 1-b^2_n(k+q), \ldots, 1-b^2_N(k+q)] : q=Q', \ldots, -Q+1 \quad (74)$$

Thus when channel parameters are known, $m_g(k)$ can be determined according to the equation (61)'. In addition, $w_g(k)$ and $\alpha_g(k)$ (=$e\alpha_1(k)$) can be determined according to the equation (58)'. Such calculations can be made in the filter characteristic estimator (76) shown in FIG. 19, for example, and the following equation is calculated in the filter processor 77-1 for purpose of filtering:

$$er_1(k) = w_g^H(k) \cdot y'_g(k)$$

This equalized output $er_1(k)$ and the post-equalization channel information $e\alpha_1(k) = \alpha_g(k)$ are fed to the poststage equalizer 82-1.

When there are five transmitted series (users), for example, which are divided into a group of three transmitted series (users) and a group of two transmitted series (users), in the manner mentioned above, the above algorithm is carried out with U=3 and 2, and the two equalized outputs $er_1(k)$, $e\alpha_1(k)$ and $er_2(k)$, $e\alpha_2(k)$ are input to equalizers which are designed to deal with the three transmitted series and the two transmitted series, respectively, thus obtaining an equalized output for each transmitted series.

Reflecting an error correction decoding result for a signal being detected into a soft decision transmitted symbol in the manner mentioned above is also applicable to a single user turbo-equalizer receiver shown in FIG. 8, RAKE synthesis turbo-receiver shown in FIG. 9, a turbo-receiver including an adaptive array antenna receiver shown in FIG. 10, a generalized turbo-receiver including a channel estimator 42 shown in FIG. 12.

In FIGS. 13, 14 and 15, a symbol hard decision value which has been determined as being as likely to be certain is also used as a reference signal in the estimation of the channel matrix H and the covariance matrix $\hat{U}$ during a second and a subsequent iteration. However, during a second and a subsequent iteration, only the unique word may be used as a reference signal to utilize the equation (51) to estimate the covariance matrix $\hat{U}$ while omitting the estimation of the channel estimation and the estimation of the covariance matrix $\hat{U}$ which utilize the symbol hard decision value.

First Aspect of the Invention (2) (Parallel Transmission)

There is a proposal that information series c(i) from a single user be transmitted in a plurality of parallel series in order to achieve a high rate transmission with a high frequency utilization efficiency. An embodiment of a turbo-receiver incorporating the present invention which may be used for such transmitted signal will now be described.

Figure 22:
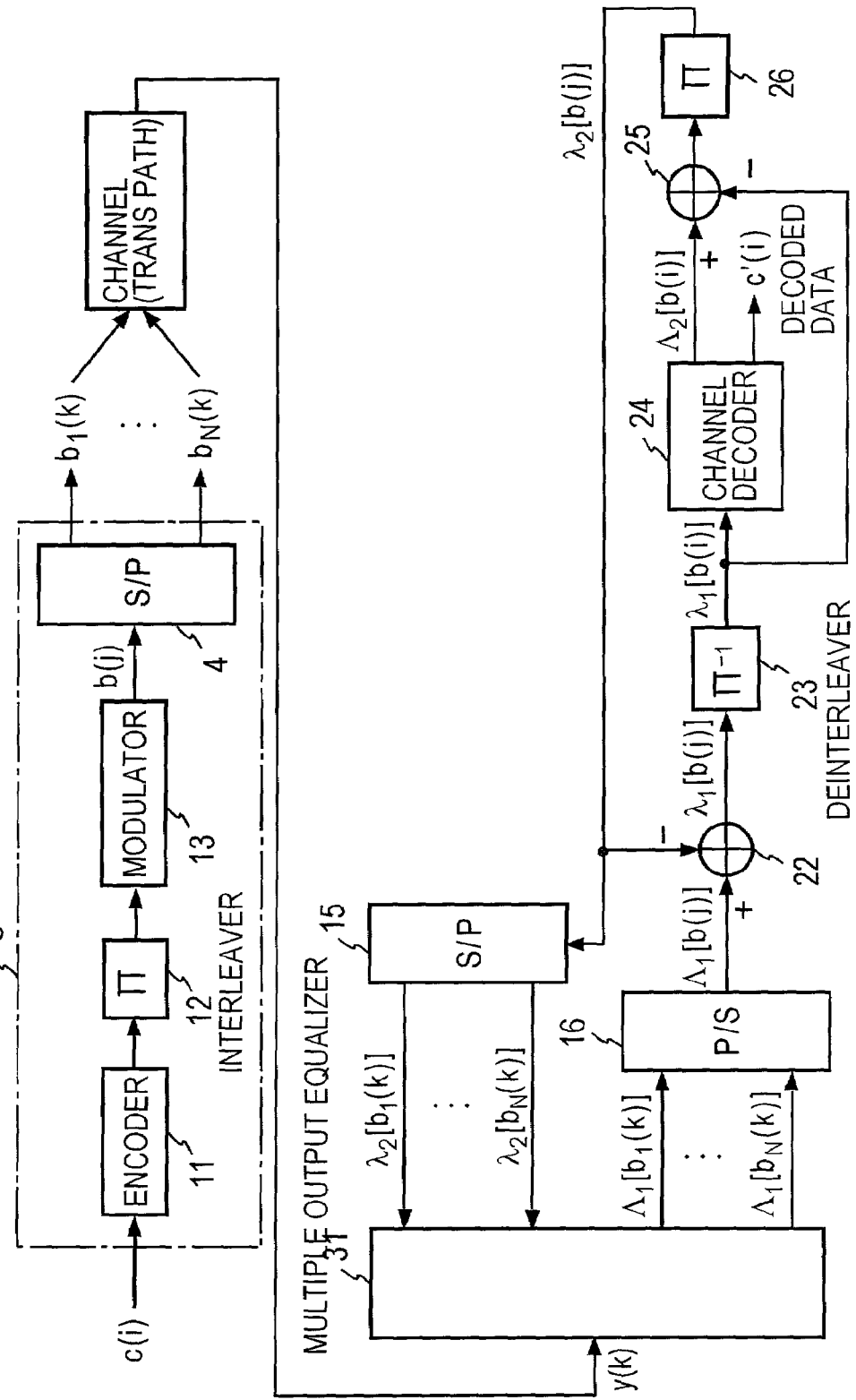
FIG. 22 is a diagram of an example of a system arrangement in which an embodiment according to the first aspect of the present invention (2) is applied.

Referring to FIG. 22, where parts corresponding to those shown in FIG. 1 are designated by like reference characters as used before, on the transmitting side, a modulated output signal b(j) from a modulator 13 is input to a series-parallel converter 14 where each symbol b(j) is sequentially distributed into N series. It is assumed that there are series signal $b_1(k), \ldots, b_N(k)$, the number N of which is equal to or greater than 2. While not shown, these signals are transmitted from N antennas after convertion into radio frequency signals.

Figure 30B:
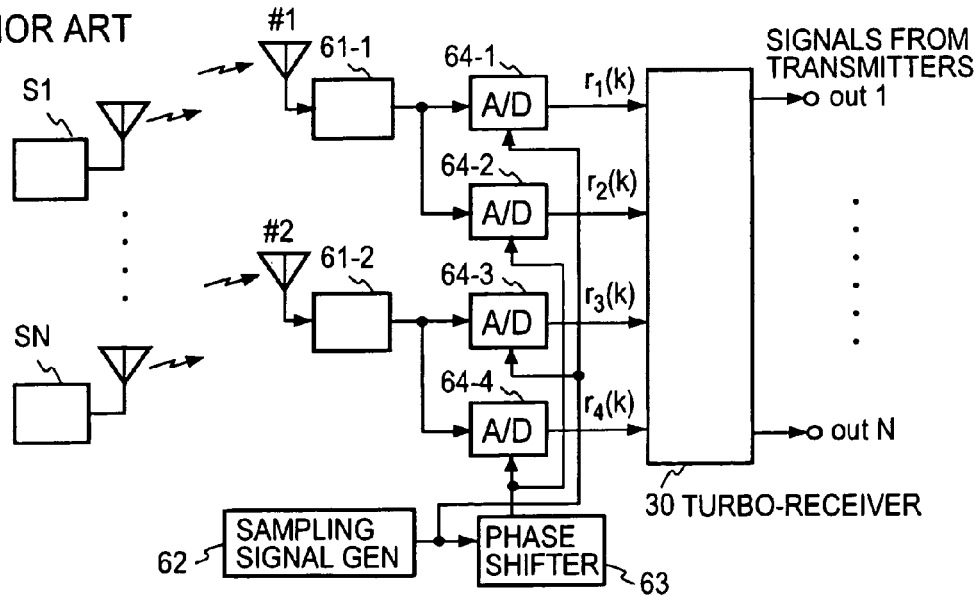
FIG. 30B is a diagram of an arrangement in which received signals from a pair of antennas are input to a turbo-receiver as four received signal series.

These N series signals are propagated through channels (transmission paths) to be received by the turbo-receiver according to the present invention. The receiver has one or more receiving antenna, and the received signal is input to a multiple output equalizer 31 as a baseband digital received signal $r_m(k)$ (where m=1, 2, ..., M) including one or more (M) signals. The received signal $r_m(k)$ is generated in a manner as shown in FIG. 30B, for example.

The multiple output equalizer 31 is constructed in the same manner as shown in FIG. 2, and performs according to a processing procedure as shown in FIG. 3. Accordingly, an extrinsic information $\lambda_1[b(i)]$ is subtracted from a log-likelihood ratio $\Lambda_2[b(i)]$ from a decoder 24 shown in FIG. 22 in a subtractor 25, and the subtracted output is interleaved by an interleaver 26 to provide a priori information $\lambda_2[b(j)]$, which is then converted in a series-parallel converter 15 into N series of a priori information $\lambda_2 [b_1(k)], \ldots, \lambda_2 [b_N(k)]$ to be input to the multiple output equalizer 31.

Accordingly, N series of received signals are subject to a linear equalization in the multiple output equalizer 31 in the similar manner as mentioned previously, delivering N log-likelihood ratio series $\Lambda_1 [b_1(k)], \ldots \Lambda_1 [b_N(k)]$, which are then input to a parallel-series converter 16 to be converted into a single log-likelihood ratio series $\Lambda_1[b(j)]$ to be supplied to a subtractor 22. With this arrangement, the input signal format to the multiple output equalizer 31 is similar to that described in connection with FIGS. 1 to 3, and accordingly, N series log-likelihood ratios $\Lambda_1 [b_1(k)], \ldots, \Lambda_1 [b_N(k)]$ can be obtained by the equalization which has been mentioned above with reference to FIGS. 1 to 3, and it will be readily seen that an iterative decoding processing is permitted by the use of the series-parallel converter 15 and the parallel-series converter 16. In a manner corresponding to a transmitted signal from a n-th transmitter in the arrangement of FIGS. 1 to 3, an n-th or (n-th column) transmitted signal among N parallel transmitted signals will be equalized. It will be readily seen that the embodiment described above in connection with FIGS. 4 to 7 is applicable to the reception of the parallel transmission of the N series signals. By processing in a plurality of equalizer stages which are in cascade connection as illustrated in FIGS. 18 to 21, the reception characteristic can be improved as compared to the processing through a single equalizer stage as shown in FIGS. 1 to 31.

The turbo-reception method and the turbo-receiver according to the present invention are also applicable to the reception of convoluted code/turbo-code+interleaver+multi-value modulation such as QPSK, 8PSK, 16QAM, 64QAM etc., TCM (trellis coded modulation)/turbo TCM.

Generation of M Received Signals

M received signals $r_1(k), \ldots, r_M(k)$ are derived from M antennas #1, ..., #M, but may be derived from a single antenna. Alternatively, M (which is greater than L) received signals may be obtained from L (which is an integer equal to or greater than 2) antennas. While not specifically shown in FIG. 1, received signals from antennas #1, ..., #M are converted into baseband received signals $r_1, \ldots, r_M$ in a baseband converter and sampled to provide digital signals $r_1(k), \ldots, r_M(k)$ at discrete time k.

As shown in FIG. 30b, for example, received signals received by L=2 antennas #1 and #2 may be converted into baseband signals in baseband converters 61-1 and 61-2, respectively, the outputs of which may be sampled by A/D converters 64-1, 64-2 and 64-3, 64-4 in accordance with a sampling signal from a sampling signal generator 62 and a sampling signal which is obtained by shifting the phase of the first mentioned sampling signal by one half period thereof T/2 in a phase shifter 63 to provide digital signals $r_1(k), r_2(k), r_3(k), r_4(k)$, respectively. Then the digital signal may be input to a turbo-receiver 30 as shown in FIG. 1 or FIG. 18 or FIG. 22 to provide N decoded outputs. It should be understood that the frequency of the sampling signal from the sampling signal generator 62 is chosen so that each sampling period of the received signals $r_1(k), \ldots, r_4(k)$ input to the turbo-receiver 30 coincides with the sampling period which is used when a single received signal $r_M(k)$ is received per antenna.

Effects of the Invention

As discussed above, according to the first aspect of the invention (1), there is realized a multiple output (MIMO) reception method. To illustrate a quantitative effect, an error rate response is graphically shown in FIGS. 23 and 24. In each Figure, $E_b/N_o$ on the abscissa represents a bit power to noise ratio. A simulation presumes following conditions:

| | |
|---|---|
| Number of users (transmitters) | 2 |
| The number of multipaths of each user Q | 5 |
| Number of reception antennas | 2 |
| Number of information symbols per frame | 450 bits |
| Number of unique words per frame | 25 bits |
| Channel estimation method | RLS (obliteration factor 0.99) |
| Error correction code | rate ½, constrained length 3 convoluted code |
| Doppler frequency | 1000 Hz (Rayleigh fading) |
| Modulation | BPSK |
| Transmission rate | 20 Mbps |
| Decoder 24 | Max-Log-Map decoder |
| Number of iterations | 4 |
| No fading within a frame | |

No approximation by the matrix inversion lemma for the inverse matrix is used in the calculation of the filter coefficient w.

Figure 23:
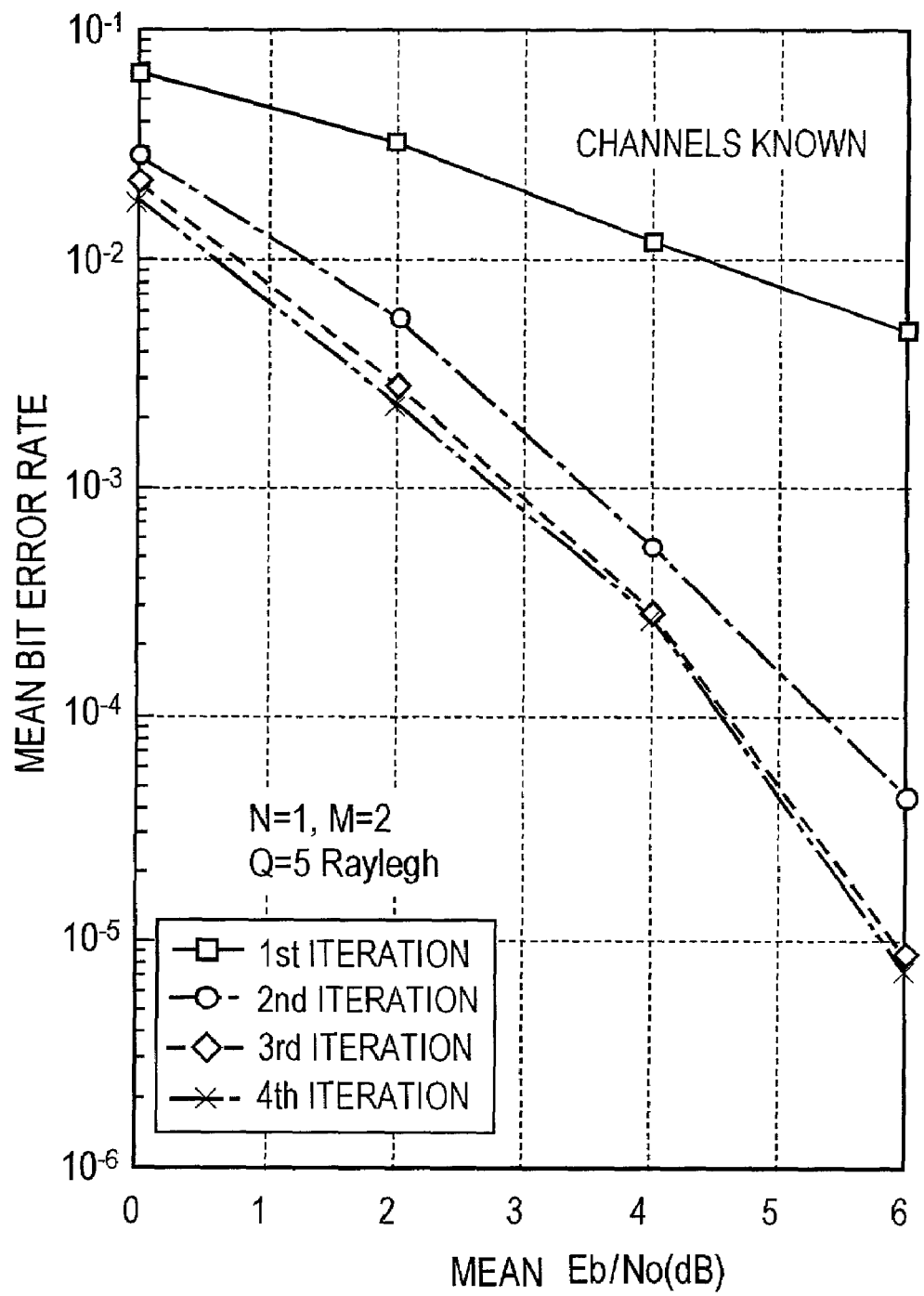
FIG. 23 graphically shows an error rate characteristic of a turbo-receiver according to the first aspect of the present invention (1), with assumption that the channel has been perfectly estimated, $E_b$ representing a bit power and $N_o$ a noise power.

FIG. 23 shows an error rate characteristic when the channel estimation is achieve perfectly (without no estimation error) or when the channels are known for a number of users N=2, a number of reception antennas M=2, a number of Raleigh paths Q=5. It will be seen that initial run is not an iteration and the second iteration is the first iteration. It will be seen that the error rate characteristic is significantly improved by the iteration. It will be seen from this that the turbo-reception method according to the invention for MIMO operates in a proper manner.

Figure 24:
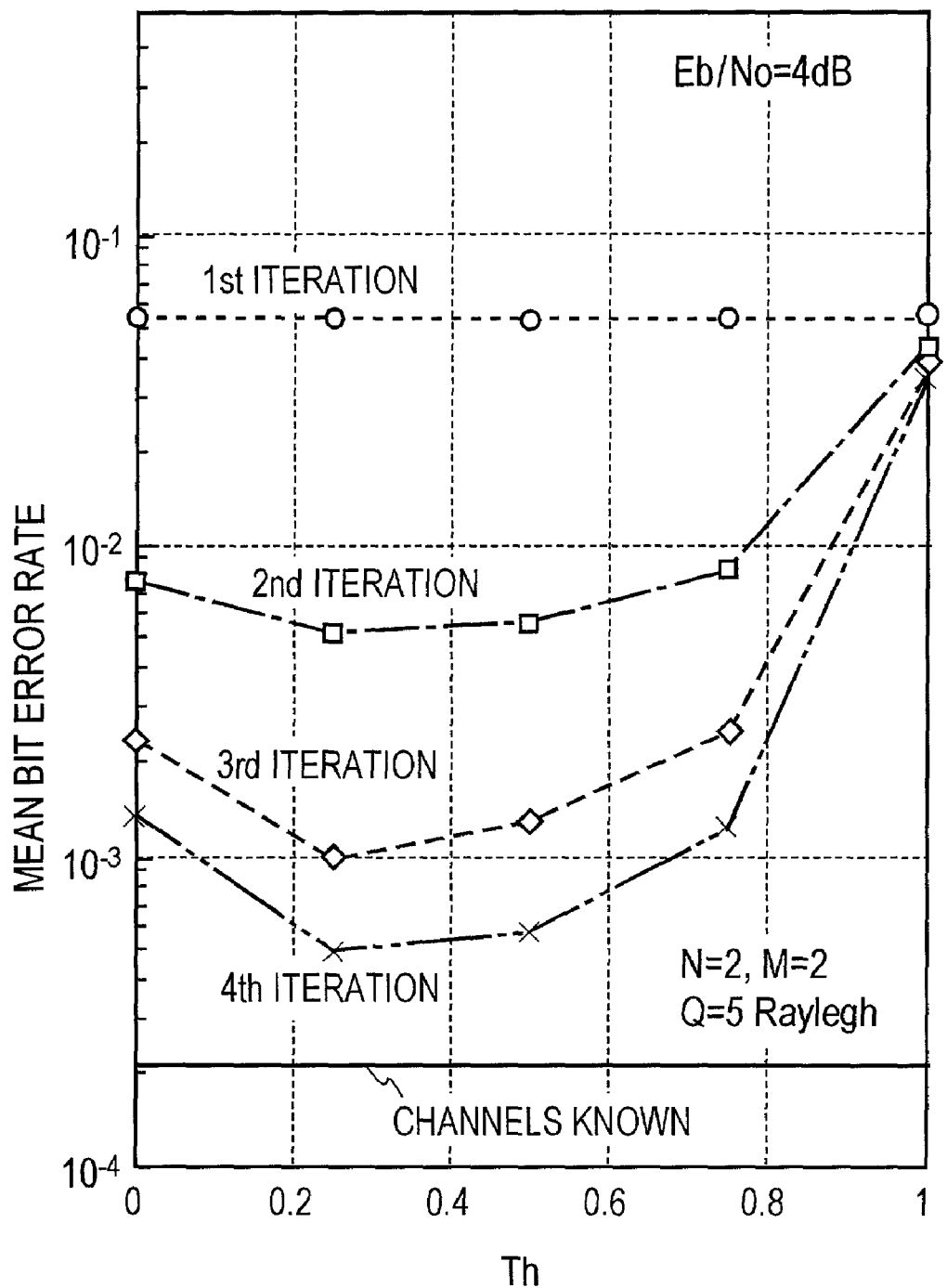
FIG. 24 graphically shows an error rate characteristic when the iterative channel estimation has been performed while changing a threshold value (Th)

FIG. 24 illustrates the effect of an iterative channel estimation (according to the fourth aspect of the invention). The abscissa indicates a threshold value Th. $E_b/N_o$ is fixed to 4 dB (where $E_b$ is for one user), and Th=1.0 may be considered as a conventional method in which no symbol hard decision value is selected, or where a channel estimation using a symbol hard decision value is not made. In this instance, it will be seen from the drawing that BER characteristic has a little effect of iteration because the channel estimation is inaccurate. A threshold Th=0 indicates that all of hard decision values are directly used, and when hard decision values of information symbols are used in this manner, it will be apparent from the drawing that a mean bit error rate is improved, allowing the channel estimation to be performed exactly to a corresponding degree. For a threshold value on the order of 0.2 to 0.6, the mean bit error rate is reduced than when Th=0, indicating that it is preferable that only a hard decision value which is likely to be certain be used. It will be seen that Th which is around 0.25 is most preferable.

Figure 25:
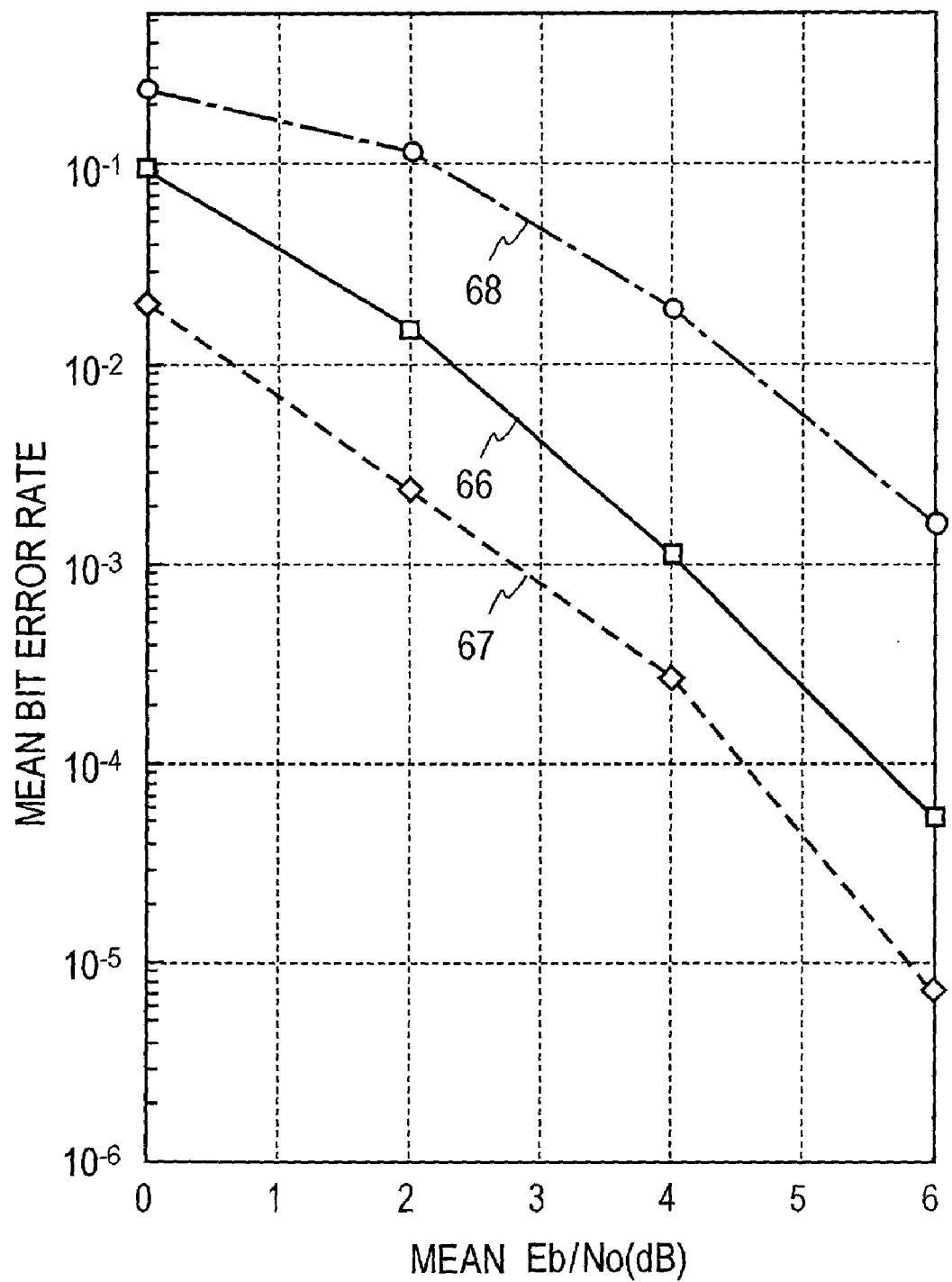
FIG. 25 graphically shows an error rate characteristic of a turbo-receiver according to the fourth aspect of the present invention, in particular, employing the iterative channel estimation.

FIG. 25 shows an error rate characteristic of an MIMO reception method in which a transmitted symbol hard decision value which is determined to be likely to be certain according to a threshold value is used in the channel estimation or which employs an iterative channel estimation in a form of a curve 66. In this instance, the threshold is set up at 0.25 and the result shown represents a characteristic after four iterations with parameters that N=2, M=2, Q=5Rayleigh, $f_dT_S$=1/20,000, and 900 symbols/frame. For purpose of comparison, an error rate characteristic with a perfect channel estimation is shown as a curve 67 while an error rate characteristic in which a hard decision value of information symbol is not used in a channel estimation or only a single channel estimation is made without iteration is shown by a curve 68. It will be seen from this graphic illustration that when the iterative channel estimation is used, the error rate characteristic approaches to that obtained by a perfect channel estimation.

With the channel estimation method mentioned above, by determining whether a hard decision value is or is not likely to be certain on the basis of a decoded soft decision value, and by using symbol information having a hard decision value which is likely to be certain in the channel estimation during the next iteration, the channel estimation can be performed more correctly, allowing a decoding quality to be improved.

In order to confirm the effect of an embodiment in which a covariance matrix Û (for noise other than Gaussian noise) is estimated, a simulation is made with parameters indicated below.

| | |
|---|---|
| Number of users (transmitters) | 3 (one of which is chosen as an unknown interference: i(k)) |
| The number of multipaths of each user Q | 5 |
| Number of reception antennas | 3 |
| Number of information symbols per frame | 450 bits |
| Error correction code | rate ½, constrained length 3 convoluted code |
| Doppler frequency | 1000 Hz (Rayleigh fading) |
| Modulation | BPSK |
| Transmission rate | 20 Mbps |
| Decoder 24 | Log-MAP decoder |
| Number of iterations | 4 |

Three users (transmitters) are chosen to be of an equal power.

Figure 26:
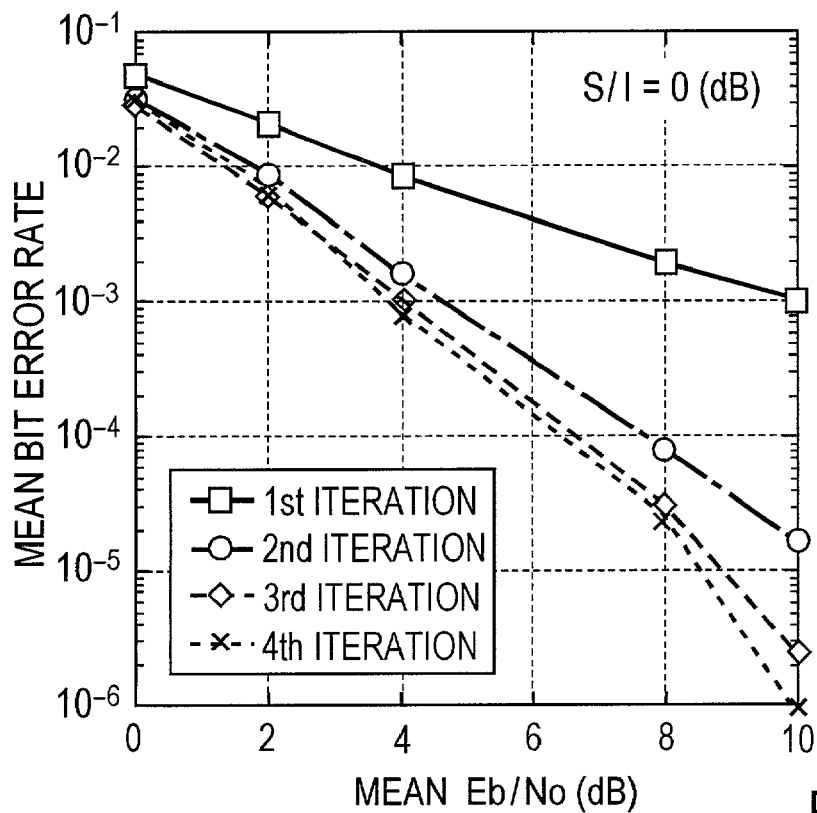
FIG. 26 graphically shows an error rate characteristic of the turbo-receiver which employs an estimation of a noise covariance matrix U.
Figure 27:
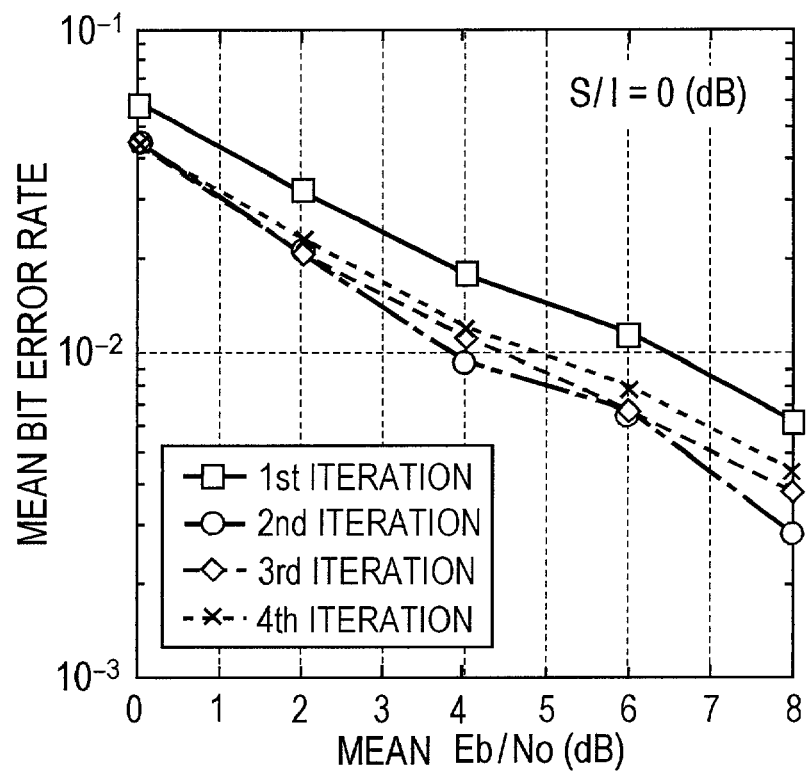
FIG. 27 graphically shows an error rate characteristic of the turbo-receiver shown in FIG. 1.

FIG. 26 shows a result of simulation of BER (bit error rate) characteristic of a turbo-receiver which estimates H and Û as shown in FIGS. 14, 15 and 16, and FIG. 27 shows BER characteristic which directly uses the turbo-receiver shown in FIG. 1 (which employs the method shown in FIG. 13). In FIG. 26, it is assumed that the noise comprises only white Gaussian noise, and it is seen that two or more iterations of the channel estimation and the decoding processing has little effect. By contrast, it will be seen from FIG. 27 that as the number of iterations is increased, an improvement in the BER characteristic is achieved, and in addition, BER is considerably less than that shown in FIG. 26 for the same $E_b/N_o$.

In order to confirm the effect of the embodiment (according to the second aspect of the invention) in which an error correction decoding result is reflected into a symbol soft decision value $b'_n(k)$ of a received signal from an intended user (transmitter), a simulation is made with parameters as indicated below

| | |
|---|---|
| Number of users (transmitters) N | 4 |
| The number of multipaths of each user Q | 5 |
| Number of reception antennas | 2 |
| Number of information symbols per frame | 900 bits |
| Error correction code | convoluted code (coded rate: ½, constrained length 3) |
| Modulation | BPSK |
| Decoder 24 | Log-Map decoder |
| Erroneous coded rate | ½ |
| Number of iterations | 5 |
| A choice is made that $f(b'_n(k))= a \times b'_n(k)$ | |

Figure 28A:
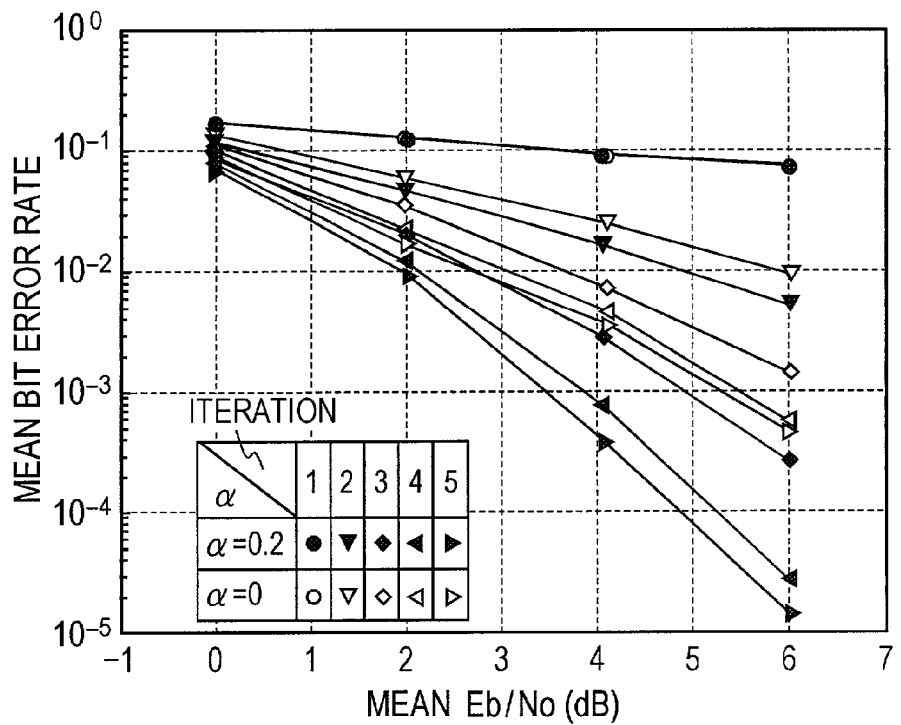
FIG. 28A graphically shows an error rate characteristic as plotted against $E_b/N_o$ of an embodiment according to the second aspect of the present invention which reflects an error correcting decoding result of a signal being detected.
Figure 28B:
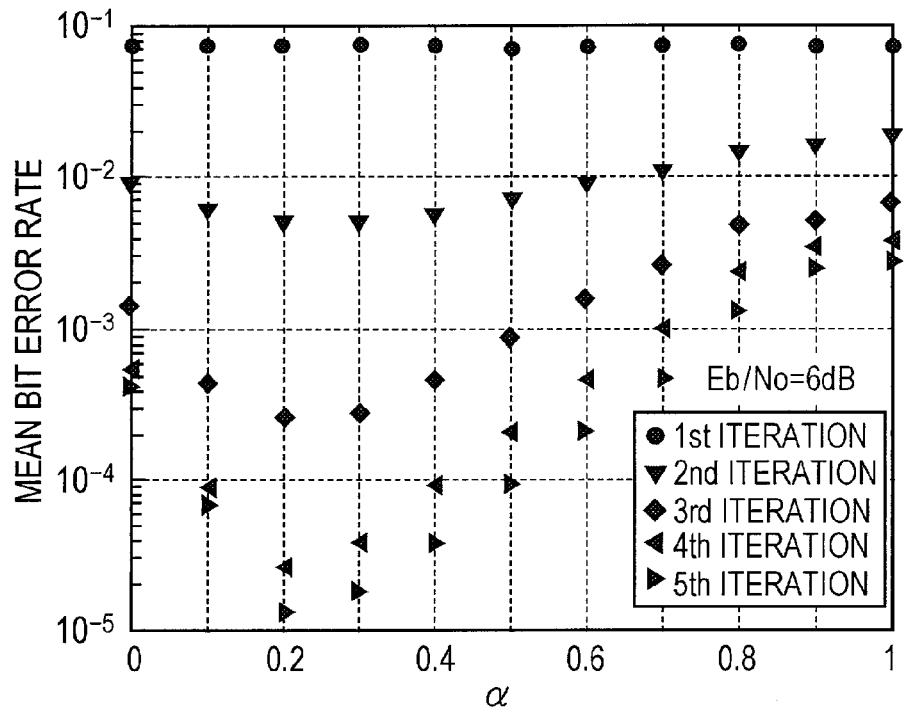
FIG. 28B graphically shows an error rate characteristic plotted against a of the embodiment according to the second aspect of the present invention.

FIG. 28 shows BER characteristic of a multiple output turbo-receiver shown in FIG. 1 and a multiple input multiple output turbo-receiver in which an error correction decoding result is reflected into $b'_n(k)$, with plotted points shown in black for the former and in white for the latter. It is to be noted that in the plot, a circle represents an initial run, a down-directed triangle a second iteration, a diamond a third iteration, a left-directed triangle a fourth iteration and a right-directed triangle a fifth iteration. FIG. 28A shows a result of a simulation for the BER characteristic plotted against $E_b/N_o$ when α is fixed to 0.2, and FIG. 28B shows a result of simulation for the BER characteristic plotted against α when $E_b/N_o$ is 6 dB. It will be seen that α=0 represents that $b'_n(k)$=0. It is noted from FIG. 28A that in the multiple input multiple output receiver in which an error correction decoding result is reflected into $b'_n(k)$, an improvement in BER after a third and a subsequent iteration is greater in comparison to BER obtained during a preceding iteration, as compared with the multiple input multiple output turbo-receiver shown in FIG. 1, and that after a third and a subsequent iteration, when $E_b/N_o$ required to achieve each BER in a range BER>$10^{-4}$ is compared, the multiple input multiple output turbo-receiver in which an error correction decoding result is reflected into b'$_n$(k) has a gain of about 0.5 dB or greater in comparison to the multiple input multiple output turbo-receiver shown in FIG. 1. It is also noted that during the fifth iteration at $E_b/N_o$=6 dB, BER=$10^{-5}$ is attained, which is a reduction in BER by a factor of 1/10 or more in comparison to the receiver shown in FIG. 1. It will be seen from FIG. 28B that an improvement is achieved in a range of α indicated by an equality 0<α<0.6 and that when α exceeds 0.6, the BER characteristic becomes degraded, preventing a correct decoding result from being obtained. From this result, it is seen that an optimum value of α is 0.2. However, it should be understood that the value of α is not limited to the optimum value, but a suitable range of α having an improving effect can be changed depending on the number of users to be received, a propagation environment having interferences, a number of receiving antennas or the like. In addition, a different value may be chosen as an optimum value for α.

When BPSK modulation is used for a number of users (transmitters) which is equal to N, a number of multipaths from each transmitter which is equal to Q and a number of receiver antennas which is equal to M, the quantity of calculation which is required in an equalizer when a conventional single user turbo-receiver is directly extended to a multiple output (MIMO) is on the order of $2^{N(Q-1)}$, as mentioned previously, but with the turbo-reception method according to the third aspect of the invention, the quantity of calculation can be reduced to the oreder of $N(MQ)^3$. By way of example, assuming that N=8, Q=20 and M=8, $2^{N(Q-1)} \approx 5 \cdot 10^{45}$ while $N(MQ)^3 \approx 37 \cdot 10^7$, thus demonstrating that the quantity of calculation can drastically be reduced according to the turbo-reception method according to the second aspect of the present invention.

A simulation has been conducted under conditions given below in order to confirm that a good bit error rate characteristic can be obtained according to the turbo-reception method according to the third aspect of the invention. It is assumed that the channel matrix H is known.

| | |
|---|---|
| Number of users N | 4 |
| The number of multipaths of each user Q | 5 |
| Number of reception antennas | 2 |
| Number of information symbols per frame | 900 bits |
| Error correction code | rate: ½, constrained length 3 convoluted code |
| Doppler Frequency | 1000 Hz (Rayleigh fading) |
| Modulation | BPSK |
| Decoder 24 | Log-Map decoder |
| Transmission rate | 20 Mbps |
| Decoder | Log-MAP decoder |
| Number of iterations | 6 |

It is assumed that the channel estimation takes place in an ideal manner.

Figure 29:
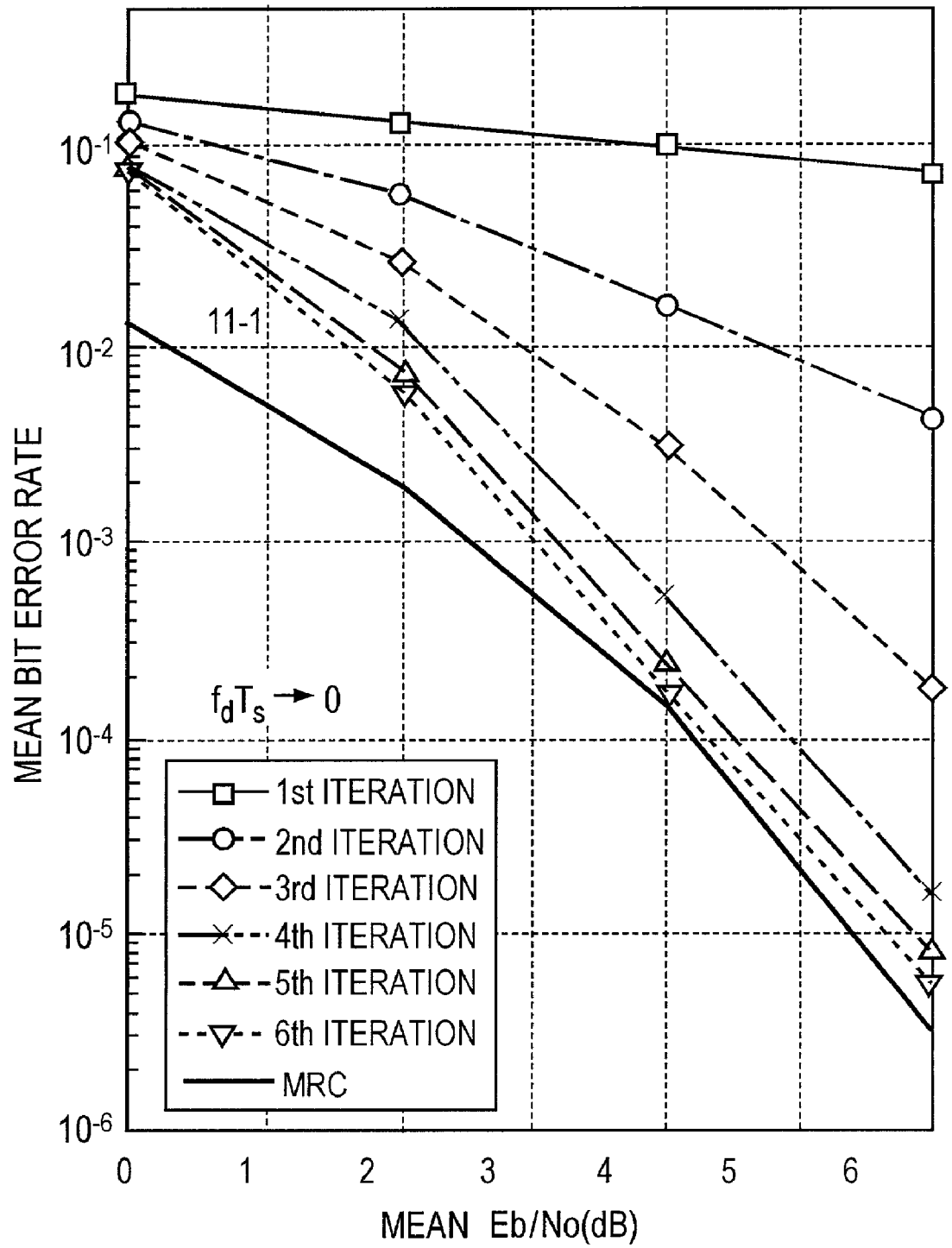
FIG. 29 graphically shows a result of a simulation of an error rate characteristic of a turbo-receiver according to the third aspect of the present invention.

FIG. 29 shows a result of simulation for BER (bit error rate characteristic). The abscissa represents mean Eb (bit power)/$N_o$(noise power), denotation $f_d$ in the graph represents a doppler frequency and $D_s$ the 5 period of a transmitted symbol. MRC shown on this graph is BER characteristic upon Viterbi decoding of a signal after a maximal ratio combining on an order 10 (two antennas×5 paths) diversity channels, and this corresponds to the BER characteristic which results when the equalizer has perfectly canceled interferences. Thus, the quality of the receiver can be evaluated by seeing how the BER after the iterations is located close to the MRC curve. It is seen from FIG. 29 that with the turbo-reception method according to the second aspect of the present invention, the higher $E_b/N_o$, the less BER, and the greater the number of iterations, the more the BER characteristic approaches MRC BRE characteristic, in particular BER characteristic is located very close to MRC with a number of iterations equal to 6. Thus, it is confirmed that the multiple output turbo-receiver which employs the turbo-reception method according to the third aspect of the present invention operates properly under severe conditions of four users, each having five paths and using two reception antennas.

What is claimed is:

1. A turbo-reception method of receiving a signal from N transmitters where N is an integer equal to or greater than 2, comprising the steps of calculating a channel value $h_{mn}(q)$ and a channel matrix H from M received signals $r_m$ (where M is an integer equal to or greater than 1) and a known signal, where m=1, ..., M; n=1, ..., N and q=0, ..., Q−1, and Q represents a number of multipaths of each transmitted wave;

determining a soft decision transmitted symbol b'$_n$(k) from N a priori information $\lambda_2$ [b$_n$(k)] where k represents a discrete time;

using the channel value $h_{mn}(q)$ and the soft decision transmitted symbol b'$_n$(k), calculating an interference component H·B'(k) upon a transmitted signal from an n-th transmitter, where $$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix}$$

$$H_{(q)} = \begin{bmatrix} h_{11(q)} & \cdots & h_{1N(q)} \\ \vdots & \ddots & \vdots \\ h_{M1(q)} & \cdots & h_{MN(q)} \end{bmatrix}$$

$B'(k)=[b'^T(k+Q-1) \ldots b'^T(k) \ldots b'^T(k-Q+1)]^T$ $b'(k+q)=[b'_1(k+q)b'_2(k+q) \ldots b'_N(k+q)]^T$ $q=Q-1 \ldots -Q+1 q \neq 0$ $b'(k)=[b'_1(k) \ldots 0 \ldots b'_N(k)]^T q=0$ b'(k) having a zero element at an n-th position and [ ]$^T$ representing a transposed matrix;

subtracting the interferenced component H·B'(k) from a received matrix y(k) to obtain a difference matrix y'(k) where $y(k)=[r^T(k+Q-1)r^T(k+Q-2) \ldots r^T(k)]^T$ $r(k)=[r_1(k)r_2(k) \ldots r_M(k)]^T$ using the channel matrix H or a reference signal to determine an adaptive filter coefficient w$_n$(k) which is to be applied to a received signal corresponding to a transmitted signal from an n-th transmitter in order to eliminate residual interference components in the difference matrix y'(k);

and filtering the difference matrix y'(k) with the adaptive filter coefficient w$_n$(k) to provide a log-likelihood ratio for the received signal which corresponds to the transmitted signal from the n-th transmitter and from which interferences are eliminated.

2. A turbo-reception method according to claim 1 in which denoting a covariance matrix of noise components in the received matrix y (k) by U, using the soft decision transmitted symbol $b'_n(k)$ and the channel matrix H to calculate the adaptive filter coefficient $w_n(k)$ according to the following formula:

$$w_n(k) = (HG(k)H^H + U)^{-1} h$$

$$G(k) = diag[D(k+Q-1) \ldots D(k) \ldots D(k-Q+1)]$$

$$D(k+q) = diag[1-b'^2_1(k+q), \ldots, 1-b'^2_n(k+q), \ldots, 1-b'^2_N(k+q)] q = Q-1 \ldots -Q+1, q \neq 0 = diag[1-b'^2_1(k+q), \ldots, 1, \ldots, 1-b'^2_N(k+q)] q = 0$$

$$h = \begin{bmatrix} H_{1,(Q-1)\cdot N+n} \\ H_{2,(Q-1)\cdot N+n} \\ \vdots \\ H_{M,(Q-1)\cdot N+n} \end{bmatrix}$$

where $H_{1,(Q-1)\cdot N+n}$ represents an element of the matrix H located at row 1 and column (Q−1)N+n.

3. A turbo-reception method of receiving a signal from N transmitters where N is an integer equal to or greater than 2, comprising the steps of calculating a channel value $h_{mn}(q)$ and a channel matrix H from M received signals $r_m$ where M is an integer equal to or greater than 1 and where m is 1, ..., M; n=1, ..., N; q=0, ..., Q−1, and Q represents a number of multipaths of each transmitted wave;

determining a soft decision transmitted symbol $b'_n(k)$ from N a priori information $\lambda_2 [b_n(k)]$ where k represents a discrete time;

using the channel value $h_{mn}(q)$ and the soft decision transmitted symbol $b'_n(k)$ to calculate an interference component H·B'(k) upon a transmitted signal from the n-th transmitter where $$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix}$$

$$H_{(q)} = \begin{bmatrix} h_{11(q)} & \cdots & h_{1N(q)} \\ \vdots & \ddots & \vdots \\ h_{M1(q)} & \cdots & h_{MN(q)} \end{bmatrix}$$

$$B'(k) = [b'^T(k+Q-1) \ldots b'^T(k) \ldots b'^T(k-Q+1)]^T$$

$$b'(k+q) = [b'_1(k+q) b'_2(k+q) \ldots b'_N(k+q)]^T \quad q = Q-1 \ldots -Q+1 q \neq 0$$

$$b'(k) = [b'_1(k) \ldots -f(b'_n(k)) \ldots b'_N(k)]^T q = 0$$

b'(k) having an element $f(b'_n(k))$ at an n-th position, f( ) being a function of a variable $b'_n(k)$ and satisfying that f(0)=0 and $d\{f(b'_n(k))\}/d\{b'_n(k)\} \geq 0$, and [ ]$^T$ representing a transposed matrix;

subtracting the interference component H·B'(k) from a received matrix y(k) to determine a difference matrix y'(k) where $$y(k) = [r^T(k+Q-1) r^T(k+Q-2) \ldots r^T(k)]^T$$

$$r(k) = [r_1(k) r_2(k) \ldots r_M(k)]^T$$

using the channel matrix H or reference signal to determine an adaptive filter coefficient $w_n(k)$ which is to be applied to a received signal corresponding to the transmitted signal from the n-th transmitter in order to eliminate residual interference components which remain in the difference matrix y'(k);

and filtering the difference matrix y'(k) with the adaptive filter coefficient $w_n(k)$ to provide a log-likelihood ratio for the received signal which corresponds to the transmitted signal from the n-th transmitter and from which interferences are eliminated.

4. A turbo-reception method according to claim 3, further comprising, denoting a covariance matrix of noise components in the received matrix y(k) by U, using the soft decision transmitted symbol $b'_n(k)$ and a channel matrix H to calculate the adaptive filter coefficient $w_n(k)$ according to the following formula:

$$w_n(k) = (HG(k)H^H + U)^{-1} h$$

$$G(k) = diag[D(k+Q-1) \ldots D(k) \ldots D(k-Q+1)]$$

$$D(k+q) = diag[1-b'^2_1(k+q), \ldots, 1-b'^2_n(k+q), \ldots, 1-b'^2_N(k+q)] q = Q-1 \ldots -Q+1, q \neq 0 = diag[1-b'^2_1(k+q), \ldots, 1-b'^2_{n-1}(k), 1+2E[f(b'_n(k)] + E[f(b'_n(k))^2], 1-b'^2_{n+1}(k), \ldots, 1-b'^2_N(k+q)] q = 0$$

where E[ ] represents a mean value, and $$h = \begin{bmatrix} H_{1,(Q-1)\cdot N+n} \\ H_{2,(Q-1)\cdot N+n} \\ \vdots \\ H_{M,(Q-1)\cdot N+n} \end{bmatrix}$$

where $H_{1,(Q-1)\cdot N+n}$ represents an element of the matrix H at row 1 and a column (Q−1) N+n.

5. A turbo-reception method according to claim 2 or 4 in which an inverse matrix calculation during the calculation of the adaptive filter coefficient $w_n(k)$ takes place by using matrix inversion lemma.

6. A turbo-reception method according to claim 1 or 2 in which the covariance matrix U of noise components in the received matrix y (k) is defined as $\sigma^2 I$ which is determined by a variance $\sigma^2$ of a Gaussian distribution and a unit matrix.

7. A turbo-reception method according to claim 1 or 2 in which the covariance matrix U of noise components in the received matrix y (k) is derived, using the received matrix y(k) and the estimated channel matrix H, as follows:

$$\hat{U} = \Sigma_{k=0}^{Tr} (y(k) - \hat{H} \cdot B(k)) \cdot (y(k) - \hat{H} \cdot B(k))^H$$

$$B(k) = [b^T(k+Q-1) \ldots b^T(k) \ldots b^T(k-Q+1)]^T$$

$$b(k+q) = [b_1(k+q) \ldots b_N(k+q)]^T (q=-Q+1 \ldots Q-1)$$

where Tr represents the length of the reference signal.

8. A turbo-reception method according claim 2 or 3 in which D(k+q) is approximated by 0 for q≠0, and D(k+q) is approximated by diag [0, ..., 1, ..., 0] for q=0.

9. A turbo-reception method of receiving a signal from N transmitters where N is an integer equal to or greater than 2, comprising the steps of calculating a channel value $h_{mn}(q)$ and a channel matrix H from M received signals $r_m$ (where M is an integer equal to or greater than 1) and a known signal where m=1, ..., M; n=1, ..., N; q=0, ..., Q−1, and Q represents a number of multipaths of each transmitted wave;

determining a soft decision transmitted symbol $b'_n(k)$ from N a priori information $\lambda_2 [b_n(k)]$ where k represents a discrete time;

using the channel value $h_{mn}(q)$ and the soft decision transmitted symbol $b'_n(k)$ to calculate an interference component $H \cdot B'(k)$ upon a transmitted signal from an n-th transmitter where $$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix}$$

$$H_{(q)} = \begin{bmatrix} h_{11(q)} & \cdots & h_{1N(q)} \\ \vdots & \ddots & \vdots \\ h_{MI(q)} & \cdots & h_{MN(q)} \end{bmatrix}$$

$B'(k) = [b'^T(k+Q-1) \ldots b'^T(k) \ldots b'^T(k-Q+1)]^T$ $b'(k+q) = [b'_1(k+q)b'_2(k+q) \ldots b'_N(k+q)]^T q = Q-1 \ldots -Q+1 q \neq 0$ $b'(k) = [b'_1(k) \ldots 0 \ldots b'_N(k)]^T q = 0$ $b'(k)$ having a zero element at an n-th position and $[\ ]^T$ representing a transposed matrix;

subtracting the interference component $H \cdot B'(k)$ from a received matrix $y(k)$ to determine a difference matrix $y'(k)$ where $y(k) = [r^T(k+Q-1)r^T(k+Q-2) \ldots r^T(k)]^T$ $r(k) = [r_1(k)r_2(k) \ldots r_M(k)]^T$ defining a covariance matrix of noise components in the received matrix $y(k)$ as $\sigma^2 I$ which is determined from a variance $\sigma^2$ of a Gaussian distribution and a unit matrix I, and filtering the difference matrix $y'(k)$ with an adaptive filter coefficient $w_n$ which is determined by $$h = \begin{bmatrix} H_{1,(Q-1)\cdot N+n} \\ H_{2,(Q-1)\cdot N+n} \\ \vdots \\ H_{M\cdot Q,(Q-1)\cdot N+n} \end{bmatrix}$$

to provide a log-likelihood ratio for the received signal which corresponds to the transmitted signal from the n-th transmitter and from which interferences are eliminated.

10. A turbo-reception method of receiving a signal from N transmitters where N is an integer equal to or greater than 2, comprising the steps of calculating a channel value $h_{mn}(q)$ and a channel matrix H from M received signals $r_m$ (where M is an integer equal to or greater than 1) and a known signal where m=1, ..., M; n=1, ..., N; q=0, ..., Q-1, and Q represents a number of multi paths of each transmitted wave;

determining a soft decision transmitted symbol $b'_n(k)$ from N a priori information $\lambda_2 [b_n(k)]$ where k represents a discrete time;

calculating an interference component $H \cdot B'(k)$ upon a transmitted signal from an n-th transmitter using the channel value $h_{mn}(q)$ and the soft decision transmitted symbol $b'_n(k)$ as follows:

$$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix}$$

$$H_{(q)} = \begin{bmatrix} h_{11(q)} & \cdots & h_{1N(q)} \\ \vdots & \ddots & \vdots \\ h_{MI(q)} & \cdots & h_{MN(q)} \end{bmatrix}$$

$B'(k) = [b'^T(k+Q-1) \ldots b'^T(k) \ldots b'^T(k-Q+1)]^T$ $b'(k+q) = [b'_1(k+q)b'_2(k+q) \ldots b'_N(k+q)]^T q = Q-1 \ldots -Q+1 q \neq 0$ $b'(k) = [b'_1(k) \ldots -f(b'_n(k)) \ldots b'_N(k)]^T q = 0$ where $b'(k)$ has an element $f(b'_n(k))$ at an n-th position, $f(\ )$ is a function of a variable $b'_n(k)$ which satisfies that of $f(0)=0$ and is $d\{f(b'_n(k))\}/d\{b'_n(k)\} \geq 0$ and $[\ ]^T$ is a transposed matrix;

subtracting the interference component $H \cdot B'(k)$ from a received matrix $y(k)$ to define a difference matrix $y'(k)$ where $y(k) = [r^T(k+Q-1)r^T(k+Q-2) \ldots r^T(k)]^T$ $r(k) = [r_1(k)r_2(k) \ldots r_M(k)]^T$ defining a covariance matrix for noise components in the received matrix $y(k)$ as $\sigma^2 I$ which is determined from a variance $\sigma^2$ of a Gaussian distribution and unit matrix I, and filtering the difference matrix $y'(k)$ with an adaptive filter coefficient $w_n(k)$ which is determined by $$h = \begin{bmatrix} H_{1,(Q-1)\cdot N+n} \\ H_{2,(Q-1)\cdot N+n} \\ \vdots \\ H_{M\cdot Q,(Q-1)\cdot N+n} \end{bmatrix}$$

to provide a log-likelihood ratio for the received signal which corresponds to the transmitted signal from the n-th transmitter and from which interferences are eliminated.

11. A turbo-reception method of receiving a transmitted signal from N transmitters where N is an integer equal to or greater than 2 comprising the steps of determining a channel value which is a transmission characteristic of a received signal from M received signals (where M is an integer equal to or greater than 1) and a known signal;.

estimating a soft decision transmitted symbol each from N a priori information;

dividing N transmitted signals each into L (L≦N) groups of transmitted signals including one or a plurality of transmitted signals, using a soft decision transmitted symbol and a channel matrix comprising channel values to determine L equalized signals from which interferences from other group of transmitting signals are eliminated and post-equalization channel information each corresponding to the transmission characteristic of the equalized signal for each group of transmitted signals;

for each combination of L equalized signals and associated channel information, treating the group of equalized signals as a received signal having a channel value defined by the channel information and where there is a plurality of transmitted signals which constitute the group of equalized signals, dividing such transmitted signal into a plurality of sub-group of one or a plurality of transmitted signals, using the soft decision transmitted signal to determine an equalized signal for the subgroup of transmitted signals from which interferences from the other groups of transmitted signals are eliminated and associated post-equalization channel information, and where the group comprises a single transmitted signal, using the resulting equalized signal, the channel information and the soft decision transmitted signal to eliminate an interference of the transmitted signal itself due to multipaths;

repeating the steps of dividing, eliminating interferences and generating post-equalization channel information until transmitted signals which constitute every equalized signal becomes a single one, thus finally determining a equalized signal for each transmitted signal from which an interference caused by multipaths of its own is eliminated or determining, for the combination of the equalized signal and associated channel information, an equalized signal from which an interference between different transmitted signals and an intersymbol interference by the transmitted signal itself is eliminated for each transmitted signal which constitutes the equalized signal.

12. A turbo-reception method according to claim 11, in which for each group of transmitted signals, using the soft decision transmitted symbol and the channel value to generate a replica of interferences caused by other groups of transmitted signals, subtracting the replica of interferences from the received signal to define a difference signal, determining, for each difference signal, a filter characteristic which is used to eliminate residual interference and associated post-equalization channel information from the channel value and the soft decision transmitted symbol, filtering a corresponding difference signal with the residual interference eliminating filter characteristic to derive the equalized signal.

13. A turbo-reception method according to claim 12, comprising the steps of determining from the received signals $r_1(k), \ldots, r_M(k)$, a received matrix as defined below $$y(k)=[r^T(k+Q-1)r^T(k+Q-2) \ldots r^T(k)]^T$$

$$r(k)=[r_1(k)r_2(k) \ldots r_M(k)]^T$$

where $[\ ]^T$ represents a transposed matrix;

defining the transmission characteristic as a channel matrix H as defined below $$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix}$$

$$H(q)=[h_1(q) \ldots h_N(q)]$$

$$h_n(q)=[h_{1n}(q) \ldots h_{Mn}(q)]^T$$

where $m=1, \ldots, M$; $n=1, \ldots, N$; and $q=0, \ldots, Q-1$ and Q is a number of muti-paths, and $h_{mn}(q)$ is a channel value of a path q from an n-th transmitter which is contained in the received signal $r_m$;

denoting the soft decision transmitted symbol by $b'_n(k)$, calculating a replica $H \cdot B'(k)$ upon one of groups of transmitted signals, formed by a first to a U-th transmitted signal where U is an integer satisfying $N>U \geq 1$ caused by other groups of transmitted signals as follows;

$$B'(k)=[b'^T(k+Q-1) \ldots b'^T(k) \ldots b'^T(k-Q+1)]^T$$

$$b'(k+q)=[b'_1(k+q)b'_2(k+q) \ldots b'_n(k+q) \ldots b'_N(k+q)]^T : q=Q-1, \ldots 1$$

$$b'(k+q)=[0 \ldots 0\ b'_{u+1}(k+q) \ldots b'_N(k+q)]^T : q=0, \ldots, -Q+1$$

where b'(k+q) have zero elements which are equal to U in number;

subtracting the interference replica $H \cdot B'(k)$ from the received matrix y(k) to define the difference matrix $y'_g(k)$.

14. A turbo-reception method according to claim 11 in which when a further elimination of interferences is desired for the equalized signal and associated channnel information, the number of multipaths which are used during the elimination of interferences from the equalized signal is reduced.

15. A turbo-reception method according to claim 14, further comprising the steps of determining from the received signals $r_1(k), \ldots, r_M(k)$, a received matrix defined as follows;

$$y(k)=[r^T(k+Q-1)r^T(k+Q-2) \ldots r^T(k)]^T$$

$$r(k)=[r_1(k)r_2(k) \ldots r_M(k)]^T$$

where $[\ ]^T$ represents a transposed matrix;

defining the transmission characteristic in the form of a channel matrix H, defined as follows;

$$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix}$$

$$H(q)=[h_1(q) \ldots h_N(q)]$$

$$h_n(q)=[h_{1n}(q) \ldots h_{Mn}(q)]^T$$

where $m=1, \ldots, M$; $n=1, \ldots, N$; and $q=0, \ldots, Q-1$ and Q is a number of mutipaths, and $h_{mn}(q)$ is a channel value of a path q from an n-th transmitter which is contained in the received signal $r_m$;

denoting the soft decision transmitted symbol by $b'_n(k)$, one of the groups of transmitted signals comprising a first to U-th transmitted signal where U is an integer satisfying the inequality $N>U \geq 1$, an equalized signal being formed for this group of transmitted signals so that interferences therein are eliminated by considering a number of multipaths equal to Q' where Q'<Q, calculating a replica of interference upon this group from other groups of transmitted in the form of $H \cdot B'(k)$ as follows;

$$B'(k)=[b'^T(k+Q-1) \ldots b'^T(k) \ldots b'^T(k-Q+1)]^t$$

$$b'(k+q)=[b'_1(k+q)b'_2(k+q) \ldots b'_n(k+q) \ldots b'_N(k+q)]^T : q=Q-1, \ldots 1$$

$$b'(k+q)=[0 \ldots 0\ b'_{u+1}(k+q) \ldots b'_N(k+q)]^T : q=0, \ldots, -Q'+1$$

where b'(k+q) have 0 elements which are equal to U in number, and $$b'(k+q)=[b'_1(k+q) \ldots b'_n(k+q) \ldots b'_N(k+q)]^T : q=Q', \ldots, -Q+1$$

subtracting the interference replica H·B'(k) from the received matrix y(k) to define the difference matrix y'$_g$(k).

16. A time-reception method according to one of claims 1, 3, 9, 10 and 11 in which during a second and a subsequent iteration of the turbo-reception processing, both the known singnal and the transmittes symbol hard decision output which is obtained during a previous alteration are used as reference signals, and the reference signals and the received signal are used to calculate the channel matrix.

17. A turbo-reception method according to claim 16 in which one of the transmitted symbol hard decision outputs which are obtained during a previous iteration and which has a certainty in excess of a given value is also used as a reference signal to be used in the calculation of the channel matrix.

18. A turbo-reception method according to one of claims 1, 3, 9, 10 and 11 in which N a priori information $\lambda_2 [b_n(k)]$ are derived from N decoders which correspond to the N transmitters, a log-likelihood ratio which is obtained for the received signal which corresponds to the n-th transmitted signal and through which interferences are eliminated is fed to a corresponding one of the decoders.

19. A turbo-reception method according to one of claims 1, 3, 9, 10 and 11 in which the N transmitted signals are transmitted from N transmitters which transmit a single information series in the form of N parallel series, the N a priori information information $\lambda_2 [b_n(k)]$ being a result of series-parallel converstion of a priori information $\lambda_2 [b(j)]$ from one of the decoders, N log-likelihood ratios which are received signals corresponding to the N transmitted signals and from which interferences are eliminated being subject to a parallel-series convertion before being fed to the decoders.

20. A turbo-receiver for receiving a signal from N transmitters where N represents an integer equal to or greater than 2, comprising a received signal generator for forming M received signals $r_m$ (where M is an integer equal to or greater than 1) where m=1, . . . , M;

a channel estimator to which each received signal $r_m$ and a reference signal in the form of a known signal are input for calculating a channel value $h_{mn}(q)$ and a channel matrix H, as defined below $$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix}$$

$$H_{(q)} = \begin{bmatrix} h_{11(q)} & \cdots & h_{1N(q)} \\ \vdots & \ddots & \vdots \\ h_{M1(q)} & \cdots & h_{MN(q)} \end{bmatrix}$$

$$n = 1, \ldots N$$

a received matrix generator which receives each received signal $r_m$ for generating a received matrix, as defined below $y(k)=[r^T(k+Q-1)r^T(k+Q-2) \ldots r^T(k)]^T$ $r(k)=[r_1(k)r_2(k) \ldots r_M(k)]^T$ where k represents a discrete time, Q a number of multipaths of each transmitted wave, q=0, . . . , Q−1, and [ ]$^T$ representing a transposed matrix;

a soft decision symbol generator receiving N a priori information for generating a soft decision transmitted symbol b'$_n$ (k);

a replica matrix generator to which respective soft decision transmitted symbols b$_1$'(k) to b$_N$'(k) are input to generate an interference replica matrix B'(k) with respect to an n-th transmitted signal as follows;

$B'(k)=[b'^T(k+Q-1) \ldots b'^T(k) \ldots b'^T(k-Q+1)]^T$ $b'(k+q)=[b'_1(k+q)b'_2(k+q) \ldots b'_N(k+q)]^T q= Q-1, \ldots ,-Q+1, q \neq 0$ $b'(k)=[b'_1(k) \ldots 0 \ldots b'_N(k)]^T q=0$ where b'(k) has a zero element at n-th position;

a filter processor to which the channel matrix H and the interference replica matrix B'(k) are input for calculating and delivering an interference component H·B'(k) with respect to a received signal corresponding to the n-th transmitted signal;

a difference calculator to which the interference component H·B'(k) and the received matrix y(k) are input for delivering a difference matrix y'(k)=y(k)−H·B'(k);

a filter coefficient estimator to which the channel matrix H or a reference signal is input for determining an adaptive filter coefficient w$_n$(k) to be applied to a received signal which corresponds to a transmitted signal from the n-th transmitter in order to eliminate residual interference components which remain in the reference matrix y'(k);

and an adaptive filter to which the difference matrix y'(k) and the adaptive filter coefficient w$_n$(k) are input to filter y'(k) to provide a log-likelihood ratio as an received signal which corresponds to the transmitted signal from the n-th transmitter and from which interference is eliminated and which is then fed to the n-th decoder.

21. A turbo-receiver for receiving a signal from N transmitters where N is an integer equal to or greater than 2, comprising a received signal generator for forming M received signals $r_m$ (where M is an integer equal to or greater than 1) where m=1, . . . , M;

N decoders;

a channel estimator to which each received signal $r_m$ and a reference signal in the form of a known signal are input to calculate a channel value $h_{mn}(q)$ and a channel matrix H, as defined below $$H = \begin{bmatrix} H_{(0)} & \cdots & H_{(Q-1)} & & 0 \\ & \ddots & & \ddots & \\ 0 & & H_{(0)} & \cdots & H_{(Q-1)} \end{bmatrix}$$

$$H_{(q)} = \begin{bmatrix} h_{11(q)} & \cdots & h_{1N(q)} \\ \vdots & \ddots & \vdots \\ h_{M1(q)} & \cdots & h_{MN(q)} \end{bmatrix}$$

$$n = 1, \ldots N$$

n=1, . . . , N a received matrix generator to which each received signal $r_m$ is input to generate a received matrix, as defined below $y(k)=[r^T(k+Q-1)r^T(k+Q-2) \ldots r^T(k)]^T$ $r(k)=[r_1(k)r_2(k) \ldots r_M(k)]^T$ where k represents a discrete time, Q a number of multipaths of each transmitted wave, q=0, . . . ., Q−1 and [ ]$^T$ a transposed matrix;

a soft decision symbol generator to which N a priori information are input to generate soft decision transmitted symbols b'$_n$ (k) (where n=1, . . . , N);

a replica matrix generator to which the soft decision transmitted symbols b'$_1$ (k) to b'$_n$ (k) are input to generate an interference replica matrix B'(k) for a transmitted signal from an n-th transmitter as indicated below $$B'(k)=[b'^T(k+Q-1) \ldots b'^T(k) \ldots b'^T(k-Q+1)]^T$$

$$b'(k+q)=[b'_1(k+q)b'_2(k+q) \ldots b'_N(k+q)]^T q = Q-1, \ldots, -Q+1, q \ne 0$$

$$b'(k)=[b'_1(k) \ldots -f(b'_n(k)) \ldots b'_N(k)]^T q=0$$

where b'(k) has an element f(b'$_n$ (k)) at an n-th position, and f( ) is a function of a variable b'$_n$ (k) which satisfies that f(0)=0 and $$d\{f(b'_n(k))\}/\{b'_n(k)\} \geq 0;$$

a filter processor to which the channel matrix H and the interference replica matrix B'(k) are input to calculate and deliver an interference component H·B'(k) for a received signal which corresponds to the transmitted signal from the n-th transmitter;

a difference calculator to which the interference component H·B'(k) and the received matrix y(k) are input to deliver a difference matrix y'(k)=y(k)−H·B'(k);

a filter coefficient estimator to which the channel matrix H or a reference signal is input to determine an adaptive filter coefficient w$_n$(k) for a received signal which corresponds to a transmitted signal from the n-th transmitter in order to eliminate residual interferences in the difference matrix y'(k);

and an adaptive filter to which the difference matrix y'(k) and the adaptive filter coefficient w$_n$(k) are input to filter y'(k) to provide a log-likelihood ratio as a received signal which corresponds to the transmitted signal from the n-th transmitter and from which interferences are eliminated and which is then fed to the n-th decoder.

22. A turbo-receiver for receiving a transmitted signal from N transmitters where N is an integer equal to or greater than 2, comprising a received signal generator for forming M received signals (where M is an integer equal to or greater than 1);

a channel estimator to which the N received signals and a reference signals in the form of a known signal are input to estimate a channel value representing a transmission characteristic;

a prestage equalizer to which the M received signals, the channel value and N a priori information are input for delivering, for each transmitted signal from one or more transmitters, a plurality of sets of equalized signal from which interferences by transmitted signals from other transmitters are eliminated and an associated post-equalization channel information;

and a plurality of poststage equalizers to which the set of the equalized signal and associated channel information from the prestage equalizer, and a priori information which corresponds to the transmitted signal which constitutes the equalized signal are input to deliver a log-likelihood ratio by eliminating from the equalized signal an intersymbol interference from each transmitted signal which constitutes the equalized signal due to the multiple paths and a mutual interferences between each transmitted signal and other transmitted signals which also constituted the equalized signal.

23. A turbo-receiver for receiving a transmitted signal from N transmitters where N is an integer equal to or greater than 2, comprising a received signal generator for forming M received signals (where M is an integer equal to or greater than 1);

a channel estimator to which the N received signals and a reference signal in the form of a known signal are input to estimate a channel value representing a transmission characteristic;

a prestage equalizer to which the M received signals, the channel value and N a priori information are input to deliver, for each transmitted signal from one or more transmitters, a plurality of sets of an equalized signal from which interferences by transmitted signals from other transmitters are eliminated and an associated post-equalization channel information;

and a plurality of poststage equalizers to which the sets of the equalized signal and associated channel information from the prestage equalizer, and a priori information which corresponds to a plurality of transmitted signals which constitute the equalized signal are input to deliver, for each or for a sub-group of transmitted signals among the plurality of transmitted signals which constituted the equalized signals, a plurality of sets of an equalized signal from which interference by other transmitted signals which constituted that the equalized signals are eliminated and an associated post-equalization channel information.

24. A turbo-receiver according to one of claims 20 to 23, further comprising a previous symbol memory in which a hard decision transmitted symbol from the decoder is stored to be updated, and means for reading the hard decision transmitted symbol from the previous symbol memory to feed it to the channel estimator as the reference signal during a second and a subsequent iteration of the turbo-reception processing.

25. A turbo-receiver according to claim 24 further comprising a comparator for comparing a soft decision transmitted symbol which is input thereto against a threshold value, and a selector which is controlled by an output from the comparator so that one of the hard decision transmitted symbols, for which a corresponding soft decision transmitted symbol has a value in excess of the threshold value, is stored in the previous symbol memory.

26. A turbo-receiver according to one of claims 20 to 23, further comprising N decoders, to which the N log-likelihood ratios are delivered, the N decoders providing the N a priori information at their outputs.

27. A turbo-receiver according to one of claims 20 to 23 in which the N transmitted signals are transmitted signals as the N transmitters transmit a single information series as N parallel series, further comprising a parallel-series converter for converting the delivered N log-likelihood ratios into serial series, a decoder to which the log-likelihood ratio in the serial series is input, and a series-parallel converter for converting a priori information from the decoder into N parallel series to provide the N a priori information.

28. A turbo-reception method in which a channel value representing a transmission path characteristic of a received signal is estimated from the received signal and a known signal serving as a reference signal, the received signal is processed in accordance with the estimated channel value, the processed signal is decoded, and the processing which uses the estimated channel value and the decoding are iterated upon the same received signal; further comprising determining the certainty of a decoded hard decision information signal on the basis of a value of a corresponding soft decision information symbol, and using a hard decision information symbol having a certainty which is in excess of a given value in the channel estimation of a next iteration as a reference signal.

29. A reception method according to claim 28, further comprising the step of calculating $\sigma^2$ I as a covariance matrix of noise component in a received matrix y(k) where $\sigma^2$ represents a variance of Gaussian distribution and I a unit matrix.

30. A reception method according to claim 28 further comprising using an estimated channel matrix $\hat{H}$ and a received signal matrix y(k) to calculate a covariance matrix U of noise components within the received signal matrix y(k) during each iteration as follows;

$$\hat{U}=\Sigma_{k=0}^{Tr}(y(k)-\hat{H}\cdot B(k))\cdot(y(k)-\hat{H}\cdot B(k))^H$$

$$B(k)=[b^T(k+Q-1) \ldots b^T(k) \ldots b^T(k-Q+1)]^T$$

$$b(k+q)=[b_1(k+q) \ldots b_N(k+q)]^T (q=-Q+1 \ldots Q-1)$$

$b_1(k+q)$ to $b_N(k+q)$ being the reference signals comprising the known signal and the hard decision information symbols having a certainty which is in excess of a given value, Tr being the length of the reference signal.

31. A reception method according to claim 28 in which the iteration of the processing which uses the estimated channel value and decoding processing comprises an iteration of determining a linear equalization filter in accordance with the estimated channel value, processing the received signal by the linear equalization filter and decoding the processed signal.

32. A reception method according to claim 28 in which the iteration of the processing which uses the estimated channel value and decoding processing comprises an iteration of performing a rake synthesis which compensates for a phase rotation which each symbol has experienced on a transmission path in a rake synthesis processor in accordance with the estimated channel value, and decoding the signal which is produced by the rake synthesis in a turbo-decoder.

33. A reception method according to claim 28 in which the iteration of the processing which uses the estimated channel value and decoding processing comprises an iteration of setting up weights which determine an antenna directivity response of an adaptive array antenna receiver in accordance with the estimated channel value, and decoding an output from the adaptive array antenna receiver in a turbo-decoder.

34. A reception method according to claim 33 in which a rake synthesis which compensates for a phase rotation which each symbol has experienced on a transmission path in accordance with the estimated channel value is made for an output from the adaptive array antenna receiver in a rake synthesis processor, and a resulting signal from the rake synthesis is fed to the turbo-decoder.

35. A receiver in which a channel value representing a transmission path characteristic of a received signal is estimated from the received signal and a known signal serving as a reference signal, the received signal is processed by using the estimated channel value, the processed signal is decoded, and the processing which uses the estimated channel value and the decoded processing are iterated upon the same received signal; further comprising means for determining whether or not the certainty of a decoded hard decision information symbol is in the excess of a given value by seeing whether or not a corresponding soft decision information symbol has a value which is in excess of a threshold value;

and a previous symbol memory having its stored content updated by a hard decision information symbol which has been determined as likely to be certain, the stored content of the previous symbol memory being used as a reference signal during the channel estimation of a next ilteration.

* * * * *